US008135047B2

(12) United States Patent
Rajendran et al.

(10) Patent No.: US 8,135,047 B2
(45) Date of Patent: Mar. 13, 2012

(54) SYSTEMS AND METHODS FOR INCLUDING AN IDENTIFIER WITH A PACKET ASSOCIATED WITH A SPEECH SIGNAL

(75) Inventors: Vivek Rajendran, San Diego, CA (US); Ananthapadmanabhan A. Kandhadai, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 667 days.

(21) Appl. No.: 11/677,173

(22) Filed: Feb. 21, 2007

(65) Prior Publication Data

US 2008/0027711 A1 Jan. 31, 2008

Related U.S. Application Data

(60) Provisional application No. 60/834,617, filed on Jul. 31, 2006.

(51) Int. Cl.
*H04J 3/04* (2006.01)

(52) U.S. Cl. .................... 370/536; 379/202.01; 370/350

(58) Field of Classification Search .................. 370/350, 370/536; 379/202.01

See application file for complete search history.

(56) References Cited

U.S. PATENT DOCUMENTS

| | | | | |
|---|---|---|---|---|
| 6,424,349 | B1 * | 7/2002 | Kim | 345/531 |
| 6,567,876 | B1 * | 5/2003 | Stufflebeam | 710/303 |
| 6,631,139 | B2 * | 10/2003 | El-Maleh et al. | 370/466 |
| 6,804,340 | B2 * | 10/2004 | Howard et al. | 379/202.01 |
| 6,865,699 | B2 * | 3/2005 | Tanaka et al. | 714/701 |
| 7,016,834 | B1 | 3/2006 | Lakaniemi | |
| 7,254,533 | B1 * | 8/2007 | Jabri et al. | 704/219 |
| 7,330,814 | B2 * | 2/2008 | McCree | 704/219 |
| 7,747,669 | B2 * | 6/2010 | Tang et al. | 708/650 |
| 2003/0172114 | A1 | 9/2003 | Leung | |
| 2005/0177364 | A1 | 8/2005 | Jelinek | |
| 2006/0020450 | A1 | 1/2006 | Miseki | |
| 2006/0271355 | A1 * | 11/2006 | Wang et al. | 704/220 |
| 2007/0088558 | A1 | 4/2007 | Vos et al. | |

FOREIGN PATENT DOCUMENTS

| | | |
|---|---|---|
| JP | 2004501391 A | 1/2004 |
| JP | 20050258226 | 9/2005 |
| JP | 2006502426 A | 1/2006 |

(Continued)

OTHER PUBLICATIONS

U.S. Appl. No. 60/673,965, Kos, et al, "Parameter Coding in a High-Band Speech Coder," Apr. 22, 2005.

3GPP2 C.S0014-0 Version 1.0, Enhanced Variable Rate Codec (EVRC), (TIA/EIA/IS-127), Published by TIA Aug. 1998.

(Continued)

*Primary Examiner* — Phuc Tran

(74) *Attorney, Agent, or Firm* — Heejong Yoo

(57) ABSTRACT

A method for including an identifier with a packet associated with a speech signal is described. A signal is received. The signal is partitioned into a plurality of frames. A frame of the signal is encoded into a packet. A determination is made if the packet is encoded as a wideband packet or a narrowband packet. An identifier is packed in the packet based on the determination. The packet is transmitted. At least two illegal values are provided from an N-bit parameter, wherein at least one bit from the N-bit parameter is used to carry information. A number of bits from the N-bit parameter that are used to carry information is equal to $\log_2(X)$, wherein X is the number of illegal values provided from the N-bit parameter.

25 Claims, 43 Drawing Sheets

FOREIGN PATENT DOCUMENTS

| | | | |
|---|---|---|---|
| KR | 20050049537 | | 5/2005 |
| RU | 2107951 | | 3/1998 |
| TW | I239184 | | 9/2005 |
| WO | WO0182289 | | 11/2001 |
| WO | 2004006226 | | 1/2004 |
| WO | WO2004034379 | A2 | 4/2004 |

OTHER PUBLICATIONS

Written Opinion—PCT/US07/074900, International Search Authority—European Patent Office, Jan. 23, 2008.

International Search Report—PCT/US07/074900—International Search Authority—European Patent Office, Jan. 23, 2008.

Recchione M C: "The Enhanced Variable Rate Coder: Toll Quality Speech for CDMA", International Journal of Speech Technology, Kluwer, Dordrecht,, NL, vol. 2, No. 4, 1999, pp. 305-315, XP001011504, ISSN: 1381-2416.

Research on Audio-Video Coding/Decoding Technology based on DSP, Xinmin Yan, Chinese Doctoral Dissertations & Master's Theses Full-text Database (Master), No. 5(2006), pp. 36-41.

Taiwan Search Report—TW096127832—TIPO—Mar. 17, 2011.

* cited by examiner

FIG. 5a
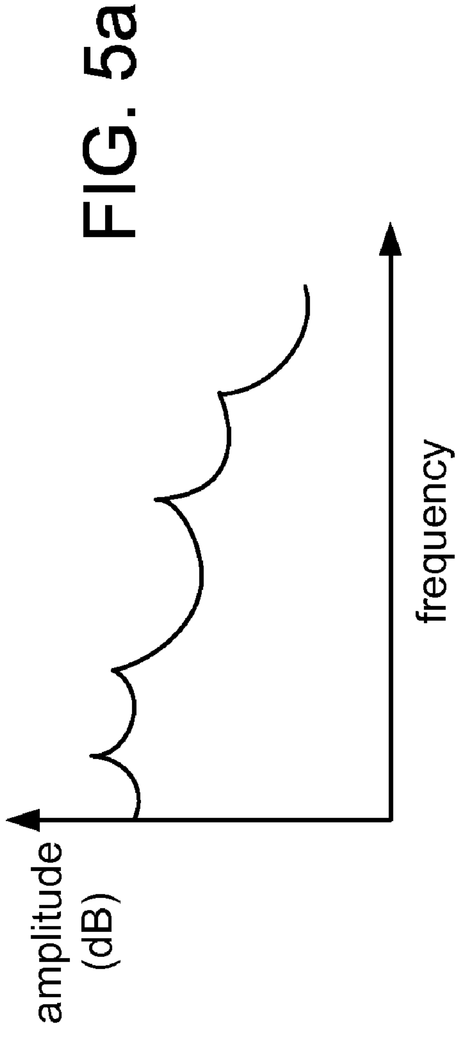
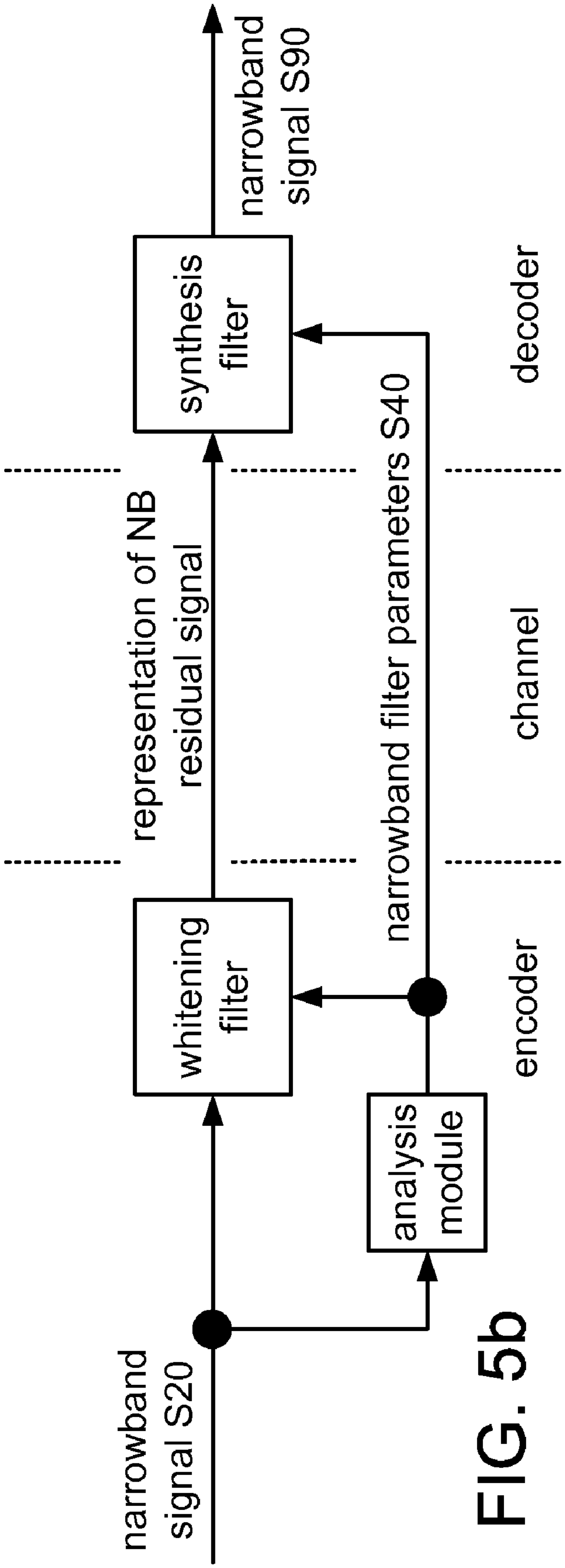
FIG. 5b

4000

| 4002 | 4004 | 4006 | 4008 | 4010 | 4012 | 4014 | 4016 | 4018 | 4020 |
|---|---|---|---|---|---|---|---|---|---|
| Mode bit | 1 | 0 | 1 | 1 | 1 | 1 | 0 | 1 | 0 |
| Special half-rate ID | 0 | 0 | 2 | 0 | 2 | 0 | 2 | 0 | 0 |
| LSP | 28 | 22 | 28 | 28 | 28 | 16 | 16 | 16 | 8 |
| Lag/Special packet ID | 7 | 7 | 7 | 7 | 7 | 4 | 7 | 0 | 0 |
| Additional Lag | 0 | 0 | 7 | 0 | 7 | 0 | 0 | 0 | 0 |
| ACB Gain | 9 | 9 | 9 | 0 | 0 | 0 | 0 | 0 | 0 |
| FCB Index | 105 | 30 | 0 | 0 | 0 | 0 | 0 | 0 | 0 |
| FCB Gain | 15 | 12 | 0 | 0 | 0 | 0 | 0 | 0 | 0 |
| Delta lag | 5 | 0 | 0 | 0 | 0 | 0 | 0 | 0 | 0 |
| Amplitude | 0 | 0 | 0 | 28 | 28 | 18 | 0 | 0 | 0 |
| Global alignment | 0 | 0 | 0 | 7 | 7 | 0 | 0 | 0 | 0 |
| Band alignments | 0 | 0 | 0 | 99 | 0 | 0 | 0 | 0 | 0 |
| Energy VQ | 0 | 0 | 0 | 0 | 0 | 0 | 17 | 17 | 6 |
| Filter shape | 0 | 0 | 0 | 0 | 0 | 0 | 2 | 2 | 0 |
| Reserved | 1 | 0 | 26 | 1 | 0 | 1 | 36 | 4 | 2 |
| Total | 171 | 80 | 80 | 171 | 80 | 40 | 80 | 40 | 16 |

FIG. 40

SYSTEMS AND METHODS FOR INCLUDING AN IDENTIFIER WITH A PACKET ASSOCIATED WITH A SPEECH SIGNAL

CLAIM OF PRIORITY UNDER 35 U.S.C. §119

This present application for patent claims priority to Provisional Application No. 60/834,617 entitled "SPECIAL HALF-RATE IDENTIFIER PACKET GENERATION AND DECODING" filed Jul. 31, 2006, and assigned to the assignee hereof and hereby expressly incorporated by reference herein.

TECHNICAL FIELD

The present systems and methods relates generally to speech processing technology. More specifically, the present systems and methods relate to including an identifier with a packet associated with a speech signal.

BACKGROUND

Transmission of voice by digital techniques has become widespread, particularly in long distance and digital radio telephone applications. This, in turn, has created interest in determining the least amount of information that can be sent over a channel while maintaining the perceived quality of the reconstructed speech. Devices for compressing speech find use in many fields of telecommunications. An example of telecommunications is wireless communications. The field of wireless communications has many applications including, e.g., cordless telephones, pagers, wireless local loops, wireless telephony such as cellular and portable communication system (PCS) telephone systems, mobile Internet Protocol (IP) telephony and satellite communication systems. A particularly important application is wireless telephony for mobile subscribers.

BRIEF DESCRIPTION OF THE DRAWINGS

FIG. 5*a* shows an example of a plot of frequency vs. log amplitude for a speech signal;

FIG. 5*b* shows a block diagram of a basic linear prediction coding system;

FIG. 40 is a chart illustrating the number of bits allocated to various types of packets.

DETAILED DESCRIPTION

Figure 1A:
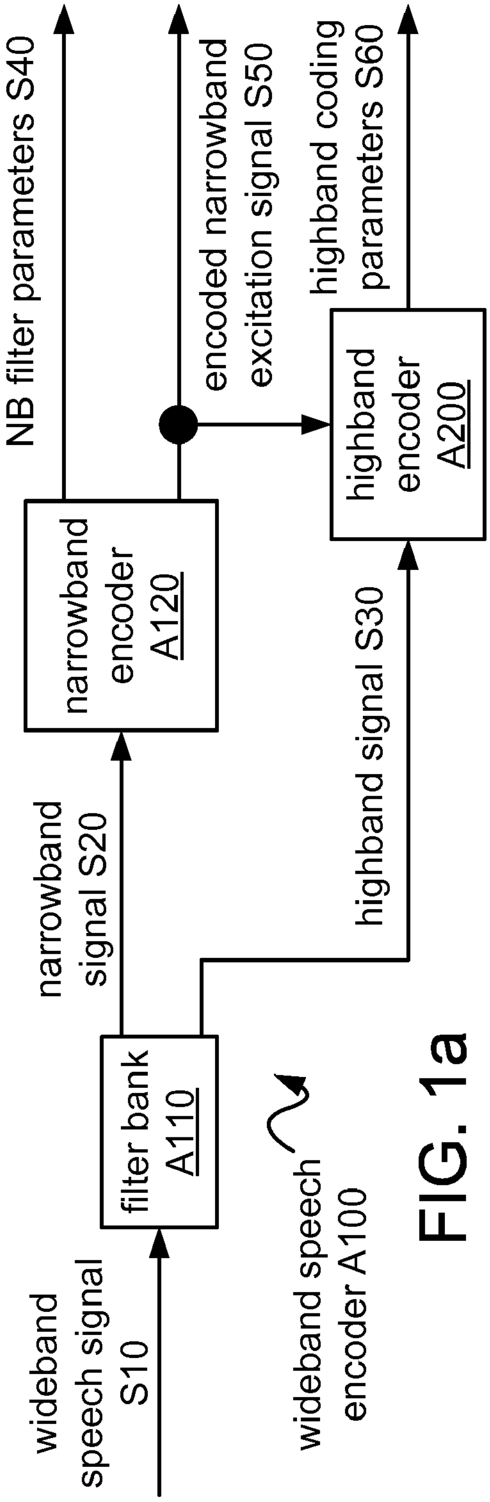
FIG. 1*a* shows a block diagram of a wideband speech encoder A100 according to an configuration.

A method for including an identifier with a packet associated with a speech signal is described. A signal is received. The signal is partitioned into a plurality of frames. A frame of the signal is encoded into a packet. A determination is made if the packet is encoded as a wideband packet or a narrowband packet. An identifier is packed in the packet based on the determination. The packet is transmitted. At least two illegal values from an N-bit parameter are provided, wherein at least one bit from the N-bit parameter is used to carry information. A number of bits from the N-bit parameter used to carry information is equal to $\log_2(X)$, wherein X is the number of illegal values provided from the N-bit parameter.

An apparatus for including an identifier with a packet associated with a speech signal is also described. The apparatus includes a processor and memory in electronic communication with the processor. Instructions are stored in the memory. The instructions are executable to: receive a signal; partition the signal into a plurality of frames; encode a frame of the signal into a packet; determine if the packet is encoded as a wideband packet or a narrowband packet; pack an identifier in the packet based on the determination; and transmit the packet.

A system that is configured to include an identifier with a packet associated with a speech signal is also described. The system includes a means for processing and a means for receiving a signal. A means for partitioning the signal into a plurality of frames and a means for encoding a frame of the signal into a packet are described. A means for determining if the packet is encoded as a wideband packet or a narrowband packet is described. A means for packing an identifier in the packet based on the determination and a means for transmitting the packet are described.

A computer readable medium is also described. The medium is configured to store a set of instructions executable to: receive a signal; partition the signal into a plurality of frames; encode a frame of the signal into a packet; determine if the packet is encoded as a wideband packet or a narrowband packet; pack an identifier in the packet based on the determination; and transmit the packet.

A method for decoding a packet is also described. A packet is received. An identifier included in the packet is analyzed. A determination is made if the packet was encoded by a wideband coder or a narrowband coder. A decoding mode is selected for the packet based on the determination.

An apparatus for decoding a packet is also described. The apparatus includes a processor and memory in electronic communication with the processor. Instructions are stored in the memory. The instructions are executable to: receive a packet; analyze an identifier included in the packet; determine if the packet was encoded by a wideband coder or a narrowband coder; and select a decoding mode for the packet based on the determination.

A system that is configured to decode a packet is also described. The system includes a means for processing and a means for receiving a packet. A means for analyzing an identifier including in the packet and a means for determining if the packet was encoded by a wideband coder or a narrowband coder are described. A means for selecting a decoding mode for the packet based on the determination is described.

A computer-readable medium is also described. The medium is configured to store a set of instructions executable to: receive a packet; analyze an identifier included in the packet; determine if the packet was encoded by a wideband coder or a narrowband coder; and select a decoding mode for the packet based on the determination.

Various configurations of the systems and methods are now described with reference to the Figures, where like reference numbers indicate identical or functionally similar elements. The features of the present systems and methods, as generally described and illustrated in the Figures herein, could be arranged and designed in a wide variety of different configurations. Thus, the detailed description below is not intended to limit the scope of the systems and methods, as claimed, but is merely representative of the configurations of the systems and methods.

Many features of the configurations disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present systems and methods.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "a configuration," "configuration," "configurations," "the configuration," "the configurations," "one or more configurations," "some configurations," "certain configurations," "one configuration," "another configuration" and the like mean "one or more (but not necessarily all) configurations of the disclosed systems and methods," unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

A cellular network may include a radio network made up of a number of cells that are each served by a fixed transmitter. These multiple transmitters may be referred to as cell sites or base stations. A cell may communicate with other cells in the network by transmitting a speech signal to a base station over a communications channel. The cell may divide the speech signal into multiple frames (e.g. 20 milliseconds (ms) of the speech signal). Each frame may be encoded into a packet. The packet may include a certain quantity of bits which are then transmitted across the communications channel to a receiving base station or a receiving cell. The receiving base station or receiving cell may unpack the packet and decode the various frames to reconstruct the signal.

Packets may be encoded as a full-rate packet (171 bits), a half-rate packet (80 bits), a quarter-rate packet (40 bits) or an eighth-rate packet (16 bits). In addition, packets may be encoding utilizing a narrowband coder or a wideband coder. Packets encoded by a wideband coder may be encoded as a full-rate packet, half-rate packet or an eighth-rate packet. Packets encoded by a narrowband coder may be encoded as a full-rate packet, half-rate packet, quarter-rate packet or an eighth-rate packet. Wideband coders may be implemented for various types of packets, including code excited linear prediction (CELP) packets and noise-excited linear prediction (NELP) packets. Narrowband coders may be implemented for CELP packets, prototype pitch period (PPP) packets and NELP packets.

After encoding a packet, an identifier may be included in the packet in order to indicate to a decoder if the packet was encoded by a wideband coder or a narrowband coder. Information included with the identifier may indicate to the decoder whether the packet should be decoded using a wideband decoder or a narrowband decoder. For example, a fourth generation vocoder (4GV) wideband (WB) coder may encode a half-rate (80 bits) packet. The packet may have no explicit bits to identify more types of packets. As such, an invalid bit pattern including a 7-bit pitch lag may be used to identify one or more packets that include 73-bits (or less). However, a 4GV-WB half-rate packet may need 74-bits and, as such, utilizing a 7-bit pitch lag identifier for a 4GV-WB half-rate packet may not be possible (since the total number of bits available for half-rate in this example is 80). In one aspect, two invalid patterns of the 7-bit pitch lag identifier that differ from each other by one bit may be used to identify a 4GV-WB half-rate packet. Six (of the seven) bits may be used as the identifier, hence freeing up the one differing bit to be used by 4GV-WB half-rate packet in addition to the 73-bits, which yields 74-bits for the 4GV-WB half-rate packet.

Configurations as described herein include systems, methods, and apparatus that may be configured to provide an extension to a narrowband speech coder to support transmission and/or storage of wideband speech signals at a bandwidth increase of about 800 to 1000 bps (bits per second). Potential advantages of such implementations include embedded coding to support compatibility with narrowband systems, relatively easy allocation and reallocation of bits between the narrowband and highband coding channels, avoiding a computationally intensive wideband synthesis operation, and maintaining a low sampling rate for signals to be processed by computationally intensive waveform coding routines.

Unless expressly limited by its context, the term "calculating" is used herein to indicate any of its ordinary meanings, such as computing, generating, and selecting from a list of values. Where the term "comprising" is used in the present description and claims, it does not exclude other elements or operations. The term "A is based on B" is used to indicate any of its ordinary meanings, including the cases (i) "A is equal to B" and (ii) "A is based on at least B." The term "Internet Protocol" includes version 4, as described in IETF (Internet Engineering Task Force) RFC (Request for Comments) 791, and subsequent versions such as version 6.

FIG. 1*a* shows a block diagram of a wideband speech encoder A100 according to an configuration. Filter bank A110 is configured to filter a wideband speech signal S10 to produce a narrowband signal S20 and a highband signal S30. Narrowband encoder A120 is configured to encode narrowband signal S20 to produce narrowband (NB) filter parameters S40 and a narrowband residual signal S50. As described in further detail herein, narrowband encoder A120 is typically configured to produce narrowband filter parameters S40 and encoded narrowband excitation signal S50 as codebook indices or in another quantized form. Highband encoder A200 is configured to encode highband signal S30 according to information in encoded narrowband excitation signal S50 to produce highband coding parameters S60. As described in further detail herein, highband encoder A200 is typically configured to produce highband coding parameters S60 as codebook indices or in another quantized form. One particular example of wideband speech encoder A100 is configured to encode wideband speech signal S10 at a rate of about 8.55 kbps (kilobits per second), with about 7.55 kbps being used for narrowband filter parameters S40 and encoded narrowband excitation signal S50, and about 1 kbps being used for highband coding parameters S60.

Figure 1B:
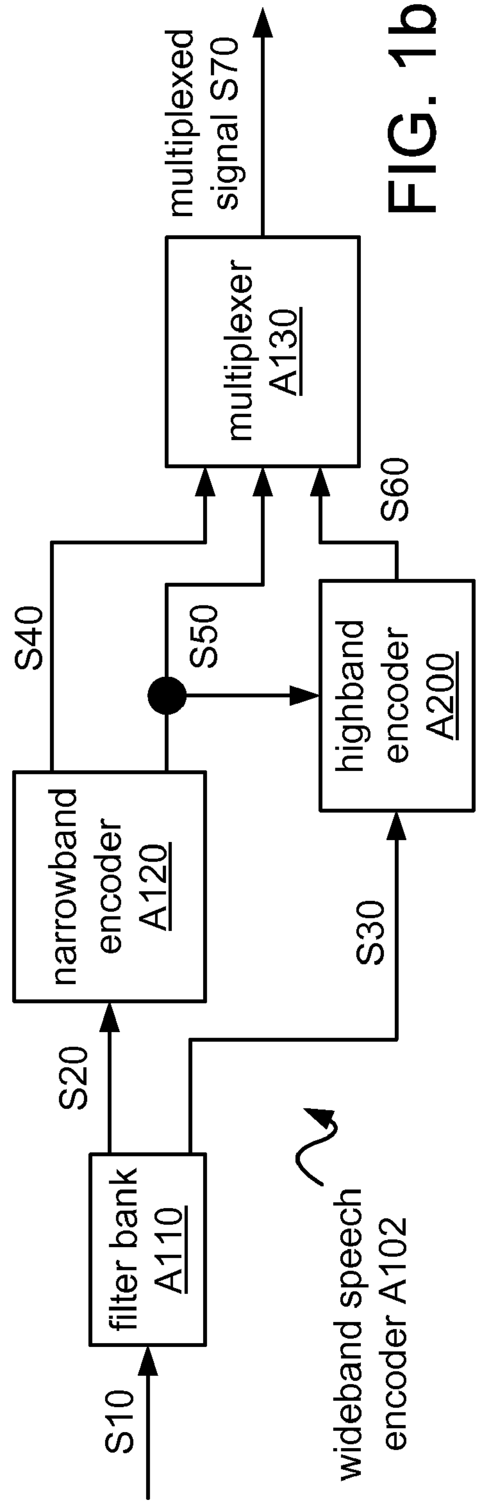
FIG. 1*b* shows a block diagram of an implementation A102 of wideband speech encoder A100.

It may be desired to combine the encoded narrowband and highband signals into a single bitstream. For example, it may be desired to multiplex the encoded signals together for transmission (e.g., over a wired, optical, or wireless transmission channel), or for storage, as an encoded wideband speech signal. FIG. 1*b* shows a block diagram of an implementation A102 of wideband speech encoder A100 that includes a multiplexer A130 configured to combine narrowband filter parameters S40, encoded narrowband excitation signal S50, and highband filter parameters S60 into a multiplexed signal S70.

An apparatus including encoder A102 may also include circuitry configured to transmit multiplexed signal S70 into a transmission channel such as a wired, optical, or wireless channel. Such an apparatus may also be configured to perform one or more channel encoding operations on the signal, such as error correction encoding (e.g., rate-compatible convolutional encoding) and/or error detection encoding (e.g., cyclic redundancy encoding), and/or one or more layers of network protocol encoding (e.g., Ethernet, TCP/IP, cdma2000).

It may be desirable for multiplexer A130 to be configured to embed the encoded narrowband signal (including narrowband filter parameters S40 and encoded narrowband excitation signal S50) as a separable substream of multiplexed signal S70, such that the encoded narrowband signal may be recovered and decoded independently of another portion of multiplexed signal S70 such as a highband and/or lowband signal. For example, multiplexed signal S70 may be arranged such that the encoded narrowband signal may be recovered by stripping away the highband filter parameters S60. One potential advantage of such a feature is to avoid the need for transcoding the encoded wideband signal before passing it to a system that supports decoding of the narrowband signal but does not support decoding of the highband portion.

Figure 2A:
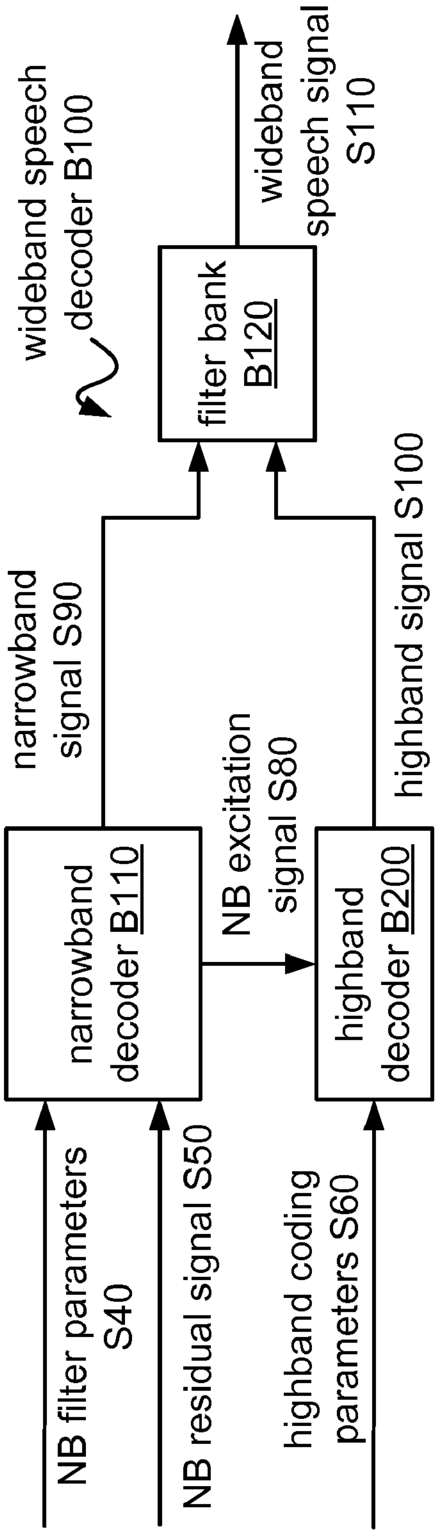
FIG. 2*a* shows a block diagram of a wideband speech decoder B100 according to an configuration.

FIG. 2*a* is a block diagram of a wideband speech decoder B100 according to an configuration. Narrowband decoder B110 is configured to decode narrowband filter parameters S40 and encoded narrowband excitation signal S50 to produce a narrowband signal S90. Highband decoder B200 is configured to decode highband coding parameters S60 according to a narrowband excitation signal S80, based on encoded narrowband excitation signal S50, to produce a highband signal S100. In this example, narrowband decoder B110 is configured to provide narrowband excitation signal S80 to highband decoder B200. Filter bank B120 is configured to combine narrowband signal S90 and highband signal S100 to produce a wideband speech signal S110.

Figure 2B:
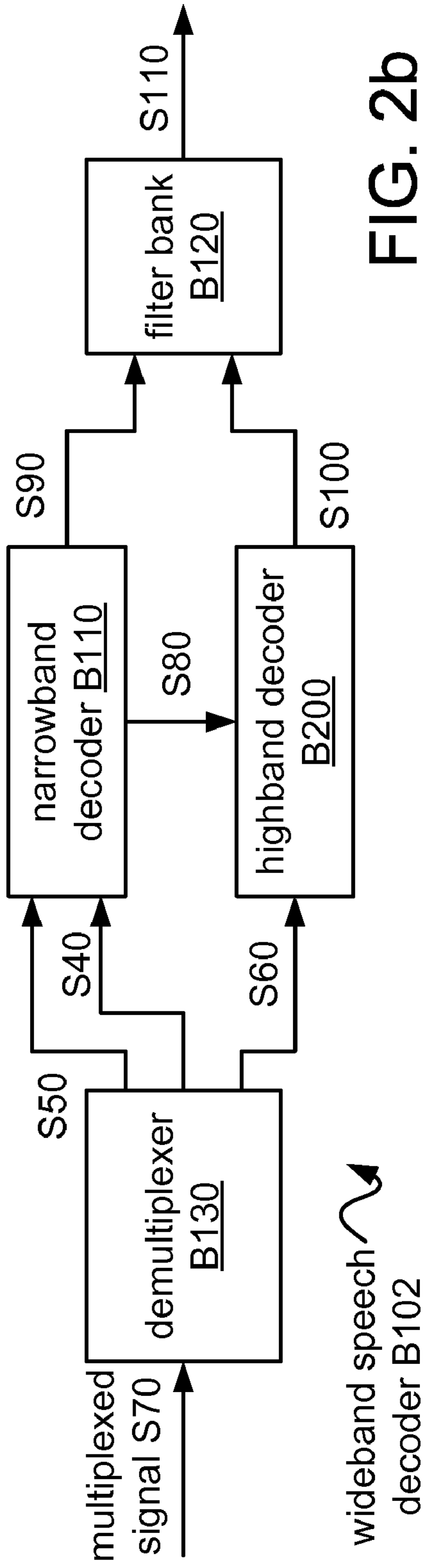
FIG. 2*b* shows a block diagram of an implementation B102 of wideband speech encoder B100.

FIG. 2*b* is a block diagram of an implementation B102 of wideband speech decoder B100 that includes a demultiplexer B130 configured to produce encoded signals S40, S50, and S60 from multiplexed signal S70. An apparatus including decoder B102 may include circuitry configured to receive multiplexed signal S70 from a transmission channel such as a wired, optical, or wireless channel. Such an apparatus may also be configured to perform one or more channel decoding operations on the signal, such as error correction decoding (e.g., rate-compatible convolutional decoding) and/or error detection decoding (e.g., cyclic redundancy decoding), and/or one or more layers of network protocol decoding (e.g., Ethernet, TCP/IP, cdma2000).

Filter bank A110 is configured to filter an input signal according to a split-band scheme to produce a low-frequency subband and a high-frequency subband. Depending on the design criteria for the particular application, the output subbands may have equal or unequal bandwidths and may be overlapping or nonoverlapping. A configuration of filter bank A110 that produces more than two subbands is also possible. For example, such a filter bank may be configured to produce one or more lowband signals that include components in a frequency range below that of narrowband signal S20 (such as the range of 50-300 Hz). It is also possible for such a filter bank to be configured to produce one or more additional highband signals that include components in a frequency range above that of highband signal S30 (such as a range of 14-20, 16-20, or 16-32 kHz). In such case, wideband speech encoder A100 may be implemented to encode this signal or signals separately, and multiplexer A130 may be configured to include the additional encoded signal or signals in multiplexed signal S70 (e.g., as a separable portion).

Figure 3A:
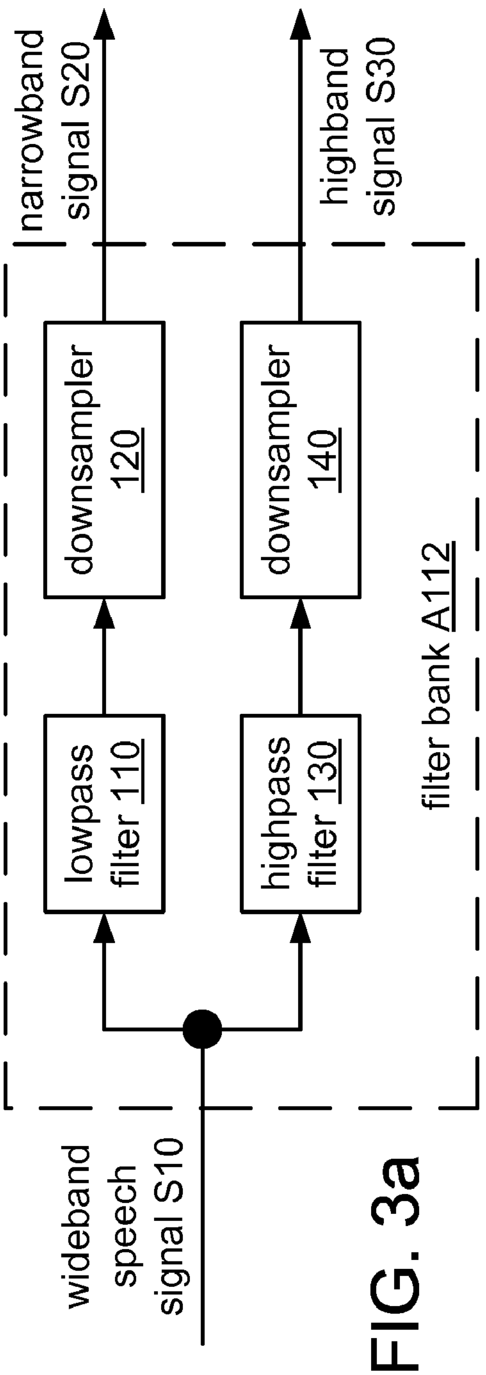
FIG. 3*a* shows a block diagram of an implementation A112 of filter bank A110.

FIG. 3*a* shows a block diagram of an implementation A112 of filter bank A110 that is configured to produce two subband signals having reduced sampling rates. Filter bank A110 is arranged to receive a wideband speech signal S10 having a high-frequency (or highband) portion and a low-frequency (or lowband) portion. Filter bank A112 includes a lowband processing path configured to receive wideband speech signal S10 and to produce narrowband speech signal S20, and a highband processing path configured to receive wideband speech signal S10 and to produce highband speech signal S30. Lowpass filter 110 filters wideband speech signal S10 to pass a selected low-frequency subband, and highpass filter 130 filters wideband speech signal S10 to pass a selected high-frequency subband. Because both subband signals have more narrow bandwidths than wideband speech signal S10, their sampling rates can be reduced to some extent without loss of information. Downsampler 120 reduces the sampling rate of the lowpass signal according to a desired decimation factor (e.g., by removing samples of the signal and/or replacing samples with average values), and downsampler 140 likewise reduces the sampling rate of the highpass signal according to another desired decimation factor.

Figure 3B:
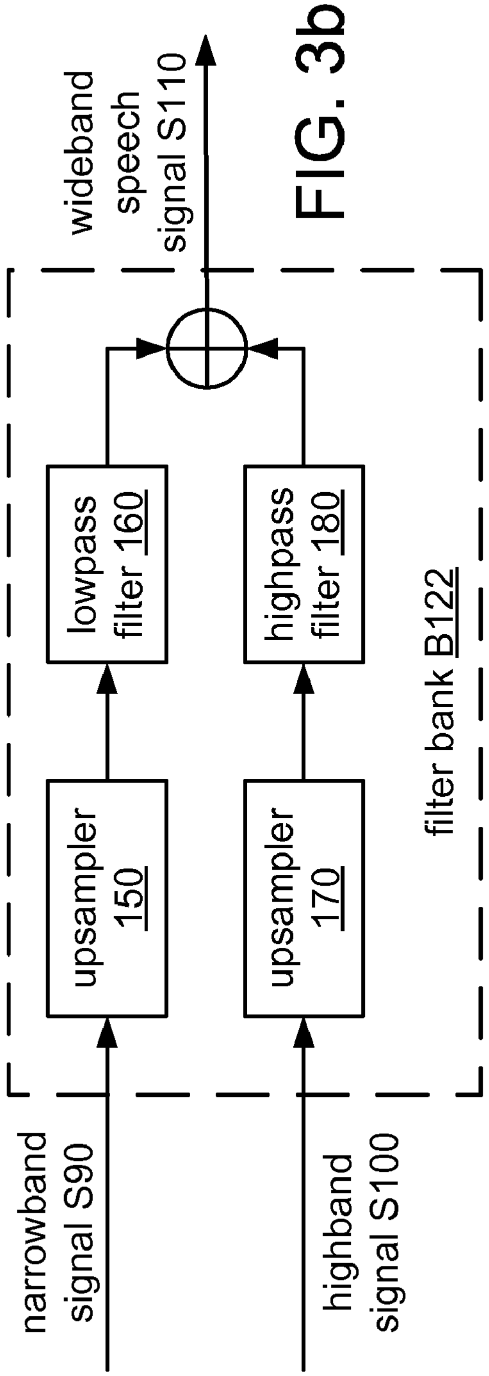
FIG. 3*b* shows a block diagram of an implementation B122 of filter bank B120.

FIG. 3*b* shows a block diagram of a corresponding implementation B122 of filter bank B120. Upsampler 150 increases the sampling rate of narrowband signal S90 (e.g., by zero-stuffing and/or by duplicating samples), and lowpass filter 160 filters the upsampled signal to pass a lowband portion (e.g., to prevent aliasing). Likewise, upsampler 170 increases the sampling rate of highband signal S100 and highpass filter 180 filters the upsampled signal to pass a highband portion. The two passband signals are then summed to form wideband speech signal S110. In some implementations of decoder B100, filter bank B120 is configured to produce a weighted sum of the two passband signals according to one or more weights received and/or calculated by highband decoder B200. A configuration of filter bank B120 that combines more than two passband signals is also contemplated.

Each of the filters 110, 130, 160, 180 may be implemented as a finite-impulse-response (FIR) filter or as an infinite-impulse-response (IIR) filter. The frequency responses of encoder filters 110 and 130 may have symmetric or dissimilarly shaped transition regions between stopband and passband. Likewise, the frequency responses of decoder filters 160 and 180 may have symmetric or dissimilarly shaped transition regions between stopband and passband. It may be desirable for lowpass filter 110 to have the same response as lowpass filter 160, and for highpass filter 130 to have the same response as highpass filter 180. In one example, the two filter pairs 110, 130 and 160, 180 are quadrature mirror filter (QMF) banks, with filter pair 110, 130 having the same coefficients as filter pair 160, 180.

Figure 4A:
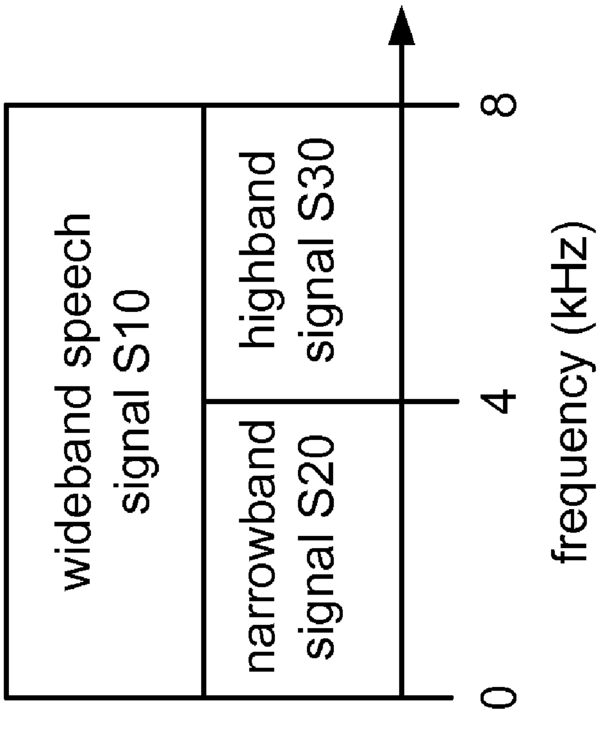
FIG. 4*a* shows bandwidth coverage of the low and high bands for one example of filter bank A110.
Figure 4B:
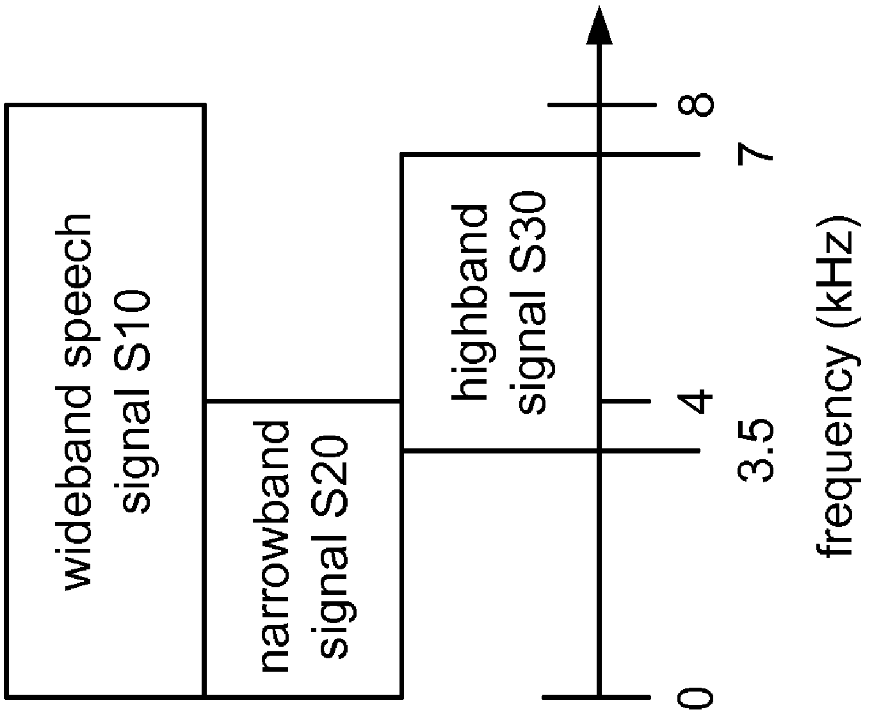
FIG. 4*b* shows bandwidth coverage of the low and high bands for another example of filter bank A110.

In a typical example, lowpass filter 110 has a passband that includes the limited PSTN range of 300-3400 Hz (e.g., the band from 0 to 4 kHz). FIGS. 4*a* and 4*b* show relative bandwidths of wideband speech signal S10, narrowband signal S20, and highband signal S30 in two different implementational examples. In both of these particular examples, wideband speech signal S10 has a sampling rate of 16 kHz (representing frequency components within the range of 0 to 8 kHz), and narrowband signal S20 has a sampling rate of 8 kHz (representing frequency components within the range of 0 to 4 kHz).

In the example of FIG. 4*a*, there is no significant overlap between the two subbands. A highband signal S30 as shown in this example may be obtained using a highpass filter 130 with a passband of 4-8 kHz. In such a case, it may be desirable to reduce the sampling rate to 8 kHz by downsampling the filtered signal by a factor of two. Such an operation, which may be expected to significantly reduce the computational complexity of further processing operations on the signal, will move the passband energy down to the range of 0 to 4 kHz without loss of information.

In the alternative example of FIG. 4*b*, the upper and lower subbands have an appreciable overlap, such that the region of 3.5 to 4 kHz is described by both subband signals. A highband signal S30 as in this example may be obtained using a highpass filter 130 with a passband of 3.5-7 kHz. In such a case, it may be desirable to reduce the sampling rate to 7 kHz by downsampling the filtered signal by a factor of 16/7. Such an operation, which may be expected to significantly reduce the computational complexity of further processing operations on the signal, will move the passband energy down to the range of 0 to 3.5 kHz without loss of information.

In a typical handset for telephonic communication, one or more of the transducers (i.e., the microphone and the earpiece or loudspeaker) lacks an appreciable response over the frequency range of 7-8 kHz. In the example of FIG. 4*b*, the portion of wideband speech signal S10 between 7 and 8 kHz is not included in the encoded signal. Other particular examples of highpass filter 130 have passbands of 3.5-7.5 kHz and 3.5-8 kHz.

In some implementations, providing an overlap between subbands as in the example of FIG. 4*b* allows for the use of a lowpass and/or a highpass filter having a smooth rolloff over the overlapped region. Such filters are typically easier to design, less computationally complex, and/or introduce less delay than filters with sharper or "brick-wall" responses. Filters having sharp transition regions tend to have higher sidelobes (which may cause aliasing) than filters of similar order that have smooth rolloffs. Filters having sharp transition regions may also have long impulse responses which may cause ringing artifacts. For filter bank implementations having one or more IIR filters, allowing for a smooth rolloff over the overlapped region may enable the use of a filter or filters whose poles are farther away from the unit circle, which may be important to ensure a stable fixed-point implementation.

Overlapping of subbands allows a smooth blending of lowband and highband that may lead to fewer audible artifacts, reduced aliasing, and/or a less noticeable transition from one band to the other. Moreover, the coding efficiency of narrowband encoder A120 (for example, a waveform coder) may drop with increasing frequency. For example, coding quality of the narrowband coder may be reduced at low bit rates, especially in the presence of background noise. In such cases, providing an overlap of the subbands may increase the quality of reproduced frequency components in the overlapped region.

Moreover, overlapping of subbands allows a smooth blending of lowband and highband that may lead to fewer audible artifacts, reduced aliasing, and/or a less noticeable transition from one band to the other. Such a feature may be especially desirable for an implementation in which narrowband encoder A120 and highband encoder A200 operate according to different coding methodologies. For example, different coding techniques may produce signals that sound quite different. A coder that encodes a spectral envelope in the form of codebook indices may produce a signal having a different sound than a coder that encodes the amplitude spectrum instead. A time-domain coder (e.g., a pulse-code-modulation or PCM coder) may produce a signal having a different sound than a frequency-domain coder. A coder that encodes a signal with a representation of the spectral envelope and the corresponding residual signal may produce a signal having a different sound than a coder that encodes a signal with a representation of the spectral envelope. A coder that encodes a signal as a representation of its waveform may produce an output having a different sound than that from a sinusoidal coder. In such cases, using filters having sharp transition regions to define nonoverlapping subbands may lead to an abrupt and perceptually noticeable transition between the subbands in the synthesized wideband signal.

Although QMF filter banks having complementary overlapping frequency responses are often used in subband techniques, such filters are unsuitable for at least some of the wideband coding implementations described herein. A QMF filter bank at the encoder is configured to create a significant degree of aliasing that is canceled in the corresponding QMF filter bank at the decoder. Such an arrangement may not be appropriate for an application in which the signal incurs a significant amount of distortion between the filter banks, as the distortion may reduce the effectiveness of the alias cancellation property. For example, applications described herein include coding implementations configured to operate at very low bit rates. As a consequence of the very low bit rate, the decoded signal is likely to appear significantly distorted as compared to the original signal, such that use of QMF filter banks may lead to uncanceled aliasing. Applications that use QMF filter banks typically have higher bit rates (e.g., over 12 kbps for AMR, and 64 kbps for G.722).

Additionally, a coder may be configured to produce a synthesized signal that is perceptually similar to the original signal but which actually differs significantly from the original signal. For example, a coder that derives the highband excitation from the narrowband residual as described herein may produce such a signal, as the actual highband residual may be completely absent from the decoded signal. Use of QMF filter banks in such applications may lead to a significant degree of distortion caused by uncanceled aliasing.

The amount of distortion caused by QMF aliasing may be reduced if the affected subband is narrow, as the effect of the aliasing is limited to a bandwidth equal to the width of the subband. For examples as described herein in which each subband includes about half of the wideband bandwidth, however, distortion caused by uncanceled aliasing could affect a significant part of the signal. The quality of the signal may also be affected by the location of the frequency band over which the uncanceled aliasing occurs. For example, distortion created near the center of a wideband speech signal (e.g., between 3 and 4 kHz) may be much more objectionable than distortion that occurs near an edge of the signal (e.g., above 6 kHz).

While the responses of the filters of a QMF filter bank are strictly related to one another, the lowband and highband paths of filter banks A110 and B120 may be configured to have spectra that are completely unrelated apart from the overlapping of the two subbands. We define the overlap of the two subbands as the distance from the point at which the frequency response of the highband filter drops to −20 dB up to the point at which the frequency response of the lowband filter drops to −20 dB. In various examples of filter bank A110 and/or B120, this overlap ranges from around 200 Hz to around 1 kHz. The range of about 400 to about 600 Hz may represent a desirable tradeoff between coding efficiency and perceptual smoothness. In one particular example as mentioned above, the overlap is around 500 Hz.

Figure 4C:
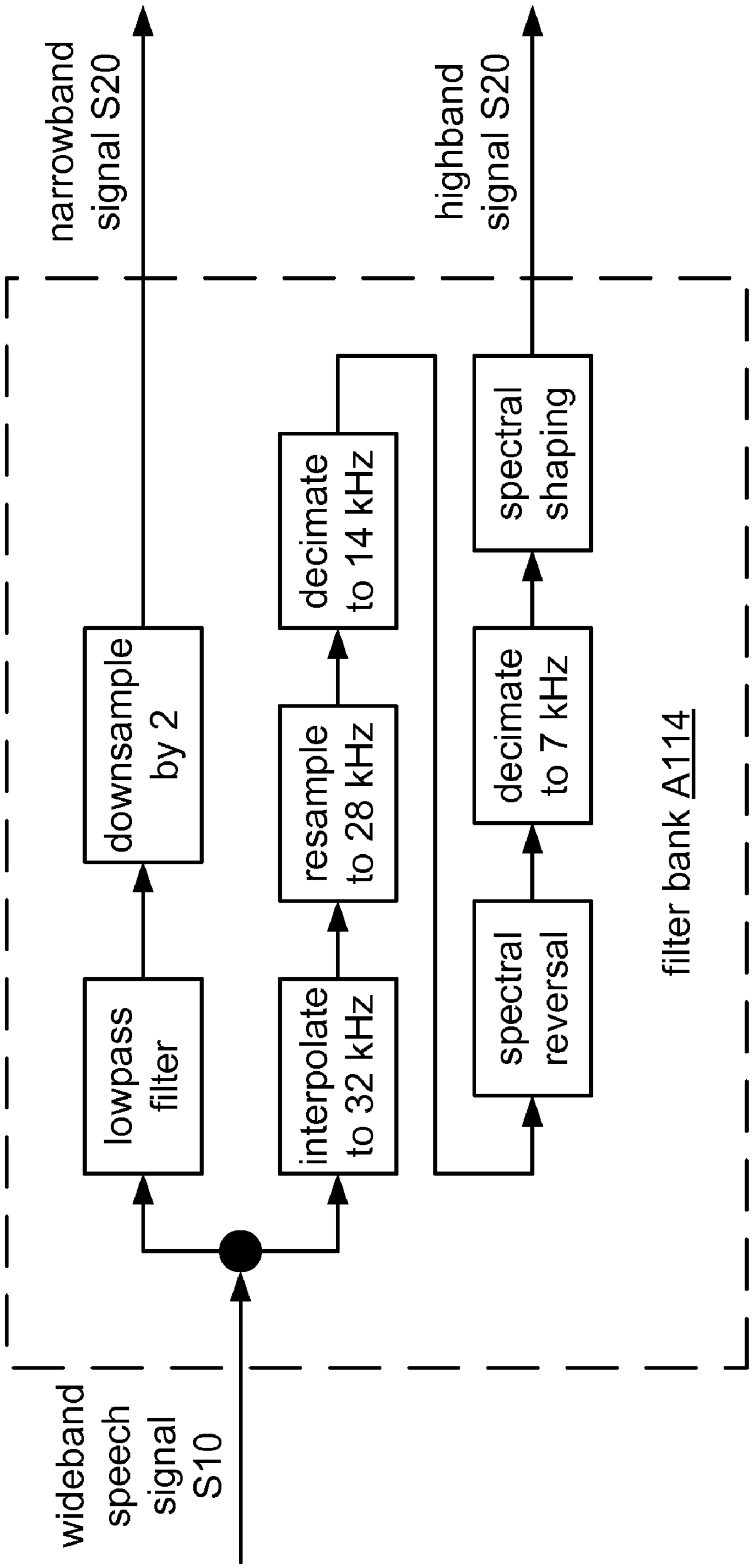
FIG. 4*c* shows a block diagram of an implementation A114 of filter bank A112.

It may be desirable to implement filter bank A112 and/or B122 to perform operations as illustrated in FIGS. 4*a* and 4*b* in several stages. For example, FIG. 4*c* shows a block diagram of an implementation A114 of filter bank A112 that performs a functional equivalent of highpass filtering and downsampling operations using a series of interpolation, resampling, decimation, and other operations. Such an implementation may be easier to design and/or may allow reuse of functional blocks of logic and/or code. For example, the same functional block may be used to perform the operations of decimation to 14 kHz and decimation to 7 kHz as shown in FIG. 4*c*. The spectral reversal operation may be implemented by multiplying the signal with the function $e^{jn\pi}$ or the sequence $(-1)^n$, whose values alternate between +1 and −1. The spectral shaping operation may be implemented as a lowpass filter configured to shape the signal to obtain a desired overall filter response.

It is noted that as a consequence of the spectral reversal operation, the spectrum of highband signal S30 is reversed. Subsequent operations in the encoder and corresponding decoder may be configured accordingly. For example, highband excitation generator A300 as described herein may be configured to produce a highband excitation signal S120 that also has a spectrally reversed form.

Figure 4D:
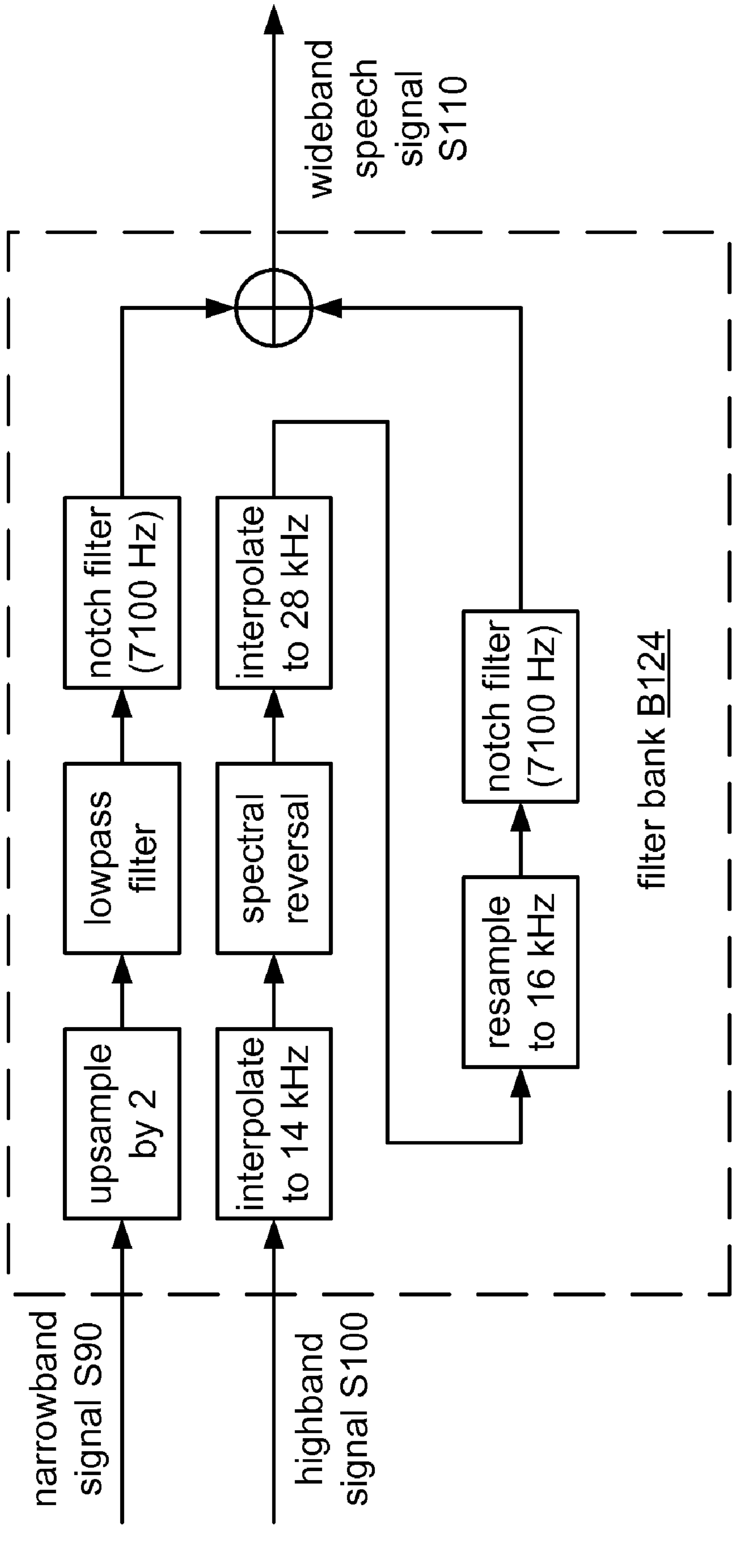
FIG. 4*d* shows a block diagram of an implementation B124 of filter bank B122.

FIG. 4*d* shows a block diagram of an implementation B124 of filter bank B122 that performs a functional equivalent of upsampling and highpass filtering operations using a series of interpolation, resampling, and other operations. Filter bank B124 includes a spectral reversal operation in the highband that reverses a similar operation as performed, for example, in a filter bank of the encoder such as filter bank A114. In this particular example, filter bank B124 also includes notch filters in the lowband and highband that attenuate a component of the signal at 7100 Hz, although such filters are optional and need not be included.

Narrowband encoder A120 is implemented according to a source-filter model that encodes the input speech signal as (A) a set of parameters that describe a filter and (B) an excitation signal that drives the described filter to produce a synthesized reproduction of the input speech signal. FIG. 5*a* shows an example of a spectral envelope of a speech signal. The peaks that characterize this spectral envelope represent resonances of the vocal tract and are called formants. Most speech coders encode at least this coarse spectral structure as a set of parameters such as filter coefficients.

FIG. 5*b* shows an example of a basic source-filter arrangement as applied to coding of the spectral envelope of narrowband signal S20. An analysis module calculates a set of parameters that characterize a filter corresponding to the speech sound over a period of time (typically 20 msec). A whitening filter (also called an analysis or prediction error filter) configured according to those filter parameters removes the spectral envelope to spectrally flatten the signal. The resulting whitened signal (also called a residual) has less energy and thus less variance and is easier to encode than the original speech signal. Errors resulting from coding of the residual signal may also be spread more evenly over the spectrum. The filter parameters and residual are typically quantized for efficient transmission over the channel. At the decoder, a synthesis filter configured according to the filter parameters is excited by a signal based on the residual to produce a synthesized version of the original speech sound. The synthesis filter is typically configured to have a transfer function that is the inverse of the transfer function of the whitening filter.

Figure 6:
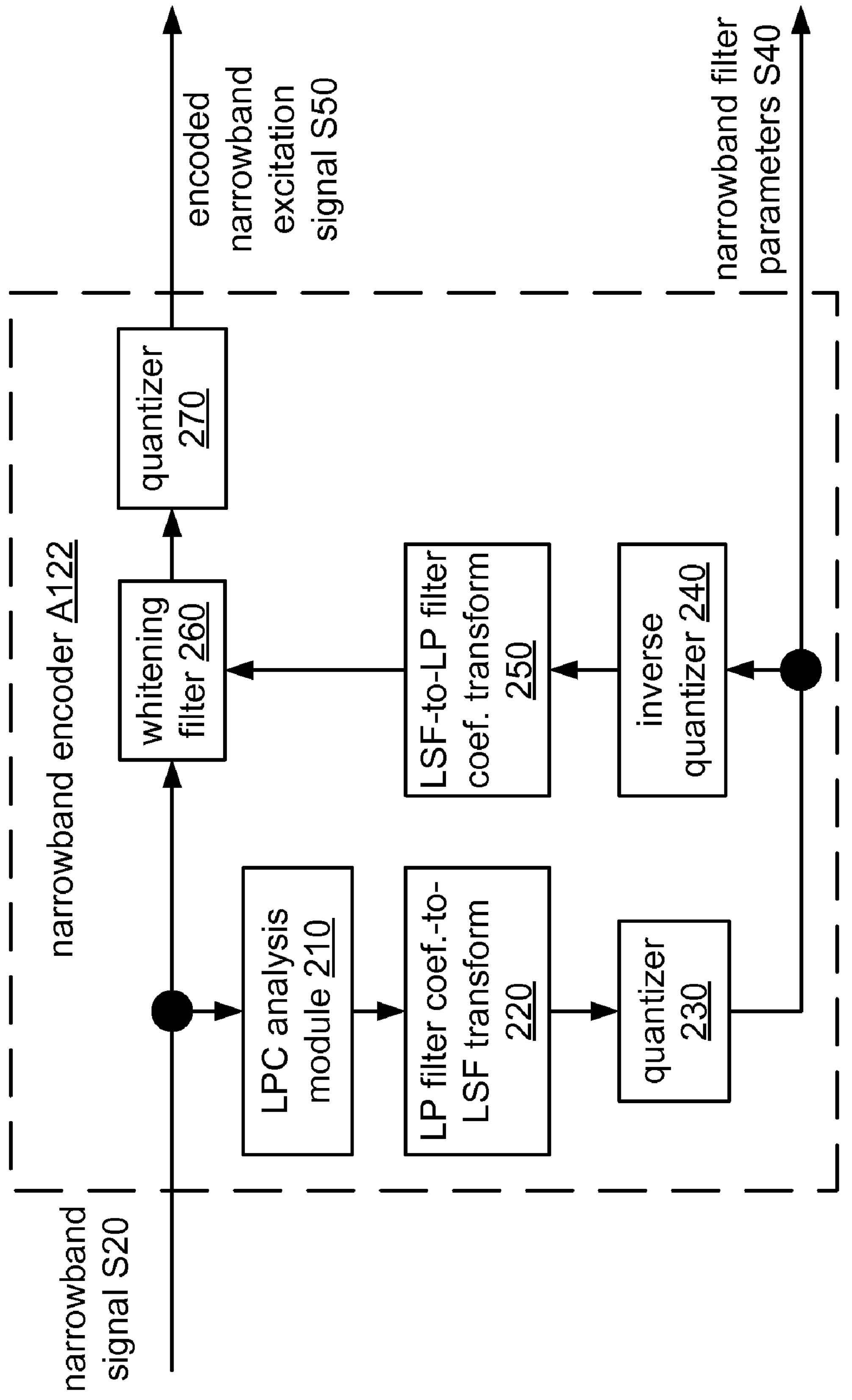
FIG. 6 shows a block diagram of an implementation A122 of narrowband encoder A120.

FIG. 6 shows a block diagram of a basic implementation A122 of narrowband encoder A120. In this example, a linear prediction coding (LPC) analysis module 210 encodes the spectral envelope of narrowband signal S20 as a set of linear prediction (LP) coefficients (e.g., coefficients of an all-pole filter 1/A(z)). The analysis module typically processes the input signal as a series of nonoverlapping frames, with a new set of coefficients being calculated for each frame. The frame period is generally a period over which the signal may be expected to be locally stationary; one example is 20 milliseconds (equivalent to 160 samples at a sampling rate of 8 kHz). In one example, LPC analysis module 210 is configured to calculate a set of ten LP filter coefficients to characterize the formant structure of each 20-millisecond frame. It is also possible to implement the analysis module to process the input signal as a series of overlapping frames.

The analysis module may be configured to analyze the samples of each frame directly, or the samples may be weighted first according to a windowing function (for example, a Hamming window). The analysis may also be performed over a window that is larger than the frame, such as a 30-msec window. This window may be symmetric (e.g. 5-20-5, such that it includes the 5 milliseconds immediately before and after the 20-millisecond frame) or asymmetric (e.g. 10-20, such that it includes the last 10 milliseconds of the preceding frame). An LPC analysis module is typically configured to calculate the LP filter coefficients using a Levinson-Durbin recursion or the Leroux-Gueguen algorithm. In another implementation, the analysis module may be configured to calculate a set of cepstral coefficients for each frame instead of a set of LP filter coefficients.

The output rate of encoder A120 may be reduced significantly, with relatively little effect on reproduction quality, by quantizing the filter parameters. Linear prediction filter coefficients are difficult to quantize efficiently and are usually mapped into another representation, such as line spectral pairs (LSPs) or line spectral frequencies (LSFs), for quantization and/or entropy encoding. In the example of FIG. 6, LP filter coefficient-to-LSF transform 220 transforms the set of LP filter coefficients into a corresponding set of LSFs. Other one-to-one representations of LP filter coefficients include parcor coefficients; log-area-ratio values; immittance spectral pairs (ISPs); and immittance spectral frequencies (ISFs), which are used in the GSM (Global System for Mobile Communications) AMR-WB (Adaptive Multirate-Wideband) codec. Typically a transform between a set of LP filter coefficients and a corresponding set of LSFs is reversible, but configurations also include implementations of encoder A120 in which the transform is not reversible without error.

Quantizer 230 is configured to quantize the set of narrowband LSFs (or other coefficient representation), and narrowband encoder A122 is configured to output the result of this quantization as the narrowband filter parameters S40. Such a quantizer typically includes a vector quantizer that encodes the input vector as an index to a corresponding vector entry in a table or codebook.

As seen in FIG. 6, narrowband encoder A122 also generates a residual signal by passing narrowband signal S20 through a whitening filter 260 (also called an analysis or prediction error filter) that is configured according to the set of filter coefficients. In this particular example, whitening filter 260 is implemented as a FIR filter, although IIR implementations may also be used. This residual signal will typically contain perceptually important information of the speech frame, such as long-term structure relating to pitch, that is not represented in narrowband filter parameters S40. Quantizer 270 is configured to calculate a quantized representation of this residual signal for output as encoded narrowband excitation signal S50. Such a quantizer typically includes a vector quantizer that encodes the input vector as an index to a corresponding vector entry in a table or codebook. Alternatively, such a quantizer may be configured to send one or more parameters from which the vector may be generated dynamically at the decoder, rather than retrieved from storage, as in a sparse codebook method. Such a method is used in coding schemes such as algebraic CELP (codebook excitation linear prediction) and codecs such as 3GPP2 (Third Generation Partnership 2) EVRC (Enhanced Variable Rate Codec).

It is desirable for narrowband encoder A120 to generate the encoded narrowband excitation signal according to the same filter parameter values that will be available to the corresponding narrowband decoder. In this manner, the resulting encoded narrowband excitation signal may already account to some extent for nonidealities in those parameter values, such as quantization error. Accordingly, it is desirable to configure the whitening filter using the same coefficient values that will be available at the decoder. In the basic example of encoder A122 as shown in FIG. 6, inverse quantizer 240 dequantizes narrowband coding parameters S40, LSF-to-LP filter coefficient transform 250 maps the resulting values back to a corresponding set of LP filter coefficients, and this set of coefficients is used to configure whitening filter 260 to generate the residual signal that is quantized by quantizer 270.

Some implementations of narrowband encoder A120 are configured to calculate encoded narrowband excitation signal S50 by identifying one among a set of codebook vectors that best matches the residual signal. It is noted, however, that narrowband encoder A120 may also be implemented to calculate a quantized representation of the residual signal without actually generating the residual signal. For example, narrowband encoder A120 may be configured to use a number of codebook vectors to generate corresponding synthesized signals (e.g., according to a current set of filter parameters), and to select the codebook vector associated with the generated signal that best matches the original narrowband signal S20 in a perceptually weighted domain.

Figure 7:
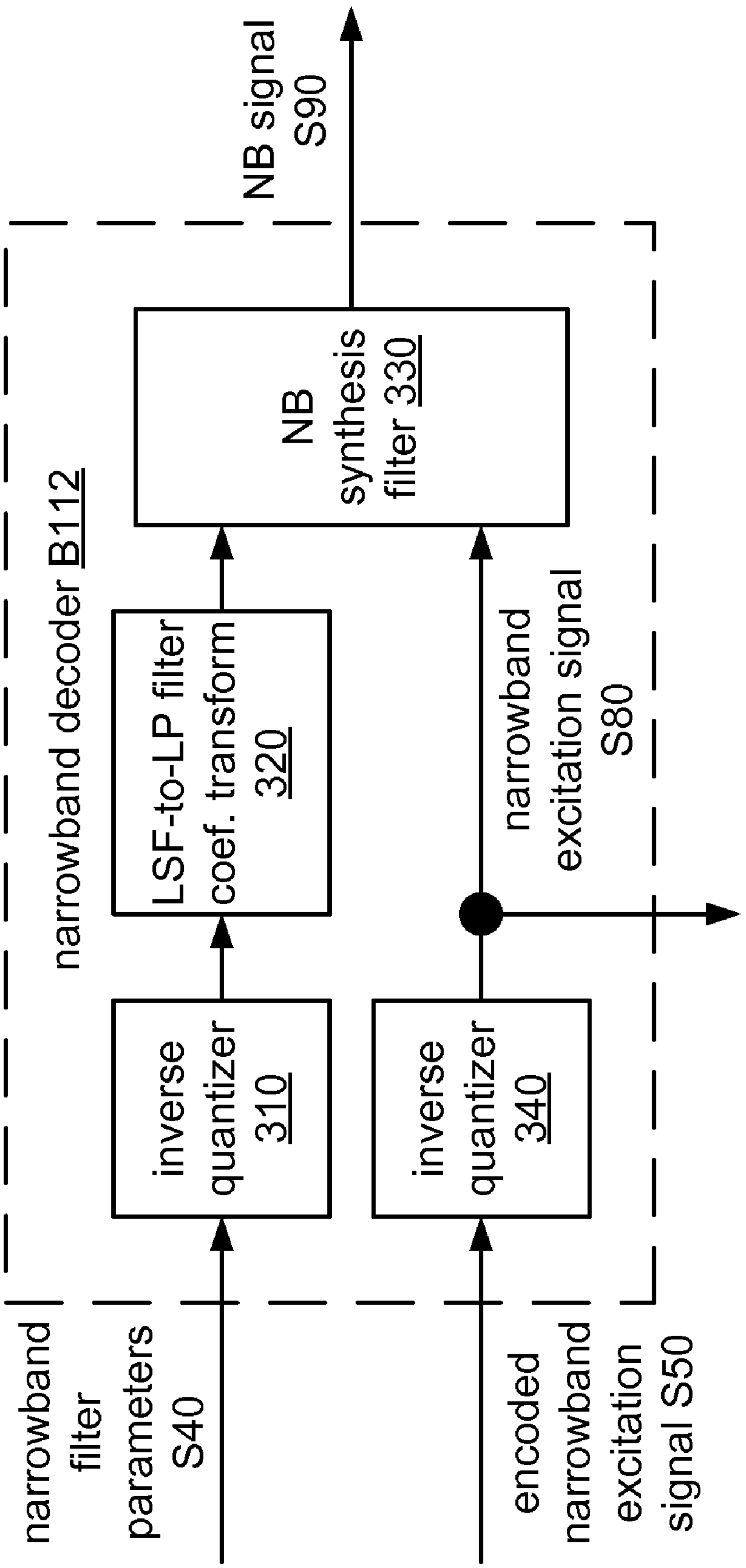
FIG. 7 shows a block diagram of an implementation B112 of narrowband decoder B110.

FIG. 7 shows a block diagram of an implementation B112 of narrowband decoder B110. Inverse quantizer 310 dequantizes narrowband filter parameters S40 (in this case, to a set of LSFs), and LSF-to-LP filter coefficient transform 320 transforms the LSFs into a set of filter coefficients (for example, as described above with reference to inverse quantizer 240 and transform 250 of narrowband encoder A122). Inverse quantizer 340 dequantizes narrowband residual signal S40 to produce a narrowband excitation signal S80. Based on the filter coefficients and narrowband excitation signal S80, narrowband synthesis filter 330 synthesizes narrowband signal S90. In other words, narrowband synthesis filter 330 is configured to spectrally shape narrowband excitation signal S80 according to the dequantized filter coefficients to produce narrowband signal S90. Narrowband decoder B112 also provides narrowband excitation signal S80 to highband encoder A200, which uses it to derive the highband excitation signal S120 as described herein. In some implementations as described below, narrowband decoder B110 may be configured to provide additional information to highband decoder B200 that relates to the narrowband signal, such as spectral tilt, pitch gain and lag, and speech mode.

The system of narrowband encoder A122 and narrowband decoder B112 is a basic example of an analysis-by-synthesis speech codec. Codebook excitation linear prediction (CELP) coding is one popular family of analysis-by-synthesis coding, and implementations of such coders may perform waveform encoding of the residual, including such operations as selection of entries from fixed and adaptive codebooks, error minimization operations, and/or perceptual weighting operations. Other implementations of analysis-by-synthesis coding include mixed excitation linear prediction (MELP), algebraic CELP (ACELP), relaxation CELP (RCELP), regular pulse excitation (RPE), multi-pulse CELP (MPE), and vector-sum excited linear prediction (VSELP) coding. Related coding methods include multi-band excitation (MBE) and prototype waveform interpolation (PWI) coding. Examples of standardized analysis-by-synthesis speech codecs include the ETSI (European Telecommunications Standards Institute)-GSM full rate codec (GSM 06.10), which uses residual excited linear prediction (RELP); the GSM enhanced full rate codec (ETSI-GSM 06.60); the ITU (International Telecommunication Union) standard 11.8 kb/s G.729 Annex E coder; the IS (Interim Standard)-641 codecs for IS-136 (a time-division multiple access scheme); the GSM adaptive multirate (GSM-AMR) codecs; and the 4GVTM (Fourth-Generation Vocoder™) codec (QUALCOMM Incorporated, San Diego, Calif.). Narrowband encoder A120 and corresponding decoder B110 may be implemented according to any of these technologies, or any other speech coding technology (whether known or to be developed) that represents a speech signal as (A) a set of parameters that describe a filter and (B) an excitation signal used to drive the described filter to reproduce the speech signal.

Figure 8A:
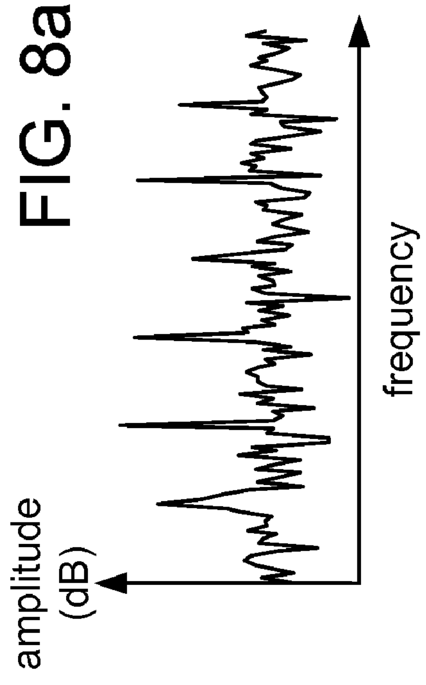
FIG. 8*a* shows an example of a plot of frequency vs. log amplitude for a residual signal for voiced speech.
Figure 8B:
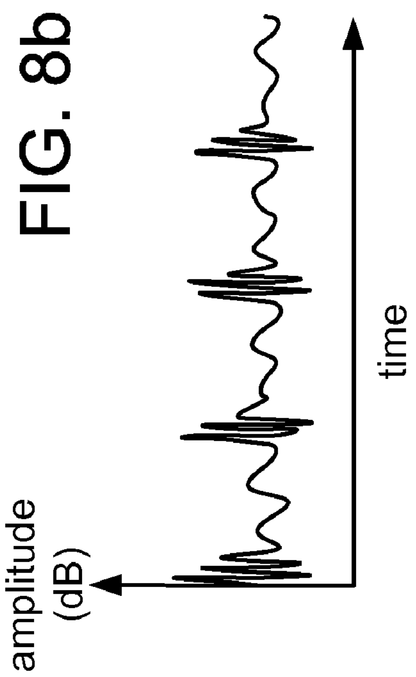
FIG. 8*b* shows an example of a plot of time vs. log amplitude for a residual signal for voiced speech.

Even after the whitening filter has removed the coarse spectral envelope from narrowband signal S20, a considerable amount of fine harmonic structure may remain, especially for voiced speech. FIG. 8*a* shows a spectral plot of one example of a residual signal, as may be produced by a whitening filter, for a voiced signal such as a vowel. The periodic structure visible in this example is related to pitch, and different voiced sounds spoken by the same speaker may have different formant structures but similar pitch structures. FIG. 8*b* shows a time-domain plot of an example of such a residual signal that shows a sequence of pitch pulses in time.

Coding efficiency and/or speech quality may be increased by using one or more parameter values to encode characteristics of the pitch structure. One important characteristic of the pitch structure is the frequency of the first harmonic (also called the fundamental frequency), which is typically in the range of 60 to 400 Hz. This characteristic is typically encoded as the inverse of the fundamental frequency, also called the pitch lag. The pitch lag indicates the number of samples in one pitch period and may be encoded as one or more codebook indices. Speech signals from male speakers tend to have larger pitch lags than speech signals from female speakers.

Another signal characteristic relating to the pitch structure is periodicity, which indicates the strength of the harmonic structure or, in other words, the degree to which the signal is harmonic or nonharmonic. Two typical indicators of periodicity are zero crossings and normalized autocorrelation functions (NACFs). Periodicity may also be indicated by the pitch gain, which is encoded as a codebook gain (e.g., a quantized adaptive codebook gain).

Figure 9:
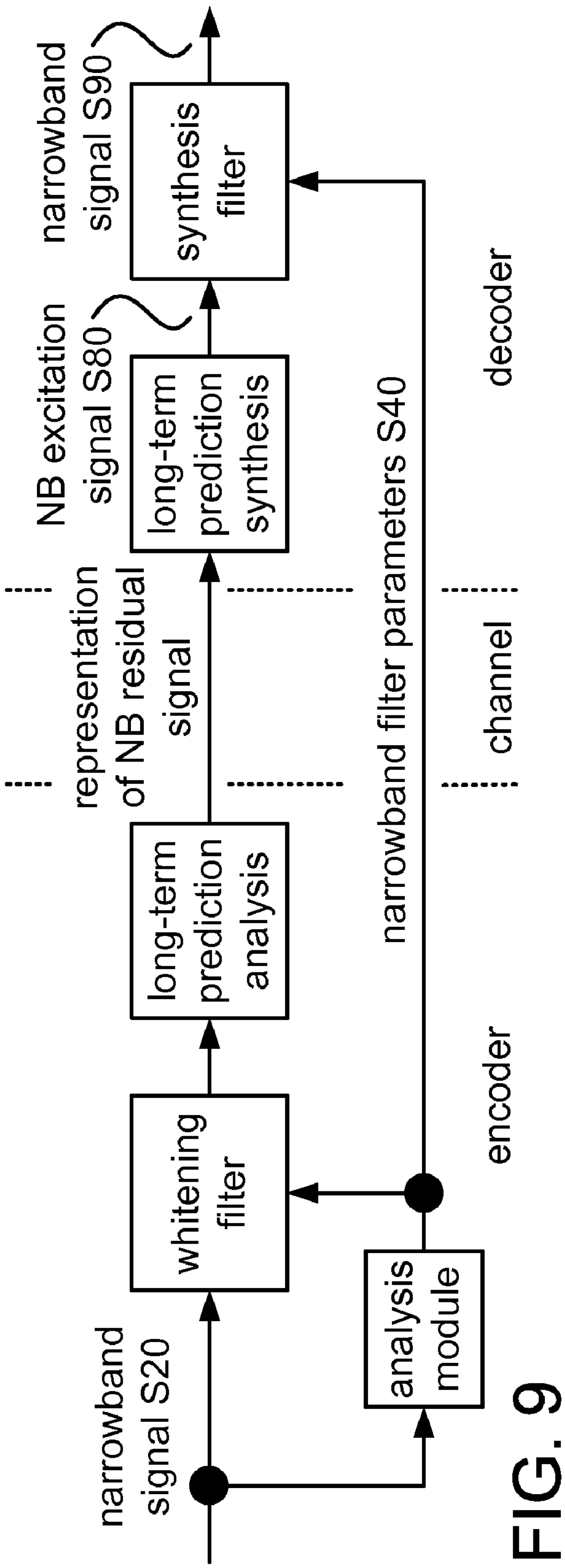
FIG. 9 shows a block diagram of a basic linear prediction coding system that also performs long-term prediction.

Narrowband encoder A120 may include one or more modules configured to encode the long-term harmonic structure of narrowband signal S20. As shown in FIG. 9, one typical CELP paradigm that may be used includes an open-loop LPC analysis module, which encodes the short-term characteristics or coarse spectral envelope, followed by a closed-loop long-term prediction analysis stage, which encodes the fine pitch or harmonic structure. The short-term characteristics are encoded as filter coefficients, and the long-term characteristics are encoded as values for parameters such as pitch lag and pitch gain. For example, narrowband encoder A120 may be configured to output encoded narrowband excitation signal S50 in a form that includes one or more codebook indices (e.g., a fixed codebook index and an adaptive codebook index) and corresponding gain values. Calculation of this quantized representation of the narrowband residual signal (e.g., by quantizer 270) may include selecting such indices and calculating such values. Encoding of the pitch structure may also include interpolation of a pitch prototype waveform, which operation may include calculating a difference between successive pitch pulses. Modeling of the long-term structure may be disabled for frames corresponding to unvoiced speech, which is typically noise-like and unstructured.

An implementation of narrowband decoder B110 according to a paradigm as shown in FIG. 9 may be configured to output narrowband excitation signal S80 to highband decoder B200 after the long-term structure (pitch or harmonic structure) has been restored. For example, such a decoder may be configured to output narrowband excitation signal S80 as a dequantized version of encoded narrowband excitation signal S50. Of course, it is also possible to implement narrowband decoder B110 such that highband decoder B200 performs dequantization of encoded narrowband excitation signal S50 to obtain narrowband excitation signal S80.

In an implementation of wideband speech encoder A100 according to a paradigm as shown in FIG. 9, highband encoder A200 may be configured to receive the narrowband excitation signal as produced by the short-term analysis or whitening filter. In other words, narrowband encoder A120 may be configured to output the narrowband excitation signal to highband encoder A200 before encoding the long-term structure. It is desirable, however, for highband encoder A200 to receive from the narrowband channel the same coding information that will be received by highband decoder B200, such that the coding parameters produced by highband encoder A200 may already account to some extent for non-idealities in that information. Thus it may be preferable for highband encoder A200 to reconstruct narrowband excitation signal S80 from the same parametrized and/or quantized encoded narrowband excitation signal S50 to be output by wideband speech encoder A100. One potential advantage of this approach is more accurate calculation of the highband gain factors S60*b* described below.

In addition to parameters that characterize the short-term and/or long-term structure of narrowband signal S20, narrowband encoder A120 may produce parameter values that relate to other characteristics of narrowband signal S20. These values, which may be suitably quantized for output by wideband speech encoder A100, may be included among the narrowband filter parameters S40 or outputted separately. Highband encoder A200 may also be configured to calculate highband coding parameters S60 according to one or more of these additional parameters (e.g., after dequantization). At wideband speech decoder B100, highband decoder B200 may be configured to receive the parameter values via narrowband decoder B110 (e.g., after dequantization). Alternatively, highband decoder B200 may be configured to receive (and possibly to dequantize) the parameter values directly.

In one example of additional narrowband coding parameters, narrowband encoder A120 produces values for spectral tilt and speech mode parameters for each frame. Spectral tilt relates to the shape of the spectral envelope over the passband and is typically represented by the quantized first reflection coefficient. For most voiced sounds, the spectral energy decreases with increasing frequency, such that the first reflection coefficient is negative and may approach −1. Most unvoiced sounds have a spectrum that is either flat, such that the first reflection coefficient is close to zero, or has more energy at high frequencies, such that the first reflection coefficient is positive and may approach +1.

Speech mode (also called voicing mode) indicates whether the current frame represents voiced or unvoiced speech. This parameter may have a binary value based on one or more measures of periodicity (e.g., zero crossings, NACFs, pitch gain) and/or voice activity for the frame, such as a relation between such a measure and a threshold value. In other implementations, the speech mode parameter has one or more other states to indicate modes such as silence or background noise, or a transition between silence and voiced speech.

Figure 10:
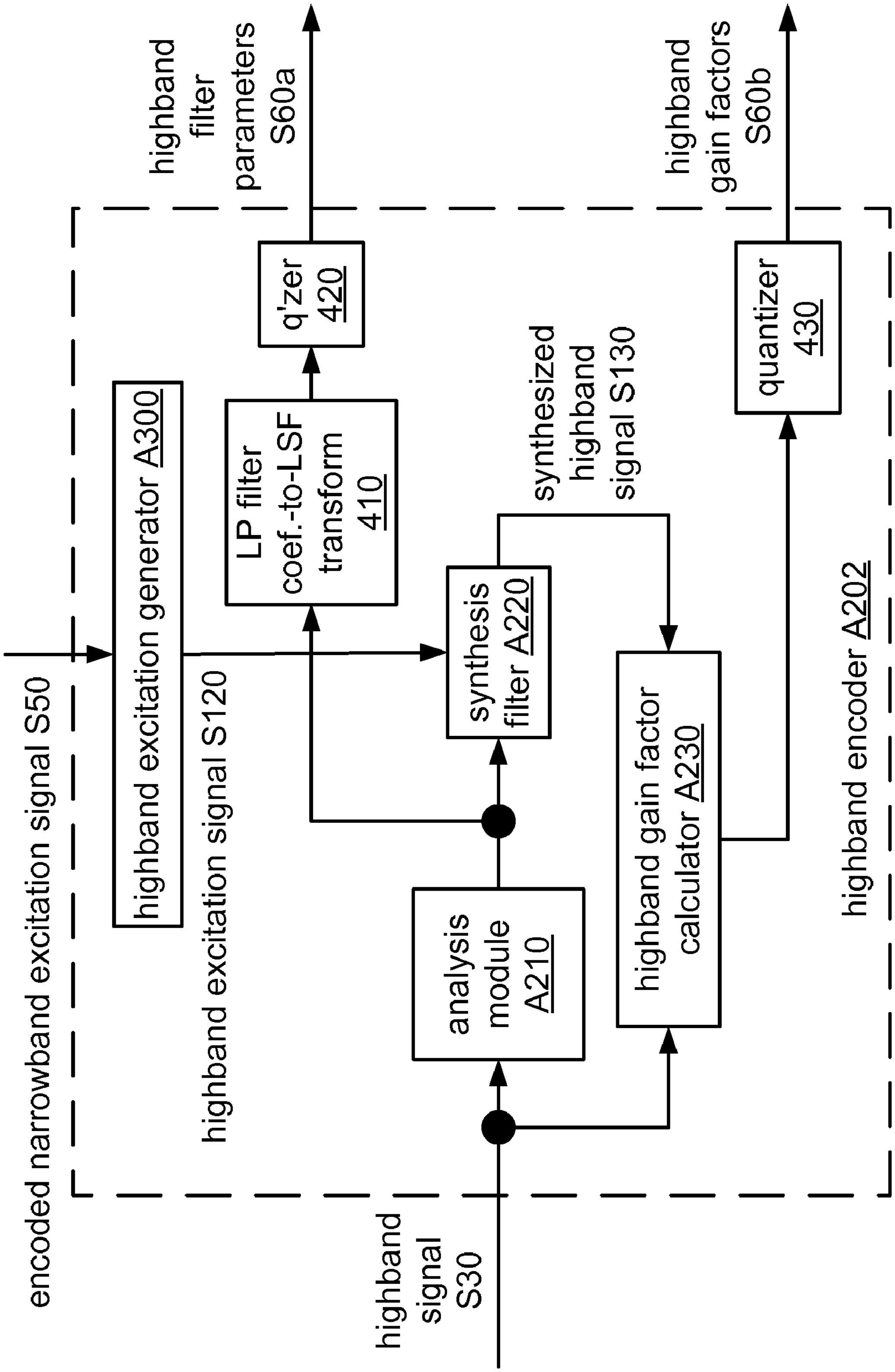
FIG. 10 shows a block diagram of an implementation A202 of highband encoder A200.

Highband encoder A200 is configured to encode highband signal S30 according to a source-filter model, with the excitation for this filter being based on the encoded narrowband excitation signal. FIG. 10 shows a block diagram of an implementation A202 of highband encoder A200 that is configured to produce a stream of highband coding parameters S60 including highband filter parameters S60*a* and highband gain factors S60*b*. Highband excitation generator A300 derives a highband excitation signal S120 from encoded narrowband excitation signal S50. Analysis module A210 produces a set of parameter values that characterize the spectral envelope of highband signal S30. In this particular example, analysis module A210 is configured to perform LPC analysis to produce a set of LP filter coefficients for each frame of highband signal S30. Linear prediction filter coefficient-to-LSF transform 410 transforms the set of LP filter coefficients into a corresponding set of LSFs. As noted above with reference to analysis module 210 and transform 220, analysis module A210 and/or transform 410 may be configured to use other coefficient sets (e.g., cepstral coefficients) and/or coefficient representations (e.g., ISPs).

Quantizer 420 is configured to quantize the set of highband LSFs (or other coefficient representation, such as ISPs), and highband encoder A202 is configured to output the result of this quantization as the highband filter parameters S60*a*. Such a quantizer typically includes a vector quantizer that encodes the input vector as an index to a corresponding vector entry in a table or codebook.

Highband encoder A202 also includes a synthesis filter A220 configured to produce a synthesized highband signal S130 according to highband excitation signal S120 and the encoded spectral envelope (e.g., the set of LP filter coefficients) produced by analysis module A210. Synthesis filter A220 is typically implemented as an IIR filter, although FIR implementations may also be used. In a particular example, synthesis filter A220 is implemented as a sixth-order linear autoregressive filter.

Highband gain factor calculator A230 calculates one or more differences between the levels of the original highband signal S30 and synthesized highband signal S130 to specify a gain envelope for the frame. Quantizer 430, which may be implemented as a vector quantizer that encodes the input vector as an index to a corresponding vector entry in a table or codebook, quantizes the value or values specifying the gain envelope, and highband encoder A202 is configured to output the result of this quantization as highband gain factors S60*b*.

In an implementation as shown in FIG. 10, synthesis filter A220 is arranged to receive the filter coefficients from analysis module A210. An alternative implementation of highband encoder A202 includes an inverse quantizer and inverse transform configured to decode the filter coefficients from highband filter parameters S60*a*, and in this case synthesis filter A220 is arranged to receive the decoded filter coefficients instead. Such an alternative arrangement may support more accurate calculation of the gain envelope by highband gain calculator A230.

In one particular example, analysis module A210 and highband gain calculator A230 output a set of six LSFs and a set of five gain values per frame, respectively, such that a wideband extension of the narrowband signal S20 may be achieved with eleven additional values per frame. The ear tends to be less sensitive to frequency errors at high frequencies, such that highband coding at a low LPC order may produce a signal having a comparable perceptual quality to narrowband coding at a higher LPC order. A typical implementation of highband encoder A200 may be configured to output 8 to 12 bits per frame for high-quality reconstruction of the spectral envelope and another 8 to 12 bits per frame for high-quality reconstruction of the temporal envelope. In another particular example, analysis module A210 outputs a set of eight LSFs per frame.

Some implementations of highband encoder A200 are configured to produce highband excitation signal S120 by generating a random noise signal having highband frequency components and amplitude-modulating the noise signal according to the time-domain envelope of narrowband signal S20, narrowband excitation signal S80, or highband signal S30. While such a noise-based method may produce adequate results for unvoiced sounds, however, it may not be desirable for voiced sounds, whose residuals are usually harmonic and consequently have some periodic structure.

Figure 11:
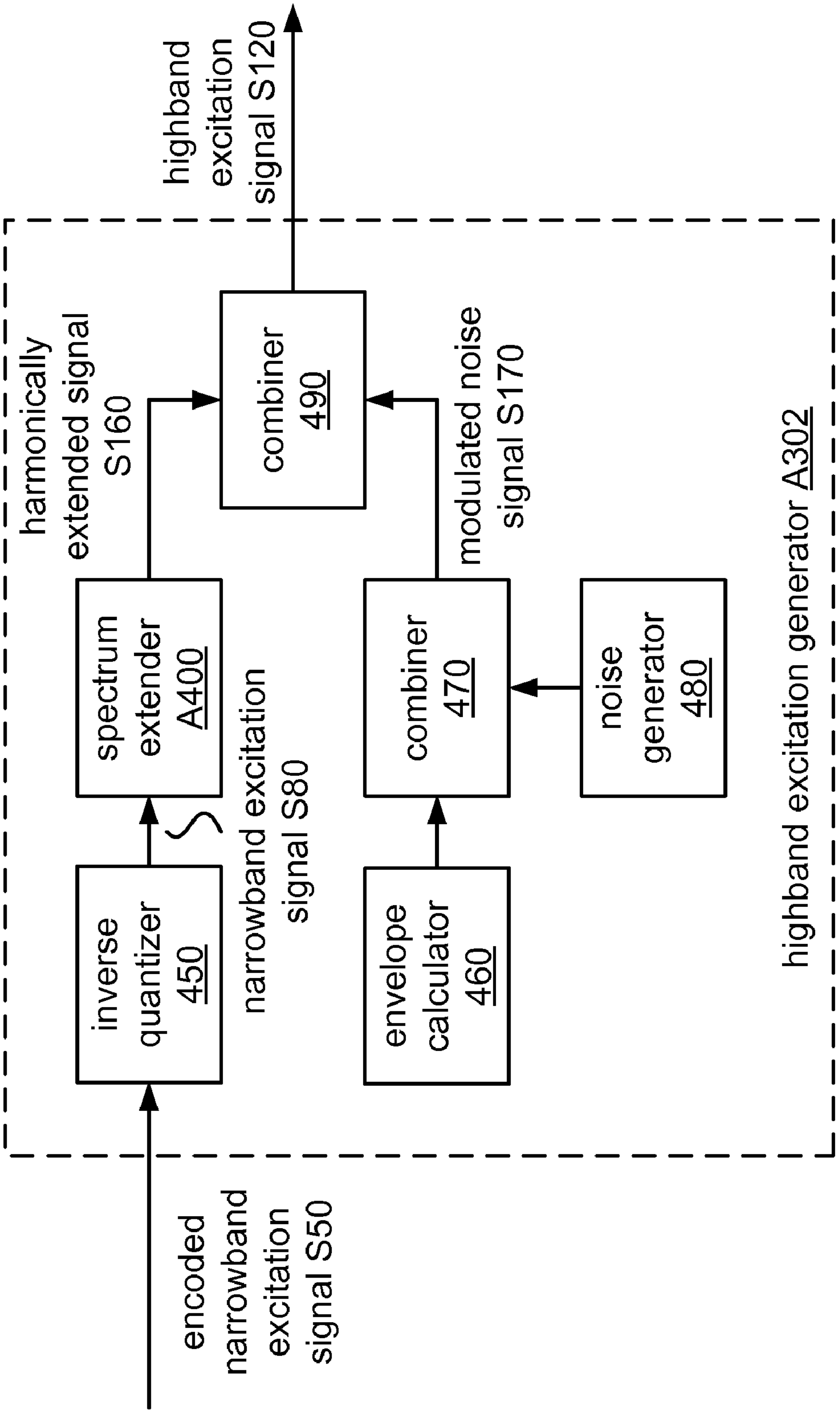
FIG. 11 shows a block diagram of an implementation A302 of highband excitation generator A300.

Highband excitation generator A300 is configured to generate highband excitation signal S120 by extending the spectrum of narrowband excitation signal S80 into the highband frequency range. FIG. 11 shows a block diagram of an implementation A302 of highband excitation generator A300. Inverse quantizer 450 is configured to dequantize encoded narrowband excitation signal S50 to produce narrowband excitation signal S80. Spectrum extender A400 is configured to produce a harmonically extended signal S160 based on narrowband excitation signal S80. Combiner 470 is configured to combine a random noise signal generated by noise generator 480 and a time-domain envelope calculated by envelope calculator 460 to produce a modulated noise signal S170. Combiner 490 is configured to mix harmonically extended signal S60 and modulated noise signal S170 to produce highband excitation signal S120.

In one example, spectrum extender A400 is configured to perform a spectral folding operation (also called mirroring) on narrowband excitation signal S80 to produce harmonically extended signal S160. Spectral folding may be performed by zero-stuffing excitation signal S80 and then applying a highpass filter to retain the alias. In another example, spectrum extender A400 is configured to produce harmonically extended signal S160 by spectrally translating narrowband excitation signal S80 into the highband (e.g., via upsampling followed by multiplication with a constant-frequency cosine signal).

Spectral folding and translation methods may produce spectrally extended signals whose harmonic structure is discontinuous with the original harmonic structure of narrowband excitation signal S80 in phase and/or frequency. For example, such methods may produce signals having peaks that are not generally located at multiples of the fundamental frequency, which may cause tinny-sounding artifacts in the reconstructed speech signal. These methods also tend to produce high-frequency harmonics that have unnaturally strong tonal characteristics. Moreover, because a PSTN signal may be sampled at 8 kHz but bandlimited to no more than 3400 Hz, the upper spectrum of narrowband excitation signal S80 may contain little or no energy, such that an extended signal generated according to a spectral folding or spectral translation operation may have a spectral hole above 3400 Hz.

Other methods of generating harmonically extended signal S160 include identifying one or more fundamental frequencies of narrowband excitation signal S80 and generating harmonic tones according to that information. For example, the harmonic structure of an excitation signal may be characterized by the fundamental frequency together with amplitude and phase information. Another implementation of highband excitation generator A300 generates a harmonically extended signal S160 based on the fundamental frequency and amplitude (as indicated, for example, by the pitch lag and pitch gain). Unless the harmonically extended signal is phase-coherent with narrowband excitation signal S80, however, the quality of the resulting decoded speech may not be acceptable.

A nonlinear function may be used to create a highband excitation signal that is phase-coherent with the narrowband excitation and preserves the harmonic structure without phase discontinuity. A nonlinear function may also provide an increased noise level between high-frequency harmonics, which tends to sound more natural than the tonal high-frequency harmonics produced by methods such as spectral folding and spectral translation. Typical memoryless nonlinear functions that may be applied by various implementations of spectrum extender A400 include the absolute value function (also called fullwave rectification), halfwave rectification, squaring, cubing, and clipping. Other implementations of spectrum extender A400 may be configured to apply a nonlinear function having memory.

Figure 12:
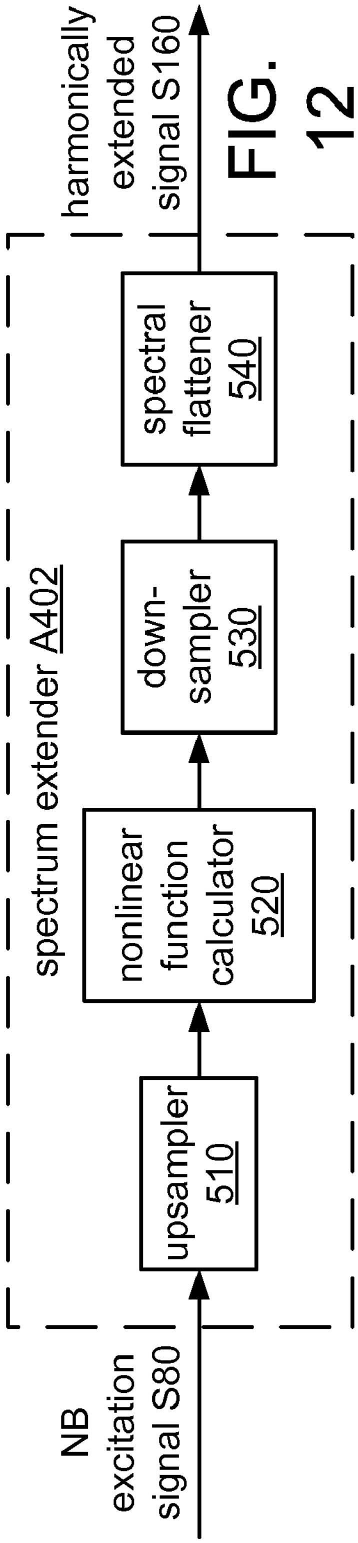
FIG. 12 shows a block diagram of an implementation A402 of spectrum extender A400.

FIG. 12 is a block diagram of an implementation A402 of spectrum extender A400 that is configured to apply a nonlinear function to extend the spectrum of narrowband excitation signal S80. Upsampler 510 is configured to upsample narrowband excitation signal S80. It may be desirable to upsample the signal sufficiently to minimize aliasing upon application of the nonlinear function. In one particular example, upsampler 510 upsamples the signal by a factor of eight. Upsampler 510 may be configured to perform the upsampling operation by zero-stuffing the input signal and lowpass filtering the result. Nonlinear function calculator 520 is configured to apply a nonlinear function to the upsampled signal. One potential advantage of the absolute value function over other nonlinear functions for spectral extension, such as squaring, is that energy normalization is not needed. In some implementations, the absolute value function may be applied efficiently by stripping or clearing the sign bit of each sample. Nonlinear function calculator 520 may also be configured to perform an amplitude warping of the upsampled or spectrally extended signal.

Downsampler 530 is configured to downsample the spectrally extended result of applying the nonlinear function. It may be desirable for downsampler 530 to perform a bandpass filtering operation to select a desired frequency band of the spectrally extended signal before reducing the sampling rate (for example, to reduce or avoid aliasing or corruption by an unwanted image). It may also be desirable for downsampler 530 to reduce the sampling rate in more than one stage.

Figure 12A:
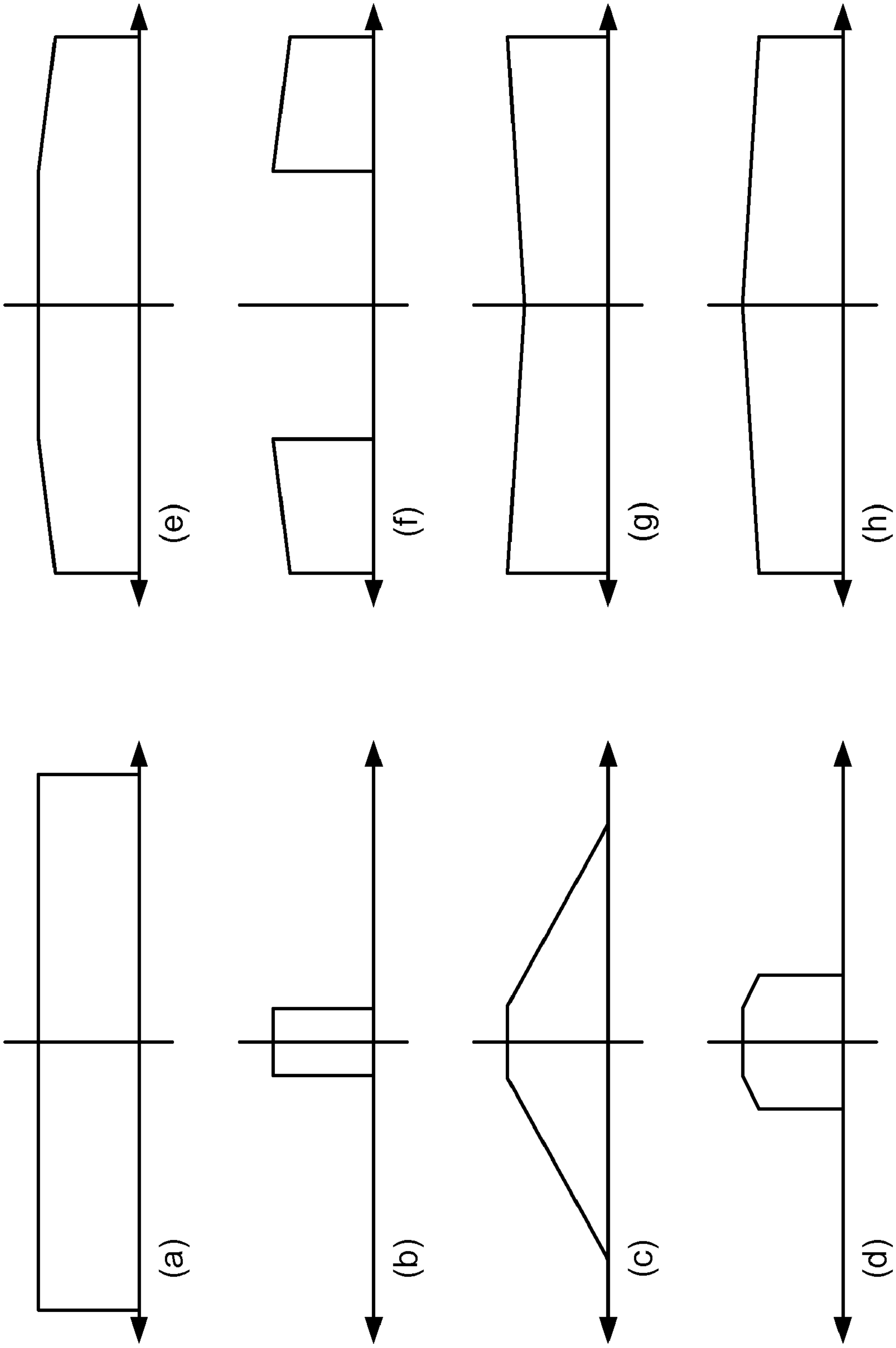
FIG. 12*a* shows plots of signal spectra at various points in one example of a spectral extension operation.

FIG. 12*a* is a diagram that shows the signal spectra at various points in one example of a spectral extension operation, where the frequency scale is the same across the various plots. Plot (a) shows the spectrum of one example of narrowband excitation signal S80. Plot (b) shows the spectrum after signal S80 has been upsampled by a factor of eight. Plot (c) shows an example of the extended spectrum after application of a nonlinear function. Plot (d) shows the spectrum after lowpass filtering. In this example, the passband extends to the upper frequency limit of highband signal S30 (e.g., 7 kHz or 8 kHz).

Plot (e) shows the spectrum after a first stage of downsampling, in which the sampling rate is reduced by a factor of four to obtain a wideband signal. Plot (f) shows the spectrum after a highpass filtering operation to select the highband portion of the extended signal, and plot (g) shows the spectrum after a second stage of downsampling, in which the sampling rate is reduced by a factor of two. In one particular example, downsampler 530 performs the highpass filtering and second stage of downsampling by passing the wideband signal through highpass filter 130 and downsampler 140 of filter bank A112 (or other structures or routines having the same response) to produce a spectrally extended signal having the frequency range and sampling rate of highband signal S30.

As may be seen in plot (g), downsampling of the highpass signal shown in plot (f) causes a reversal of its spectrum. In this example, downsampler 530 is also configured to perform a spectral flipping operation on the signal. Plot (h) shows a result of applying the spectral flipping operation, which may be performed by multiplying the signal with the function $e^{jn\pi}$ or the sequence $(-1)^n$, whose values alternate between +1 and −1. Such an operation is equivalent to shifting the digital spectrum of the signal in the frequency domain by a distance of $\pi$. It is noted that the same result may also be obtained by applying the downsampling and spectral flipping operations in a different order. The operations of upsampling and/or downsampling may also be configured to include resampling to obtain a spectrally extended signal having the sampling rate of highband signal S30 (e.g., 7 kHz).

As noted above, filter banks A110 and B120 may be implemented such that one or both of the narrowband and highband signals S20, S30 has a spectrally reversed form at the output of filter bank A110, is encoded and decoded in the spectrally reversed form, and is spectrally reversed again at filter bank B120 before being output in wideband speech signal S110. In such case, of course, a spectral flipping operation as shown in FIG. 12*a* may not be implemented, as it would be desirable for highband excitation signal S120 to have a spectrally reversed form as well.

Figure 12B:
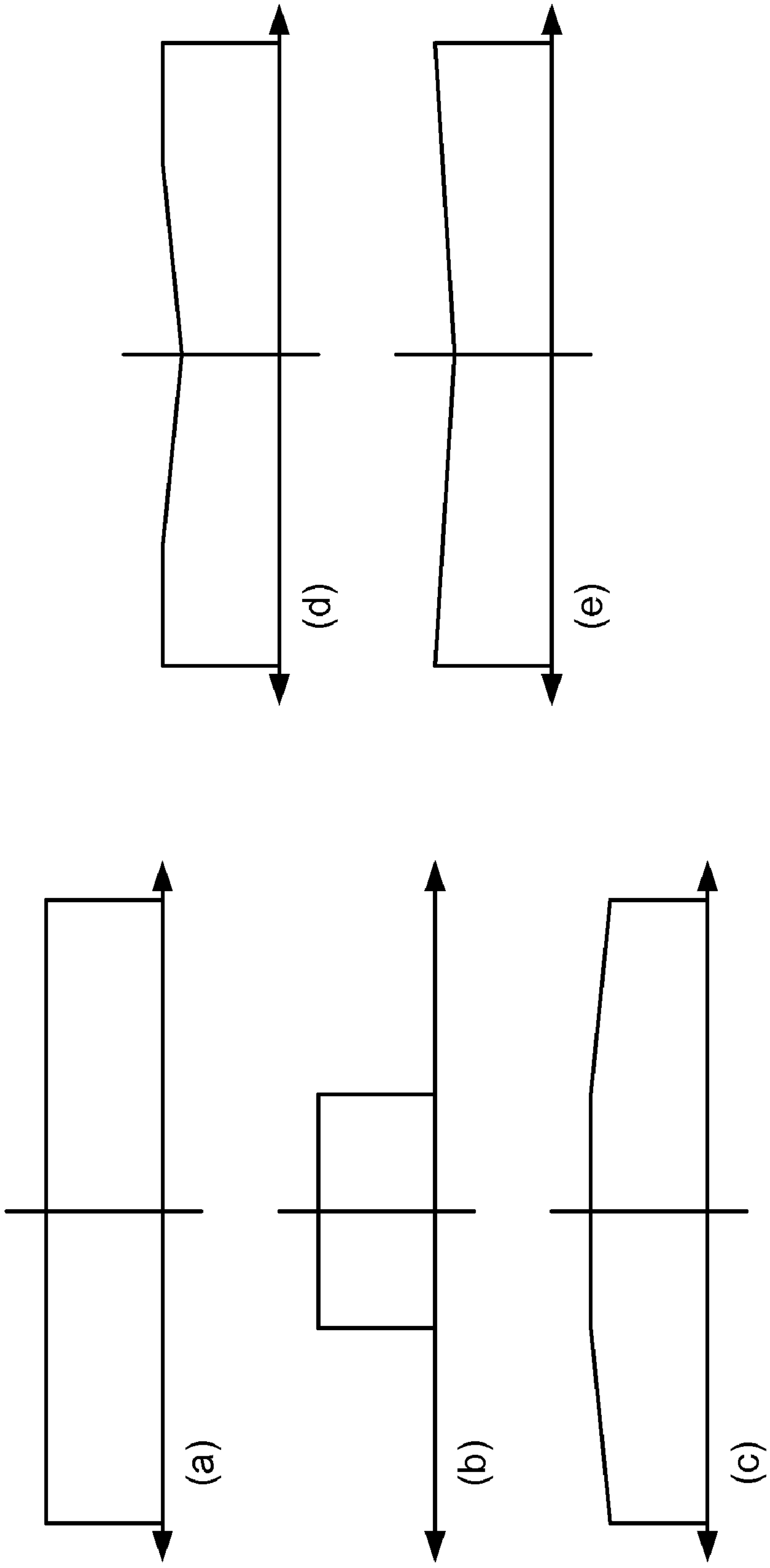
FIG. 12*b* shows plots of signal spectra at various points in another example of a spectral extension operation.

The various tasks of upsampling and downsampling of a spectral extension operation as performed by spectrum extender A402 may be configured and arranged in many different ways. For example, FIG. 12*b* is a diagram that shows the signal spectra at various points in another example of a spectral extension operation, where the frequency scale is the same across the various plots. Plot (a) shows the spectrum of one example of narrowband excitation signal S80. Plot (b) shows the spectrum after signal S80 has been upsampled by a factor of two. Plot (c) shows an example of the extended spectrum after application of a nonlinear function. In this case, aliasing that may occur in the higher frequencies is accepted.

Plot (d) shows the spectrum after a spectral reversal operation. Plot (e) shows the spectrum after a single stage of downsampling, in which the sampling rate is reduced by a factor of two to obtain the desired spectrally extended signal. In this example, the signal is in spectrally reversed form and may be used in an implementation of highband encoder A200 which processed highband signal S30 in such a form.

The spectrally extended signal produced by nonlinear function calculator 520 is likely to have a pronounced dropoff in amplitude as frequency increases. Spectral extender A402 includes a spectral flattener 540 configured to perform a whitening operation on the downsampled signal. Spectral flattener 540 may be configured to perform a fixed whitening operation or to perform an adaptive whitening operation. In a particular example of adaptive whitening, spectral flattener 540 includes an LPC analysis module configured to calculate a set of four filter coefficients from the downsampled signal and a fourth-order analysis filter configured to whiten the signal according to those coefficients. Other implementations of spectrum extender A400 include configurations in which spectral flattener 540 operates on the spectrally extended signal before downsampler 530.

Highband excitation generator A300 may be implemented to output harmonically extended signal S160 as highband excitation signal S120. In some cases, however, using a harmonically extended signal as the highband excitation may result in audible artifacts. The harmonic structure of speech is generally less pronounced in the highband than in the low band, and using too much harmonic structure in the highband excitation signal can result in a buzzy sound. This artifact may be especially noticeable in speech signals from female speakers.

Configurations include implementations of highband excitation generator A300 that are configured to mix harmonically extended signal S160 with a noise signal. As shown in FIG. 11, highband excitation generator A302 includes a noise generator 480 that is configured to produce a random noise signal. In one example, noise generator 480 is configured to produce a unit-variance white pseudorandom noise signal, although in other implementations the noise signal need not be white and may have a power density that varies with frequency. It may be desirable for noise generator 480 to be configured to output the noise signal as a deterministic function such that its state may be duplicated at the decoder. For example, noise generator 480 may be configured to output the noise signal as a deterministic function of information coded earlier within the same frame, such as the narrowband filter parameters S40 and/or encoded narrowband excitation signal S50.

Before being mixed with harmonically extended signal S160, the random noise signal produced by noise generator 480 may be amplitude-modulated to have a time-domain envelope that approximates the energy distribution over time of narrowband signal S20, highband signal S30, narrowband excitation signal S80, or harmonically extended signal S160. As shown in FIG. 11, highband excitation generator A302 includes a combiner 470 configured to amplitude-modulate the noise signal produced by noise generator 480 according to a time-domain envelope calculated by envelope calculator 460. For example, combiner 470 may be implemented as a multiplier arranged to scale the output of noise generator 480 according to the time-domain envelope calculated by envelope calculator 460 to produce modulated noise signal S170.

Figure 13:
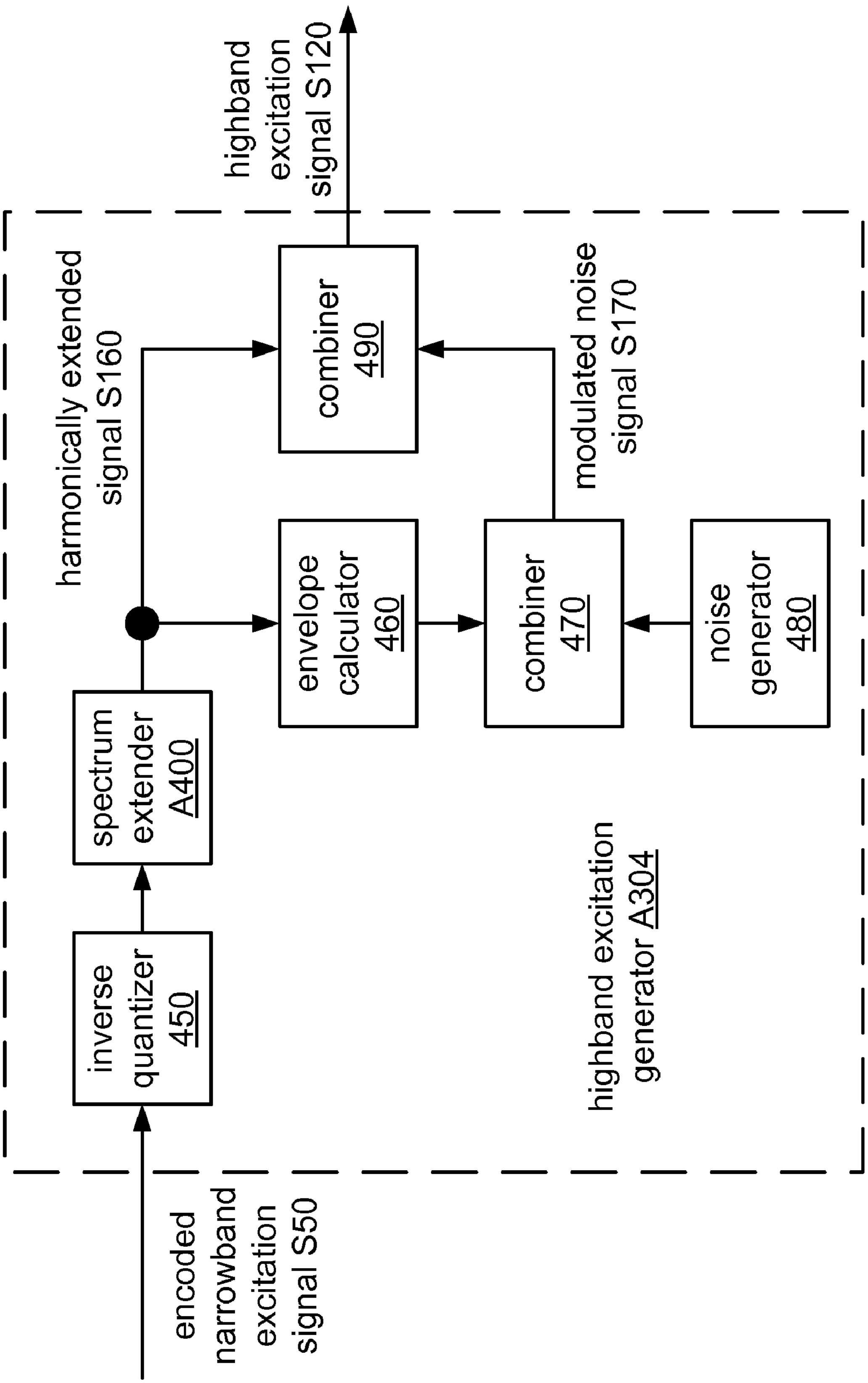
FIG. 13 shows a block diagram of an implementation A304 of highband excitation generator A302.
Figure 14:
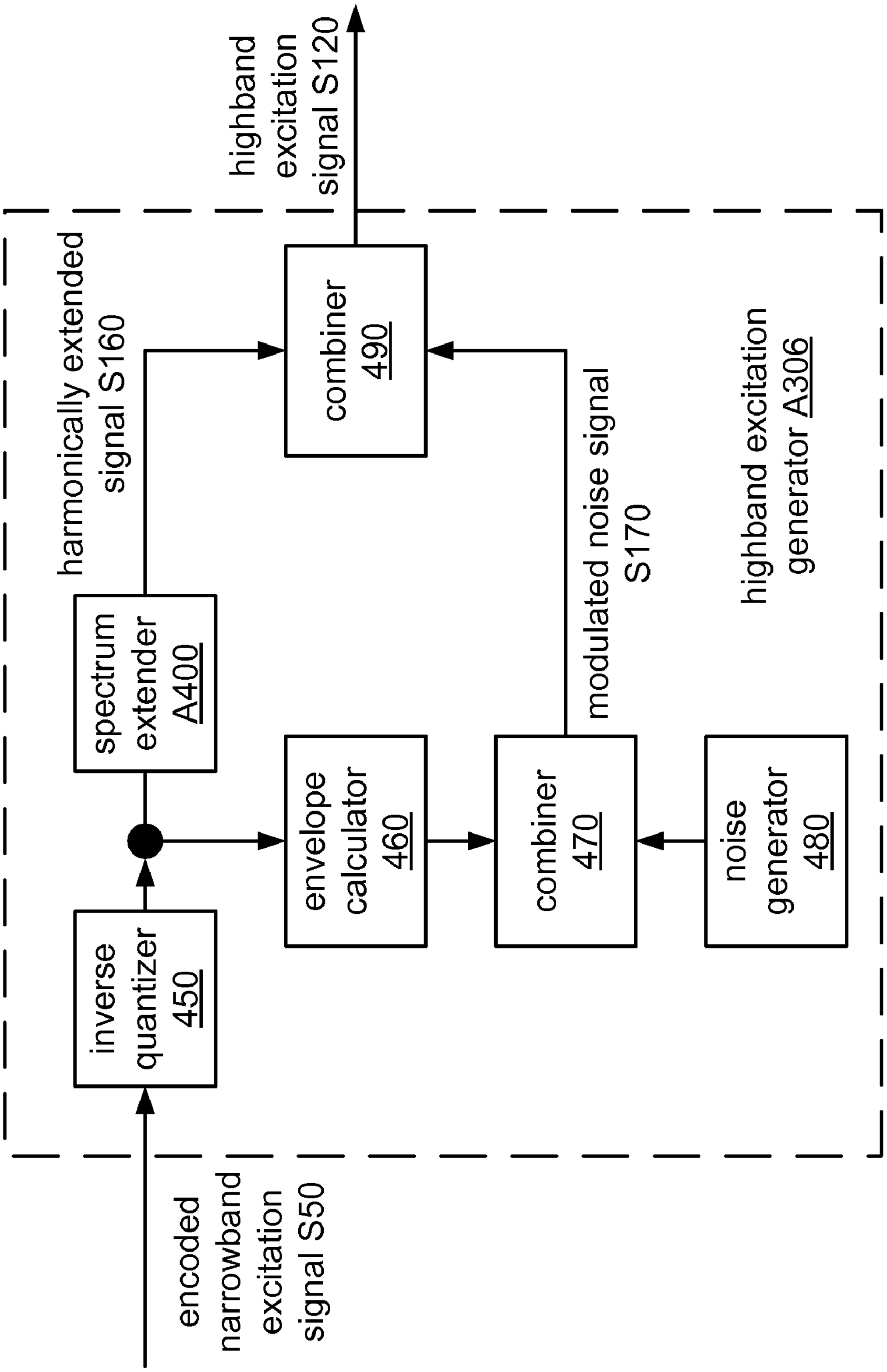
FIG. 14 shows a block diagram of an implementation A306 of highband excitation generator A302.

In an implementation A304 of highband excitation generator A302, as shown in the block diagram of FIG. 13, envelope calculator 460 is arranged to calculate the envelope of harmonically extended signal S160. In an implementation A306 of highband excitation generator A302, as shown in the block diagram of FIG. 14, envelope calculator 460 is arranged to calculate the envelope of narrowband excitation signal S80. Further implementations of highband excitation generator A302 may be otherwise configured to add noise to harmonically extended signal S160 according to locations of the narrowband pitch pulses in time.

Figure 15:
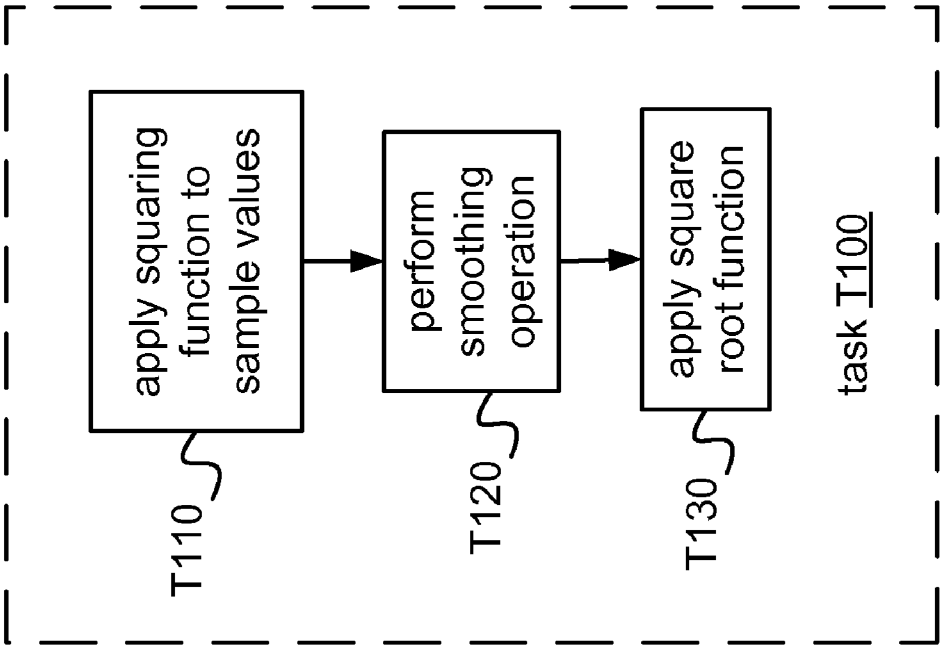
FIG. 15 shows a flow diagram for an envelope calculation task T100.

Envelope calculator 460 may be configured to perform an envelope calculation as a task that includes a series of subtasks. FIG. 15 shows a flow diagram of an example T100 of such a task. Subtask T110 calculates the square of each sample of the frame of the signal whose envelope is to be modeled (for example, narrowband excitation signal S80 or harmonically extended signal S160) to produce a sequence of squared values. Subtask T120 performs a smoothing operation on the sequence of squared values. In one example, subtask T120 applies a first-order IIR lowpass filter to the sequence according to the expression $$y(n)=ax(n)+(1-a)y(n-1), \quad (1)$$

where x is the filter input, y is the filter output, n is a time-domain index, and a is a smoothing coefficient having a value between 0.5 and 1. The value of the smoothing coefficient a may be fixed or, in an alternative implementation, may be adaptive according to an indication of noise in the input signal, such that a is closer to 1 in the absence of noise and closer to 0.5 in the presence of noise. Subtask T130 applies a square root function to each sample of the smoothed sequence to produce the time-domain envelope.

Such an implementation of envelope calculator 460 may be configured to perform the various subtasks of task T100 in serial and/or parallel fashion. In further implementations of task T100, subtask T110 may be preceded by a bandpass operation configured to select a desired frequency portion of the signal whose envelope is to be modeled, such as the range of 3-4 kHz.

Combiner 490 is configured to mix harmonically extended signal S160 and modulated noise signal S170 to produce highband excitation signal S120. Implementations of combiner 490 may be configured, for example, to calculate highband excitation signal S120 as a sum of harmonically extended signal S160 and modulated noise signal S170. Such an implementation of combiner 490 may be configured to calculate highband excitation signal S120 as a weighted sum by applying a weighting factor to harmonically extended signal S160 and/or to modulated noise signal S170 before the summation. Each such weighting factor may be calculated according to one or more criteria and may be a fixed value or, alternatively, an adaptive value that is calculated on a frame-by-frame or subframe-by-subframe basis.

Figure 16:
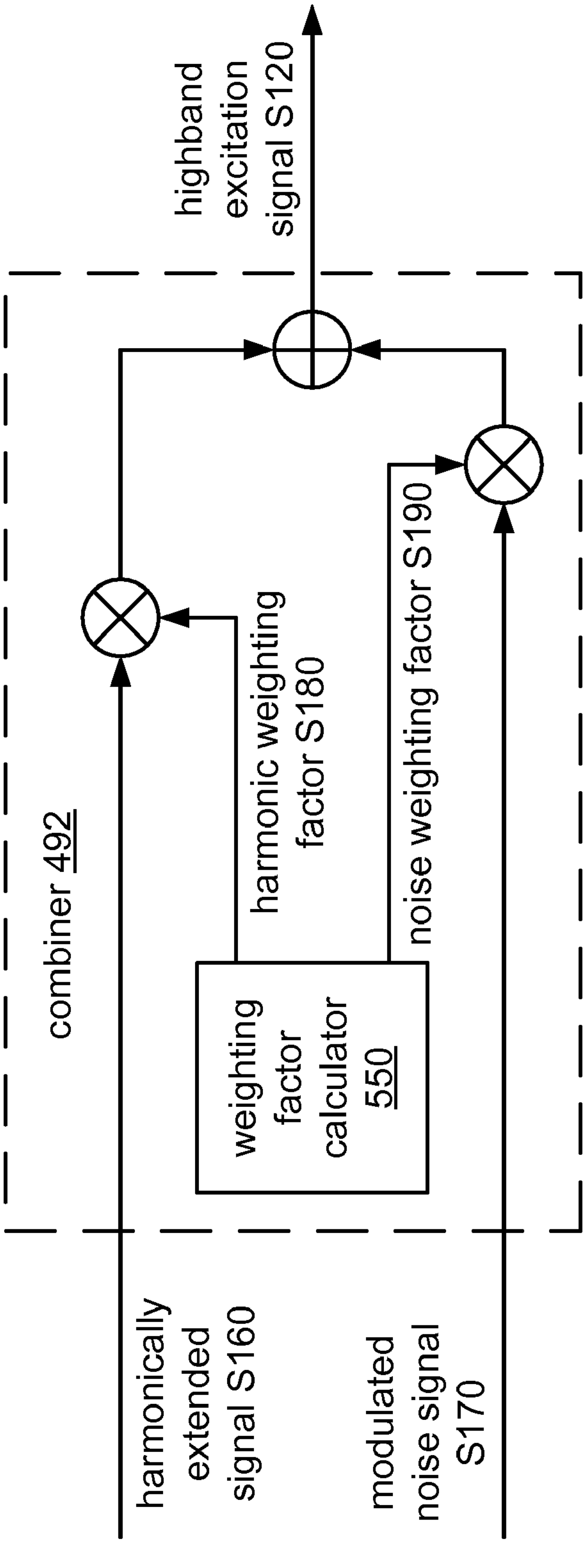
FIG. 16 shows a block diagram of an implementation 492 of combiner 490.

FIG. 16 shows a block diagram of an implementation 492 of combiner 490 that is configured to calculate highband excitation signal S120 as a weighted sum of harmonically extended signal S160 and modulated noise signal S170. Combiner 492 is configured to weight harmonically extended signal S160 according to harmonic weighting factor S180, to weight modulated noise signal S170 according to noise weighting factor S190, and to output highband excitation signal S120 as a sum of the weighted signals. In this example, combiner 492 includes a weighting factor calculator 550 that is configured to calculate harmonic weighting factor S180 and noise weighting factor S190.

Weighting factor calculator 550 may be configured to calculate weighting factors S180 and S190 according to a desired ratio of harmonic content to noise content in highband excitation signal S120. For example, it may be desirable for combiner 492 to produce highband excitation signal S120 to have a ratio of harmonic energy to noise energy similar to that of highband signal S30. In some implementations of weighting factor calculator 550, weighting factors S180, S190 are calculated according to one or more parameters relating to a periodicity of narrowband signal S20 or of the narrowband residual signal, such as pitch gain and/or speech mode. Such an implementation of weighting factor calculator 550 may be configured to assign a value to harmonic weighting factor S180 that is proportional to the pitch gain, for example, and/or to assign a higher value to noise weighting factor S190 for unvoiced speech signals than for voiced speech signals.

Figure 17:
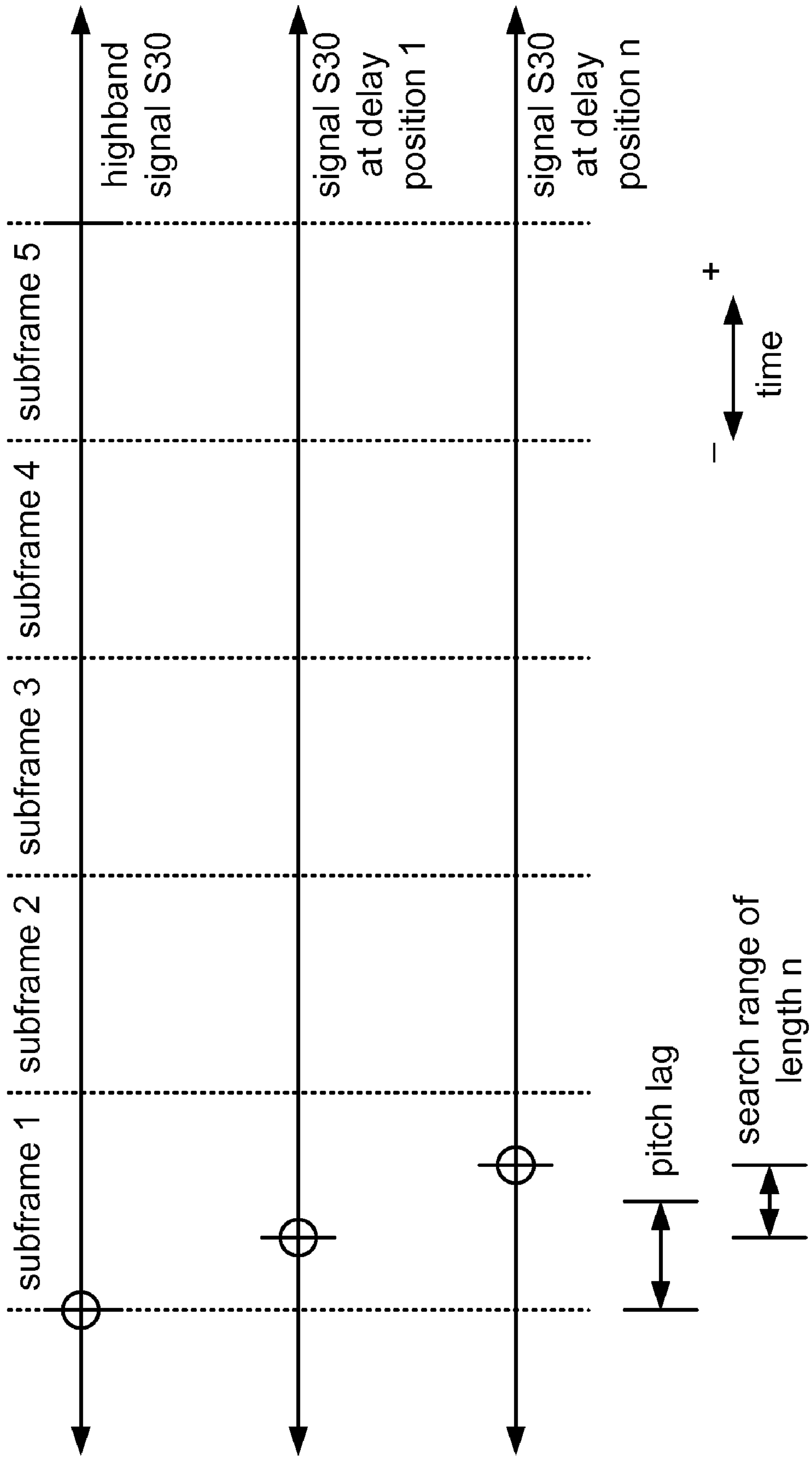
FIG. 17 illustrates an approach to calculating a measure of periodicity of highband signal S30.

In other implementations, weighting factor calculator 550 is configured to calculate values for harmonic weighting factor S180 and/or noise weighting factor S190 according to a measure of periodicity of highband signal S30. In one such example, weighting factor calculator 550 calculates harmonic weighting factor S180 as the maximum value of the autocorrelation coefficient of highband signal S30 for the current frame or subframe, where the autocorrelation is performed over a search range that includes a delay of one pitch lag and does not include a delay of zero samples. FIG. 17 shows an example of such a search range of length n samples that is centered about a delay of one pitch lag and has a width not greater than one pitch lag.

FIG. 17 also shows an example of another approach in which weighting factor calculator 550 calculates a measure of periodicity of highband signal S30 in several stages. In a first stage, the current frame is divided into a number of subframes, and the delay for which the autocorrelation coefficient is maximum is identified separately for each subframe. As mentioned above, the autocorrelation is performed over a search range that includes a delay of one pitch lag and does not include a delay of zero samples.

In a second stage, a delayed frame is constructed by applying the corresponding identified delay to each subframe, concatenating the resulting subframes to construct an optimally delayed frame, and calculating harmonic weighting factor S180 as the correlation coefficient between the original frame and the optimally delayed frame. In a further alternative, weighting factor calculator 550 calculates harmonic weighting factor S180 as an average of the maximum autocorrelation coefficients obtained in the first stage for each subframe. Implementations of weighting factor calculator 550 may also be configured to scale the correlation coefficient, and/or to combine it with another value, to calculate the value for harmonic weighting factor S180.

It may be desirable for weighting factor calculator 550 to calculate a measure of periodicity of highband signal S30 in cases where a presence of periodicity in the frame is otherwise indicated. For example, weighting factor calculator 550 may be configured to calculate a measure of periodicity of highband signal S30 according to a relation between another indicator of periodicity of the current frame, such as pitch gain, and a threshold value. In one example, weighting factor calculator 550 is configured to perform an autocorrelation operation on highband signal S30 if the frame's pitch gain (e.g., the adaptive codebook gain of the narrowband residual) has a value of more than 0.5 (alternatively, at least 0.5). In another example, weighting factor calculator 550 is configured to perform an autocorrelation operation on highband signal S30 for frames having particular states of speech mode (e.g., for voiced signals). In such cases, weighting factor calculator 550 may be configured to assign a default weighting factor for frames having other states of speech mode and/or lesser values of pitch gain.

Configurations include further implementations of weighting factor calculator 550 that are configured to calculate weighting factors according to characteristics other than or in addition to periodicity. For example, such an implementation may be configured to assign a higher value to noise gain factor S190 for speech signals having a large pitch lag than for speech signals having a small pitch lag. Another such implementation of weighting factor calculator 550 is configured to determine a measure of harmonicity of wideband speech signal S10, or of highband signal S30, according to a measure of the energy of the signal at multiples of the fundamental frequency relative to the energy of the signal at other frequency components.

Some implementations of wideband speech encoder A100 are configured to output an indication of periodicity or harmonicity (e.g. a one-bit flag indicating whether the frame is harmonic or nonharmonic) based on the pitch gain and/or another measure of periodicity or harmonicity as described herein. In one example, a corresponding wideband speech decoder B100 uses this indication to configure an operation such as weighting factor calculation. In another example, such an indication is used at the encoder and/or decoder in calculating a value for a speech mode parameter.

It may be desirable for highband excitation generator A302 to generate highband excitation signal S120 such that the energy of the excitation signal is substantially unaffected by the particular values of weighting factors S180 and S190. In such case, weighting factor calculator 550 may be configured to calculate a value for harmonic weighting factor S180 or for noise weighting factor S190 (or to receive such a value from storage or another element of highband encoder A200) and to derive a value for the other weighting factor according to an expression such as $$(W_{harmonic})^2+(W_{noise})^2=1, \quad (2)$$

where $W_{harmonic}$ denotes harmonic weighting factor S180 and $W_{noise}$ denotes noise weighting factor S190. Alternatively, weighting factor calculator 550 may be configured to select, according to a value of a periodicity measure for the current frame or subframe, a corresponding one among a plurality of pairs of weighting factors S180, S190, where the pairs are precalculated to satisfy a constant-energy ratio such as expression (2). For an implementation of weighting factor calculator 550 in which expression (2) is observed, typical values for harmonic weighting factor S180 range from about 0.7 to about 1.0, and typical values for noise weighting factor S190 range from about 0.1 to about 0.7. Other implementations of weighting factor calculator 550 may be configured to operate according to a version of expression (2) that is modified according to a desired baseline weighting between harmonically extended signal S160 and modulated noise signal S170.

Artifacts may occur in a synthesized speech signal when a sparse codebook (one whose entries are mostly zero values) has been used to calculate the quantized representation of the residual. Codebook sparseness occurs especially when the narrowband signal is encoded at a low bit rate. Artifacts caused by codebook sparseness are typically quasi-periodic in time and occur mostly above 3 kHz. Because the human ear has better time resolution at higher frequencies, these artifacts may be more noticeable in the highband.

Figure 18:
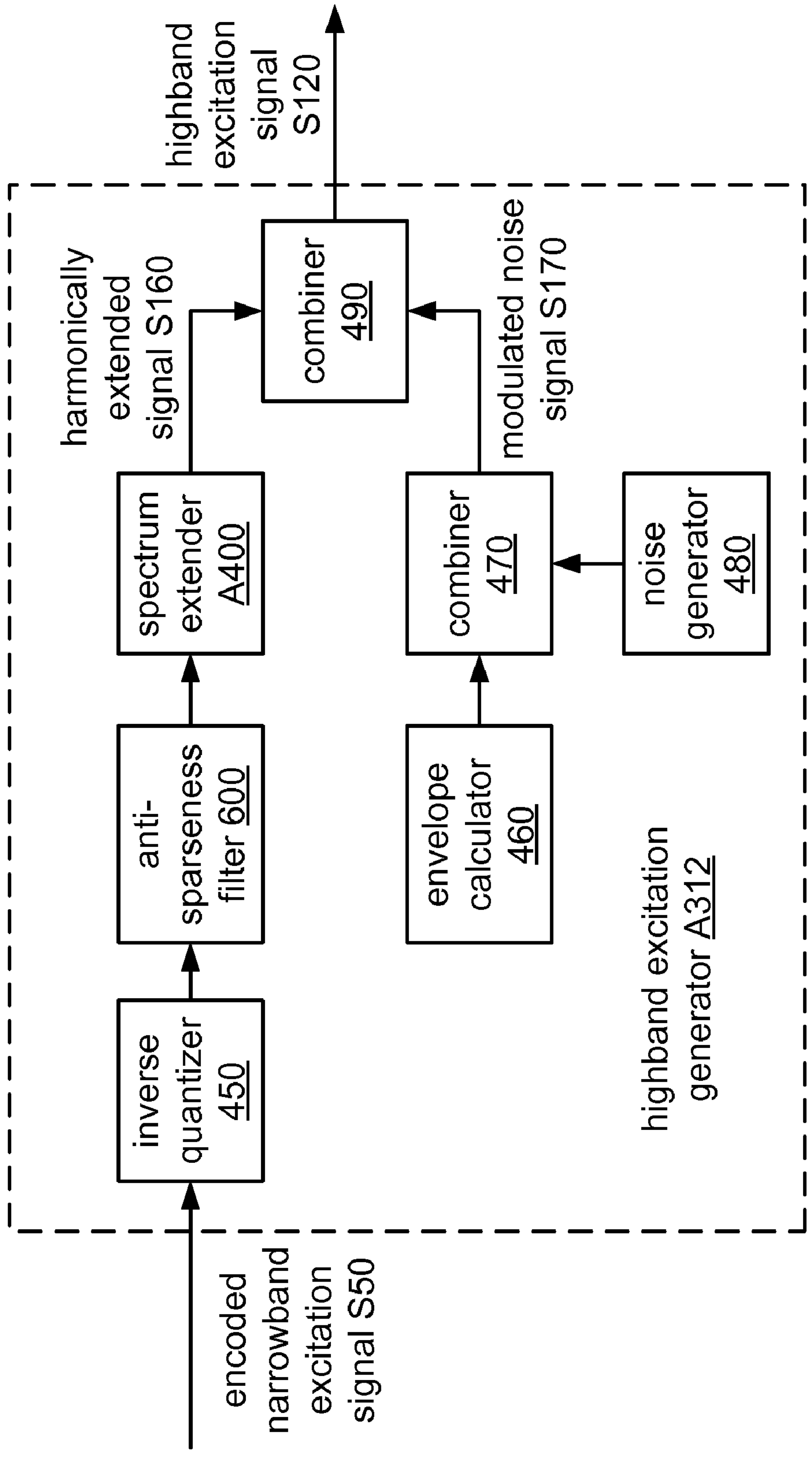
FIG. 18 shows a block diagram of an implementation A312 of highband excitation generator A302.
Figure 19:
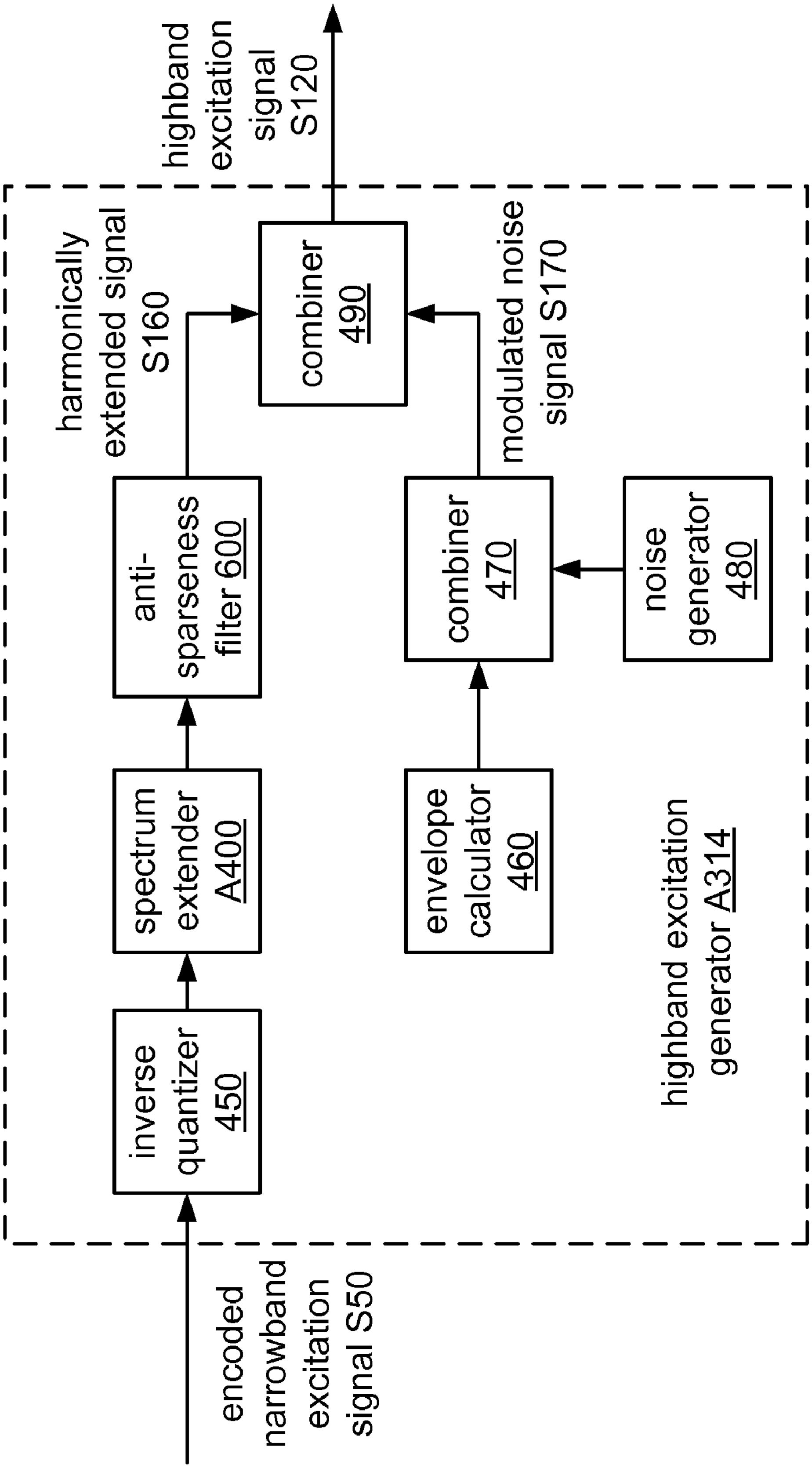
FIG. 19 shows a block diagram of an implementation A314 of highband excitation generator A302.
Figure 20:
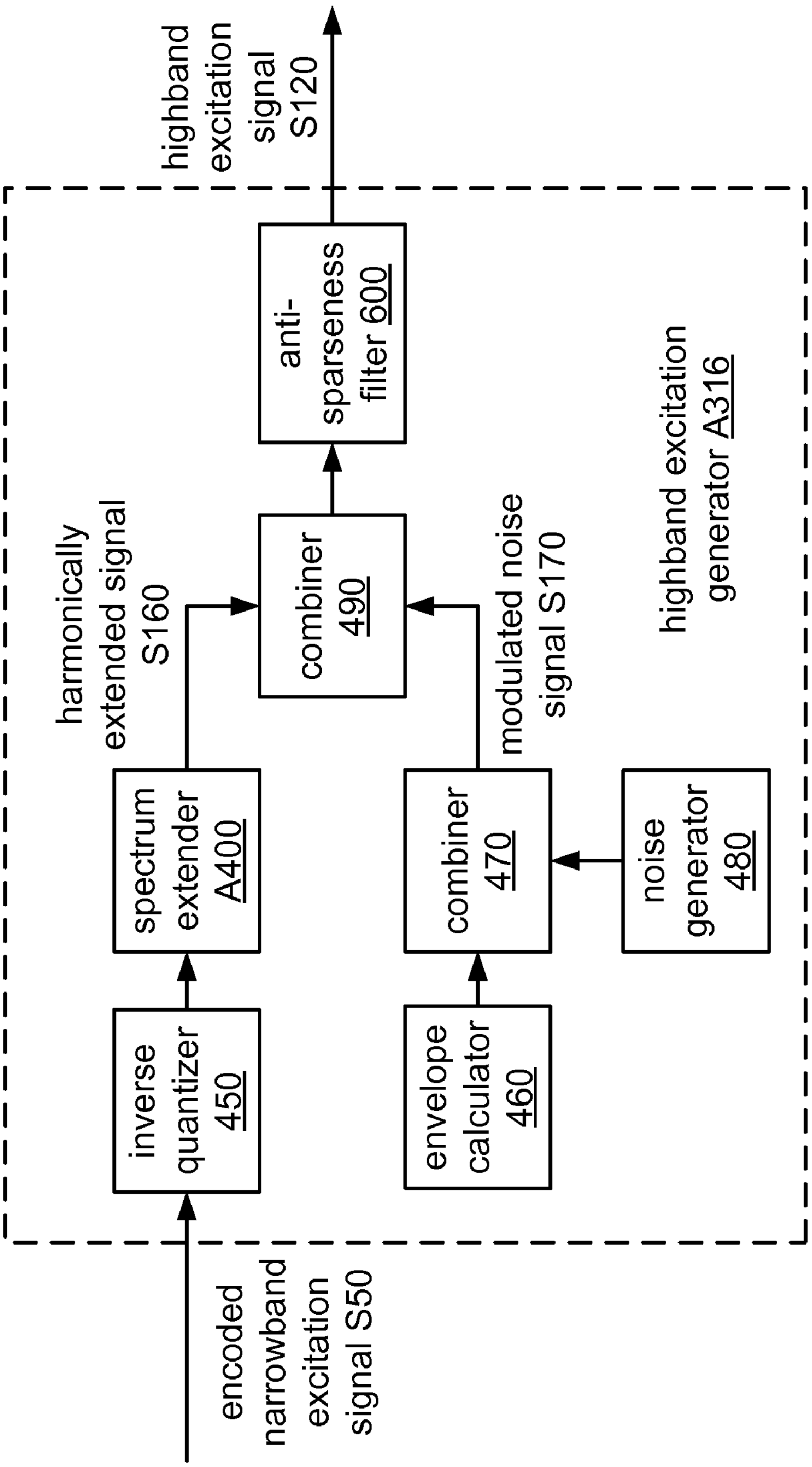
FIG. 20 shows a block diagram of an implementation A316 of highband excitation generator A302.

Configurations include implementations of highband excitation generator A300 that are configured to perform anti-sparseness filtering. FIG. 18 shows a block diagram of an implementation A312 of highband excitation generator A302 that includes an anti-sparseness filter 600 arranged to filter the dequantized narrowband excitation signal produced by inverse quantizer 450. FIG. 19 shows a block diagram of an implementation A314 of highband excitation generator A302 that includes an anti-sparseness filter 600 arranged to filter the spectrally extended signal produced by spectrum extender A400. FIG. 20 shows a block diagram of an implementation A316 of highband excitation generator A302 that includes an anti-sparseness filter 600 arranged to filter the output of combiner 490 to produce highband excitation signal S120. Of course, implementations of highband excitation generator A300 that combine the features of any of implementations A304 and A306 with the features of any of implementations A312, A314, and A316 are contemplated and hereby expressly disclosed. Anti-sparseness filter 600 may also be arranged within spectrum extender A400: for example, after any of the elements 510, 520, 530, and 540 in spectrum extender A402. It is expressly noted that anti-sparseness filter 600 may also be used with implementations of spectrum extender A400 that perform spectral folding, spectral translation, or harmonic extension.

Anti-sparseness filter 600 may be configured to alter the phase of its input signal. For example, it may be desirable for anti-sparseness filter 600 to be configured and arranged such that the phase of highband excitation signal S120 is randomized, or otherwise more evenly distributed, over time. It may also be desirable for the response of anti-sparseness filter 600 to be spectrally flat, such that the magnitude spectrum of the filtered signal is not appreciably changed. In one example, anti-sparseness filter 600 is implemented as an all-pass filter having a transfer function according to the following expression:

$$H(z) = \frac{-0.7 + z^{-4}}{1 - 0.7z^{-4}} \cdot \frac{0.6 + z^{-6}}{1 + 0.6z^{-6}}. \quad (3)$$

One effect of such a filter may be to spread out the energy of the input signal so that it is no longer concentrated in a few samples.

Artifacts caused by codebook sparseness are usually more noticeable for noise-like signals, where the residual includes less pitch information, and also for speech in background noise. Sparseness typically causes fewer artifacts in cases where the excitation has long-term structure, and indeed phase modification may cause noisiness in voiced signals. Thus it may be desirable to configure anti-sparseness filter 600 to filter unvoiced signals and to pass at least some voiced signals without alteration. Unvoiced signals are characterized by a low pitch gain (e.g. quantized narrowband adaptive codebook gain) and a spectral tilt (e.g. quantized first reflection coefficient) that is close to zero or positive, indicating a spectral envelope that is flat or tilted upward with increasing frequency. Typical implementations of anti-sparseness filter 600 are configured to filter unvoiced sounds (e.g., as indicated by the value of the spectral tilt), to filter voiced sounds when the pitch gain is below a threshold value (alternatively, not greater than the threshold value), and otherwise to pass the signal without alteration.

Further implementations of anti-sparseness filter 600 include two or more filters that are configured to have different maximum phase modification angles (e.g., up to 180 degrees). In such case, anti-sparseness filter 600 may be configured to select among these component filters according to a value of the pitch gain (e.g., the quantized adaptive codebook or LTP gain), such that a greater maximum phase modification angle is used for frames having lower pitch gain values. An implementation of anti-sparseness filter 600 may also include different component filters that are configured to modify the phase over more or less of the frequency spectrum, such that a filter configured to modify the phase over a wider frequency range of the input signal is used for frames having lower pitch gain values.

For accurate reproduction of the encoded speech signal, it may be desirable for the ratio between the levels of the highband and narrowband portions of the synthesized wideband speech signal S100 to be similar to that in the original wideband speech signal S10. In addition to a spectral envelope as represented by highband coding parameters S60*a*, highband encoder A200 may be configured to characterize highband signal S30 by specifying a temporal or gain envelope. As shown in FIG. 10, highband encoder A202 includes a highband gain factor calculator A230 that is configured and arranged to calculate one or more gain factors according to a relation between highband signal S30 and synthesized highband signal S130, such as a difference or ratio between the energies of the two signals over a frame or some portion thereof. In other implementations of highband encoder A202, highband gain calculator A230 may be likewise configured but arranged instead to calculate the gain envelope according to such a time-varying relation between highband signal S30 and narrowband excitation signal S80 or highband excitation signal S120.

The temporal envelopes of narrowband excitation signal S80 and highband signal S30 are likely to be similar. Therefore, encoding a gain envelope that is based on a relation between highband signal S30 and narrowband excitation signal S80 (or a signal derived therefrom, such as highband excitation signal S120 or synthesized highband signal S130) will generally be more efficient than encoding a gain envelope based on highband signal S30. In a typical implementation, highband encoder A202 is configured to output a quantized index of eight to twelve bits that specifies five gain factors for each frame.

Figure 21:
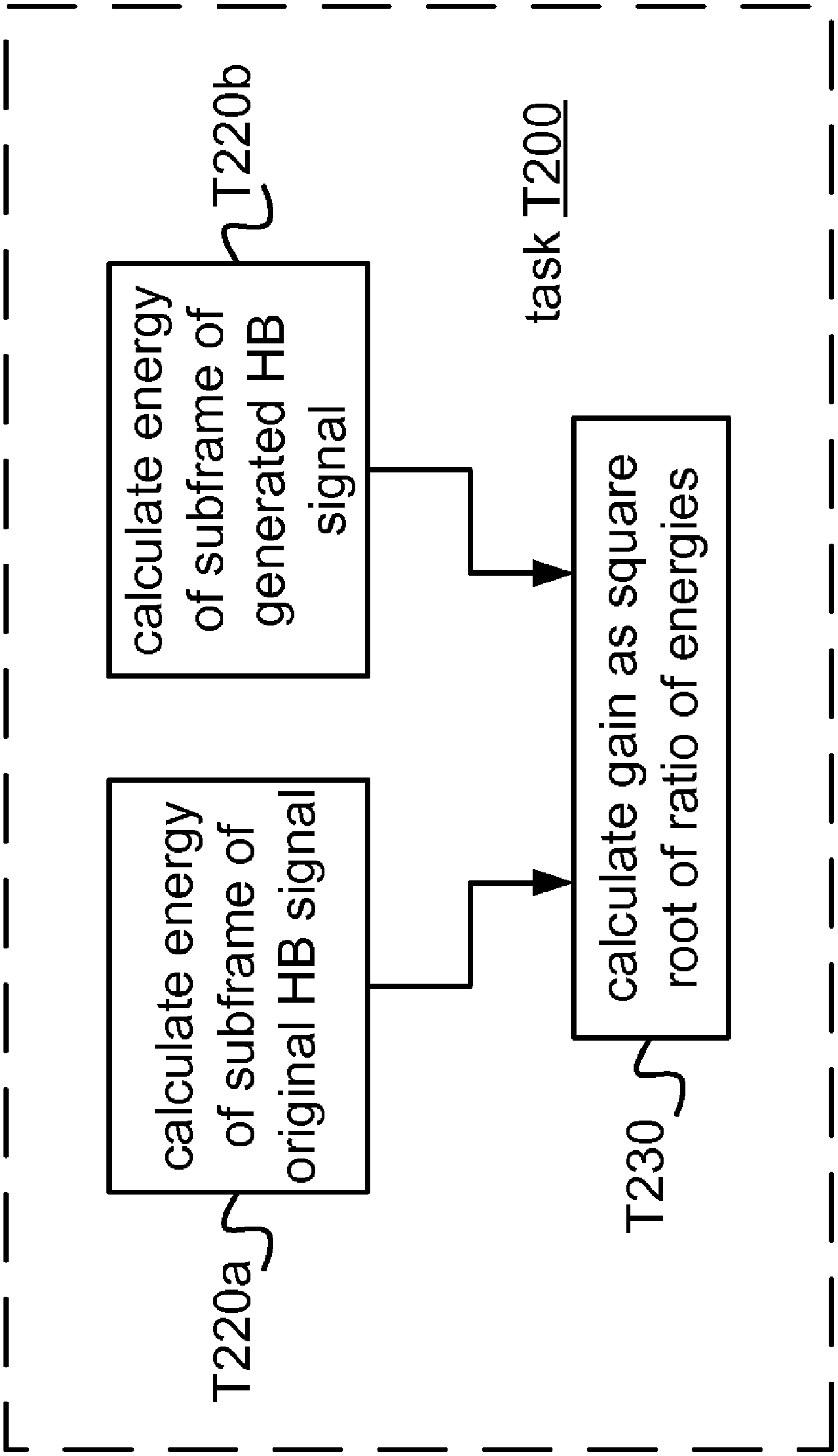
FIG. 21 shows a flow diagram for a gain calculation task T200.

Highband gain factor calculator A230 may be configured to perform gain factor calculation as a task that includes one or more series of subtasks. FIG. 21 shows a flow diagram of an example T200 of such a task that calculates a gain value for a corresponding subframe according to the relative energies of highband signal S30 and synthesized highband signal S130. Tasks 220*a* and 220*b* calculate the energies of the corresponding subframes of the respective signals. For example, tasks 220*a* and 220*b* may be configured to calculate the energy as a sum of the squares of the samples of the respective subframe. Task T230 calculates a gain factor for the subframe as the square root of the ratio of those energies. In this example, task T230 calculates the gain factor as the square root of the ratio of the energy of highband signal S30 to the energy of synthesized highband signal S130 over the subframe.

Figure 22:
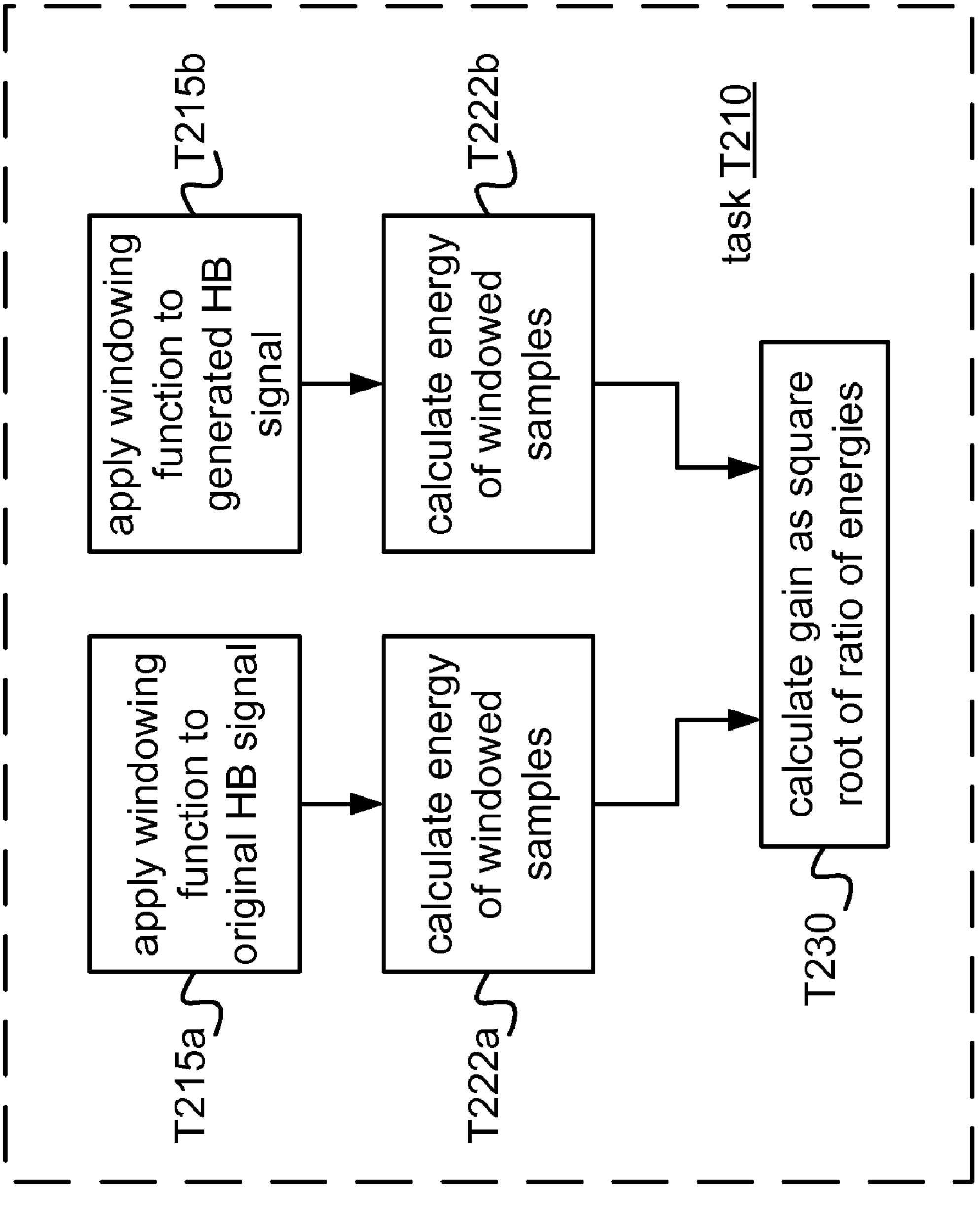
FIG. 22 shows a flow diagram for an implementation T210 of gain calculation task T200.

It may be desirable for highband gain factor calculator A230 to be configured to calculate the subframe energies according to a windowing function. FIG. 22 shows a flow diagram of such an implementation T210 of gain factor calculation task T200. Task T215*a* applies a windowing function to highband signal S30, and task T215*b* applies the same windowing function to synthesized highband signal S130. Implementations 222*a* and 222*b* of tasks 220*a* and 220*b* calculate the energies of the respective windows, and task T230 calculates a gain factor for the subframe as the square root of the ratio of the energies.

Figure 23A:
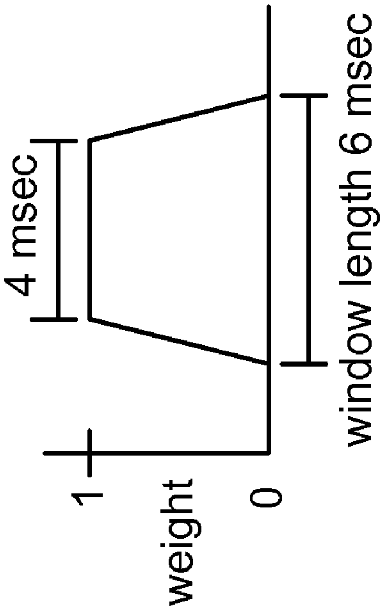
FIG. 23*a* shows a diagram of a windowing function.
Figure 23B:
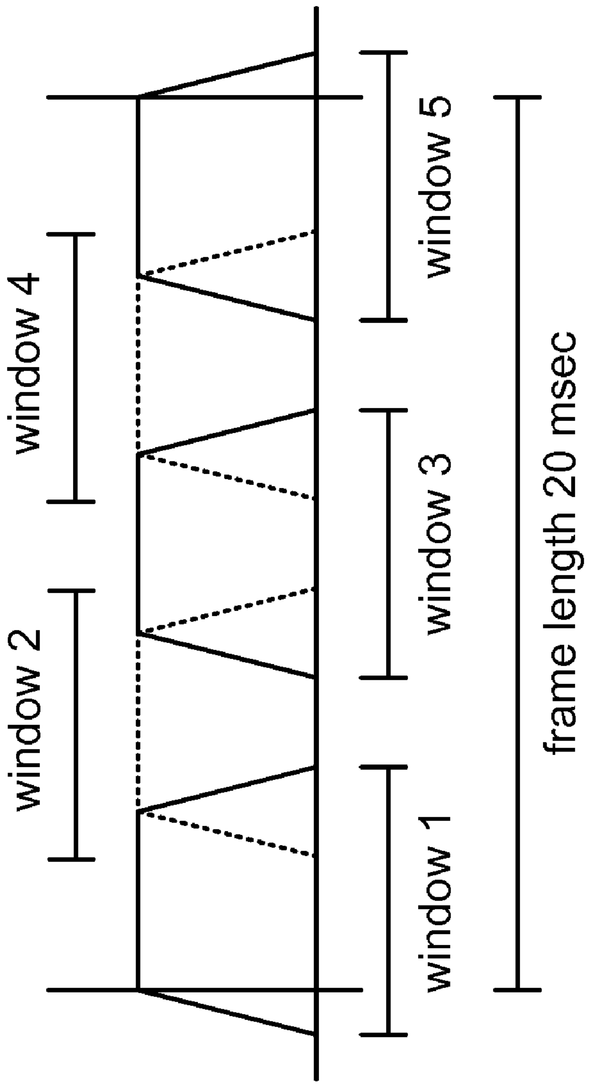
FIG. 23*b* shows an application of a windowing function as shown in FIG. 23*a* to subframes of a speech signal.

It may be desirable to apply a windowing function that overlaps adjacent subframes. For example, a windowing function that produces gain factors which may be applied in an overlap-add fashion may help to reduce or avoid discontinuity between subframes. In one example, highband gain factor calculator A230 is configured to apply a trapezoidal windowing function as shown in FIG. 23*a*, in which the window overlaps each of the two adjacent subframes by one millisecond. FIG. 23*b* shows an application of this windowing function to each of the five subframes of a 20-millisecond frame. Other implementations of highband gain factor calculator A230 may be configured to apply windowing functions having different overlap periods and/or different window shapes (e.g., rectangular, Hamming) that may be symmetrical or asymmetrical. It is also possible for an implementation of highband gain factor calculator A230 to be configured to apply different windowing functions to different subframes within a frame and/or for a frame to include subframes of different lengths.

Without limitation, the following values are presented as examples for particular implementations. A 20-msec frame is assumed for these cases, although any other duration may be used. For a highband signal sampled at 7 kHz, each frame has 140 samples. If such a frame is divided into five subframes of equal length, each subframe will have 28 samples, and the window as shown in FIG. 23*a* will be 42 samples wide. For a highband signal sampled at 8 kHz, each frame has 160 samples. If such frame is divided into five subframes of equal length, each subframe will have 32 samples, and the window as shown in FIG. 23*a* will be 48 samples wide. In other implementations, subframes of any width may be used, and it is even possible for an implementation of highband gain calculator A230 to be configured to produce a different gain factor for each sample of a frame.

Figure 24:
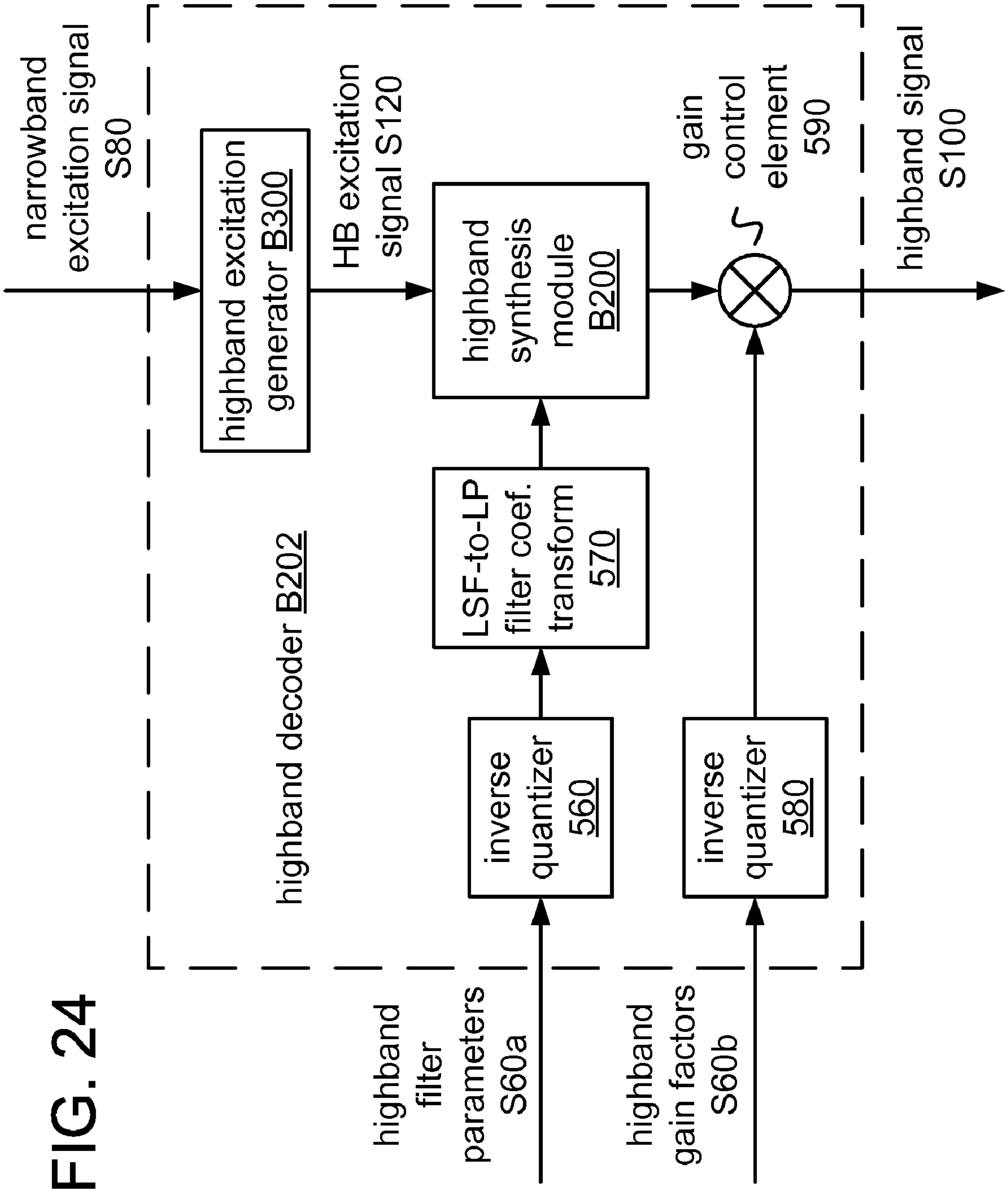
FIG. 24 shows a block diagram for an implementation B202 of highband decoder B200.

FIG. 24 shows a block diagram of an implementation B202 of highband decoder B200. Highband decoder B202 includes a highband excitation generator B300 that is configured to produce highband excitation signal S120 based on narrowband excitation signal S80. Depending on the particular system design choices, highband excitation generator B300 may be implemented according to any of the implementations of highband excitation generator A300 as described herein. Typically it is desirable to implement highband excitation generator B300 to have the same response as the highband excitation generator of the highband encoder of the particular coding system. Because narrowband decoder B110 will typically perform dequantization of encoded narrowband excitation signal S50, however, in most cases highband excitation generator B300 may be implemented to receive narrowband excitation signal S80 from narrowband decoder B110 and need not include an inverse quantizer configured to dequantize encoded narrowband excitation signal S50. It is also possible for narrowband decoder B110 to be implemented to include an instance of anti-sparseness filter 600 arranged to filter the dequantized narrowband excitation signal before it is input to a narrowband synthesis filter such as filter 330.

Inverse quantizer 560 is configured to dequantize highband filter parameters S60*a* (in this example, to a set of LSFs), and LSF-to-LP filter coefficient transform 570 is configured to transform the LSFs into a set of filter coefficients (for example, as described above with reference to inverse quantizer 240 and transform 250 of narrowband encoder A122). In other implementations, as mentioned above, different coefficient sets (e.g., cepstral coefficients) and/or coefficient representations (e.g., ISPs) may be used. Highband synthesis filter B200 is configured to produce a synthesized highband signal according to highband excitation signal S120 and the set of filter coefficients. For a system in which the highband encoder includes a synthesis filter (e.g., as in the example of encoder A202 described above), it may be desirable to implement highband synthesis filter B200 to have the same response (e.g., the same transfer function) as that synthesis filter.

Highband decoder B202 also includes an inverse quantizer 580 configured to dequantize highband gain factors S60*b*, and a gain control element 590 (e.g., a multiplier or amplifier) configured and arranged to apply the dequantized gain factors to the synthesized highband signal to produce highband signal S100. For a case in which the gain envelope of a frame is specified by more than one gain factor, gain control element 590 may include logic configured to apply the gain factors to the respective subframes, possibly according to a windowing function that may be the same or a different windowing function as applied by a gain calculator (e.g., highband gain calculator A230) of the corresponding highband encoder. In other implementations of highband decoder B202, gain control element 590 is similarly configured but is arranged instead to apply the dequantized gain factors to narrowband excitation signal S80 or to highband excitation signal S120.

As mentioned above, it may be desirable to obtain the same state in the highband encoder and highband decoder (e.g., by using dequantized values during encoding). Thus it may be desirable in a coding system according to such an implementation to ensure the same state for corresponding noise generators in highband excitation generators A300 and B300. For example, highband excitation generators A300 and B300 of such an implementation may be configured such that the state of the noise generator is a deterministic function of information already coded within the same frame (e.g., narrowband filter parameters S40 or a portion thereof and/or encoded narrowband excitation signal S50 or a portion thereof).

One or more of the quantizers of the elements described herein (e.g., quantizer 230, 420, or 430) may be configured to perform classified vector quantization. For example, such a quantizer may be configured to select one of a set of codebooks based on information that has already been coded within the same frame in the narrowband channel and/or in the highband channel. Such a technique typically provides increased coding efficiency at the expense of additional codebook storage.

As discussed above with reference to, e.g., FIGS. 8 and 9, a considerable amount of periodic structure may remain in the residual signal after removal of the coarse spectral envelope from narrowband speech signal S20. For example, the residual signal may contain a sequence of roughly periodic pulses or spikes over time. Such structure, which is typically related to pitch, is especially likely to occur in voiced speech signals. Calculation of a quantized representation of the narrowband residual signal may include encoding of this pitch structure according to a model of long-term periodicity as represented by, for example, one or more codebooks.

The pitch structure of an actual residual signal may not match the periodicity model exactly. For example, the residual signal may include small jitters in the regularity of the locations of the pitch pulses, such that the distances between successive pitch pulses in a frame are not exactly equal and the structure is not quite regular. These irregularities tend to reduce coding efficiency.

Some implementations of narrowband encoder A120 are configured to perform a regularization of the pitch structure by applying an adaptive time warping to the residual before or during quantization, or by otherwise including an adaptive time warping in the encoded excitation signal. For example, such an encoder may be configured to select or otherwise calculate a degree of warping in time (e.g., according to one or more perceptual weighting and/or error minimization criteria) such that the resulting excitation signal optimally fits the model of long-term periodicity. Regularization of pitch structure is performed by a subset of CELP encoders called Relaxation Code Excited Linear Prediction (RCELP) encoders.

An RCELP encoder is typically configured to perform the time warping as an adaptive time shift. This time shift may be a delay ranging from a few milliseconds negative to a few milliseconds positive, and it is usually varied smoothly to avoid audible discontinuities. In some implementations, such an encoder is configured to apply the regularization in a piecewise fashion, wherein each frame or subframe is warped by a corresponding fixed time shift. In other implementations, the encoder is configured to apply the regularization as a continuous warping function, such that a frame or subframe is warped according to a pitch contour (also called a pitch trajectory). In some cases the encoder is configured to include a time warping in the encoded excitation signal by applying the shift to a perceptually weighted input signal that is used to calculate the encoded excitation signal.

The encoder calculates an encoded excitation signal that is regularized and quantized, and the decoder dequantizes the encoded excitation signal to obtain an excitation signal that is used to synthesize the decoded speech signal. The decoded output signal thus exhibits the same varying delay that was included in the encoded excitation signal by the regularization. Typically, no information specifying the regularization amounts is transmitted to the decoder.

Regularization tends to make the residual signal easier to encode, which improves the coding gain from the long-term predictor and thus boosts overall coding efficiency, generally without generating artifacts. It may be desirable to perform regularization on frames that are voiced. For example, narrowband encoder A124 may be configured to shift those frames or subframes having a long-term structure, such as voiced signals. It may even be desirable to perform regularization on subframes that include pitch pulse energy. Existing implementations of RCELP coders include the Enhanced Variable Rate Codec (EVRC), as described in Telecommunications Industry Association (TIA) IS-127, and the Third Generation Partnership Project 2 (3GPP2) Selectable Mode Vocoder (SMV).

Unfortunately, regularization may cause problems for a wideband speech coder in which the highband excitation is derived from the encoded narrowband excitation signal (such as a system including wideband speech encoder A100 and wideband speech decoder B100). Due to its derivation from a time-warped signal, the highband excitation signal will generally have a time profile that is different from that of the original highband speech signal. In other words, the highband excitation signal will no longer be synchronous with the original highband speech signal.

A misalignment in time between the warped highband excitation signal and the original highband speech signal may cause several problems. For example, the warped highband excitation signal may no longer provide a suitable source excitation for a synthesis filter that is configured according to the filter parameters extracted from the original highband speech signal. As a result, the synthesized highband signal may contain audible artifacts that reduce the perceived quality of the decoded wideband speech signal.

The misalignment in time may also cause inefficiencies in gain envelope encoding. As mentioned above, a correlation is likely to exist between the temporal envelopes of narrowband excitation signal S80 and highband signal S30. By encoding the gain envelope of the highband signal according to a relation between these two temporal envelopes, an increase in coding efficiency may be realized as compared to encoding the gain envelope directly. When the encoded narrowband excitation signal is regularized, however, this correlation may be weakened. The misalignment in time between narrowband excitation signal S80 and highband signal S30 may cause fluctuations to appear in highband gain factors S60*b*, and coding efficiency may drop.

Configurations include methods of wideband speech encoding that perform time warping of a highband speech signal according to a time warping included in a corresponding encoded narrowband excitation signal. Potential advantages of such methods include improving the quality of a decoded wideband speech signal and/or improving the efficiency of coding a highband gain envelope.

Figure 25:
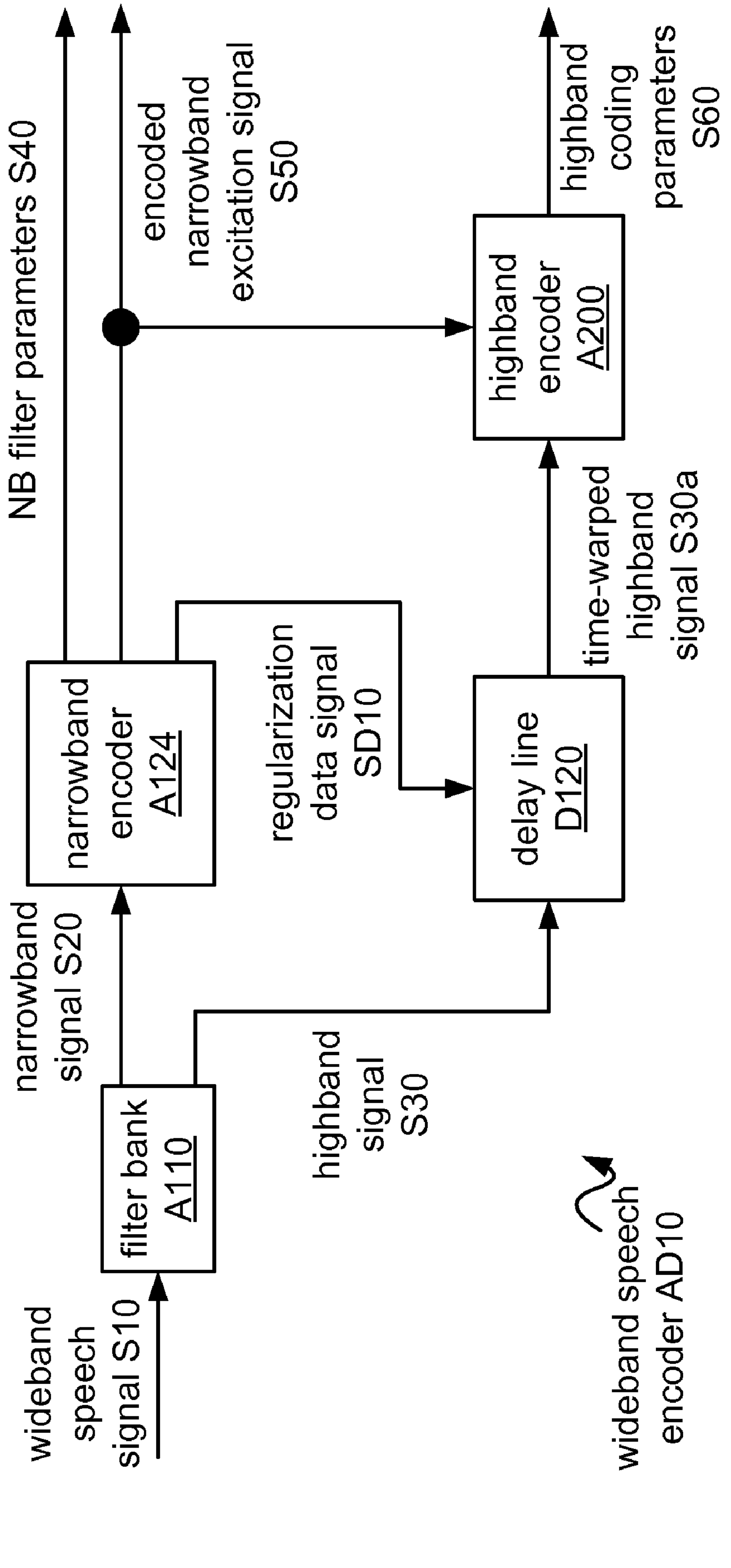
FIG. 25 shows a block diagram of an implementation AD10 of wideband speech encoder A100.

FIG. 25 shows a block diagram of an implementation AD10 of wideband speech encoder A100. Encoder AD10 includes an implementation A124 of narrowband encoder A120 that is configured to perform regularization during calculation of the encoded narrowband excitation signal S50. For example, narrowband encoder A124 may be configured according to one or more of the RCELP implementations discussed above.

Narrowband encoder A124 is also configured to output a regularization data signal SD10 that specifies the degree of time warping applied. For various cases in which narrowband encoder A124 is configured to apply a fixed time shift to each frame or subframe, regularization data signal SD10 may include a series of values indicating each time shift amount as an integer or non-integer value in terms of samples, milliseconds, or some other time increment. For a case in which narrowband encoder A124 is configured to otherwise modify the time scale of a frame or other sequence of samples (e.g., by compressing one portion and expanding another portion), regularization information signal SD10 may include a corresponding description of the modification, such as a set of function parameters. In one particular example, narrowband encoder A124 is configured to divide a frame into three subframes and to calculate a fixed time shift for each subframe, such that regularization data signal SD10 indicates three time shift amounts for each regularized frame of the encoded narrowband signal.

Wideband speech encoder AD10 includes a delay line D120 configured to advance or retard portions of highband speech signal S30, according to delay amounts indicated by an input signal, to produce time-warped highband speech signal S30*a*. In the example shown in FIG. 25, delay line D120 is configured to time warp highband speech signal S30 according to the warping indicated by regularization data signal SD10. In such manner, the same amount of time warping that was included in encoded narrowband excitation signal S50 is also applied to the corresponding portion of highband speech signal S30 before analysis. Although this example shows delay line D120 as a separate element from highband encoder A200, in other implementations delay line D120 is arranged as part of the highband encoder.

Further implementations of highband encoder A200 may be configured to perform spectral analysis (e.g., LPC analysis) of the unwarped highband speech signal S30 and to perform time warping of highband speech signal S30 before calculation of highband gain parameters S60*b*. Such an encoder may include, for example, an implementation of delay line D120 arranged to perform the time warping. In such cases, however, highband filter parameters S60*a* based on the analysis of unwarped signal S30 may describe a spectral envelope that is misaligned in time with highband excitation signal S120.

Figure 26A:
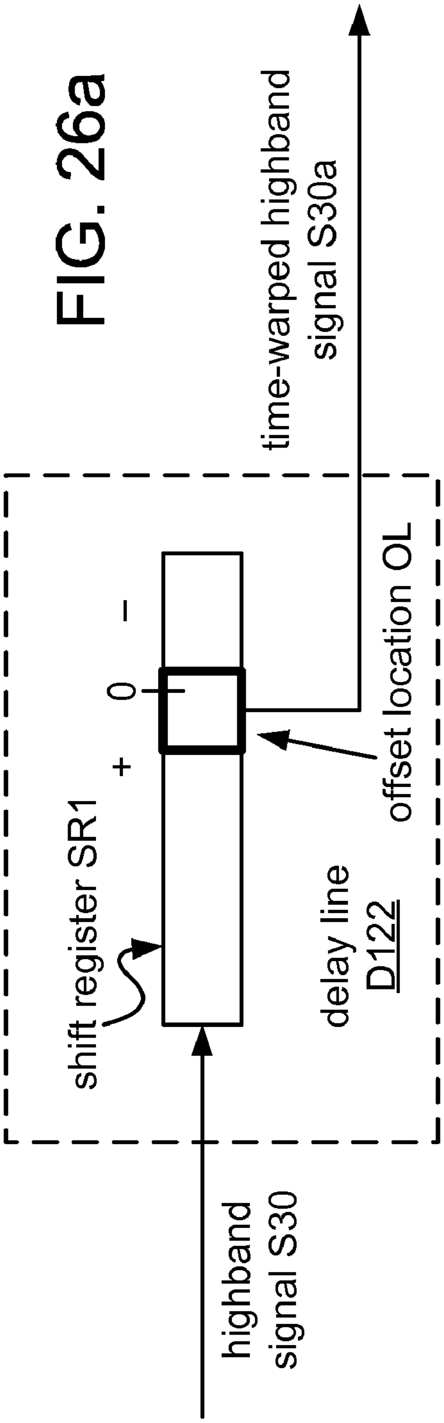
FIG. 26*a* shows a schematic diagram of an implementation D122 of delay line D120.

Delay line D120 may be configured according to any combination of logic elements and storage elements suitable for applying the desired time warping operations to highband speech signal S30. For example, delay line D120 may be configured to read highband speech signal S30 from a buffer according to the desired time shifts. FIG. 26*a* shows a schematic diagram of such an implementation D122 of delay line D120 that includes a shift register SR1. Shift register SR1 is a buffer of some length m that is configured to receive and store the m most recent samples of highband speech signal S30. The value m is equal to at least the sum of the maximum positive (or “advance”) and negative (or “retard”) time shifts to be supported. It may be convenient for the value m to be equal to the length of a frame or subframe of highband signal S30.

Delay line D122 is configured to output the time-warped highband signal S30*a* from an offset location OL of shift register SR1. The position of offset location OL varies about a reference position (zero time shift) according to the current time shift as indicated by, for example, regularization data signal SD10. Delay line D122 may be configured to support equal advance and retard limits or, alternatively, one limit larger than the other such that a greater shift may be performed in one direction than in the other. FIG. 26*a* shows a particular example that supports a larger positive than negative time shift. Delay line D122 may be configured to output one or more samples at a time (depending on an output bus width, for example).

A regularization time shift having a magnitude of more than a few milliseconds may cause audible artifacts in the decoded signal. Typically the magnitude of a regularization time shift as performed by a narrowband encoder A124 will not exceed a few milliseconds, such that the time shifts indicated by regularization data signal SD10 will be limited. However, it may be desired in such cases for delay line D122 to be configured to impose a maximum limit on time shifts in the positive and/or negative direction (for example, to observe a tighter limit than that imposed by the narrowband encoder).

Figure 26B:
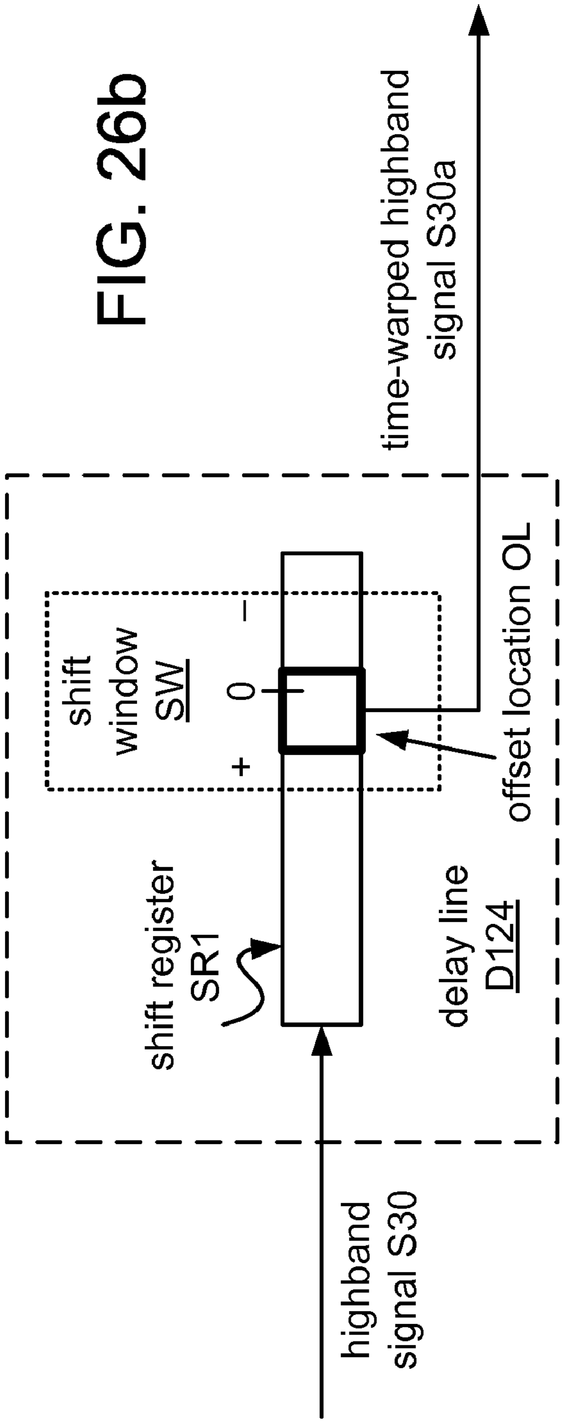
FIG. 26*b* shows a schematic diagram of an implementation D124 of delay line D120.

FIG. 26*b* shows a schematic diagram of an implementation D124 of delay line D122 that includes a shift window SW. In this example, the position of offset location OL is limited by the shift window SW. Although FIG. 26*b* shows a case in which the buffer length m is greater than the width of shift window SW, delay line D124 may also be implemented such that the width of shift window SW is equal to m.

Figure 27:
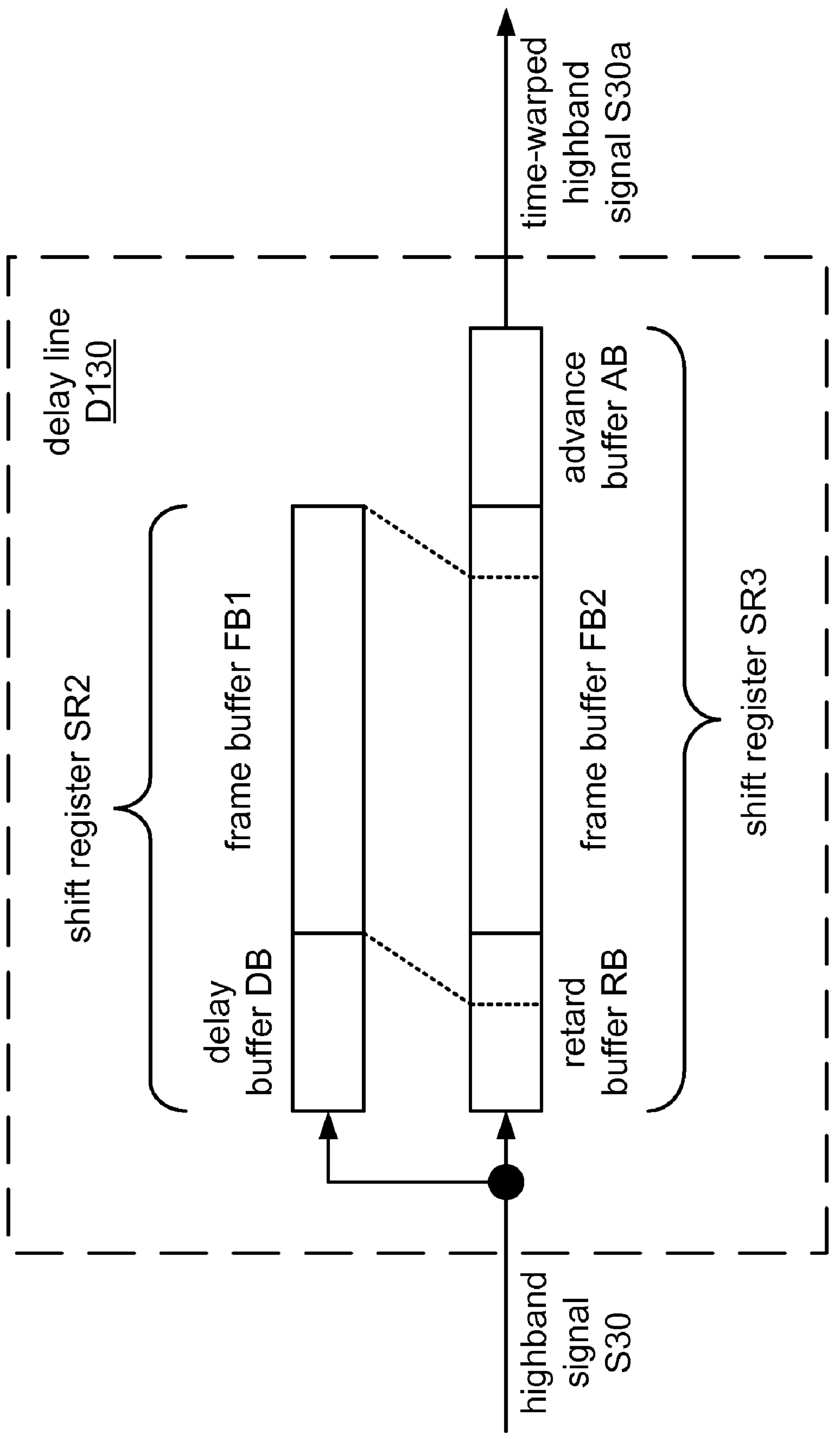
FIG. 27 shows a schematic diagram of an implementation D130 of delay line D120.

In other implementations, delay line D120 is configured to write highband speech signal S30 to a buffer according to the desired time shifts. FIG. 27 shows a schematic diagram of such an implementation D130 of delay line D120 that includes two shift registers SR2 and SR3 configured to receive and store highband speech signal S30. Delay line D130 is configured to write a frame or subframe from shift register SR2 to shift register SR3 according to a time shift as indicated by, for example, regularization data signal SD10. Shift register SR3 is configured as a FIFO buffer arranged to output time-warped highband signal S30.

In the particular example shown in FIG. 27, shift register SR2 includes a frame buffer portion FB1 and a delay buffer portion DB, and shift register SR3 includes a frame buffer portion FB2, an advance buffer portion AB, and a retard buffer portion RB. The lengths of advance buffer AB and retard buffer RB may be equal, or one may be larger than the other, such that a greater shift in one direction is supported than in the other. Delay buffer DB and retard buffer portion RB may be configured to have the same length. Alternatively, delay buffer DB may be shorter than retard buffer RB to account for a time interval utilized to transfer samples from frame buffer FB1 to shift register SR3, which may include other processing operations such as warping of the samples before storage to shift register SR3.

In the example of FIG. 27, frame buffer FB1 is configured to have a length equal to that of one frame of highband signal S30. In another example, frame buffer FB1 is configured to have a length equal to that of one subframe of highband signal S30. In such case, delay line D130 may be configured to include logic to apply the same (e.g., an average) delay to subframes of a frame to be shifted. Delay line D130 may also include logic to average values from frame buffer FB1 with values to be overwritten in retard buffer RB or advance buffer AB. In a further example, shift register SR3 may be configured to receive values of highband signal S30 via frame buffer FB1, and in such case delay line D130 may include logic to interpolate across gaps between successive frames or subframes written to shift register SR3. In other implementations, delay line D130 may be configured to perform a warping operation on samples from frame buffer FB1 before writing them to shift register SR3 (e.g., according to a function described by regularization data signal SD10).

Figure 28:
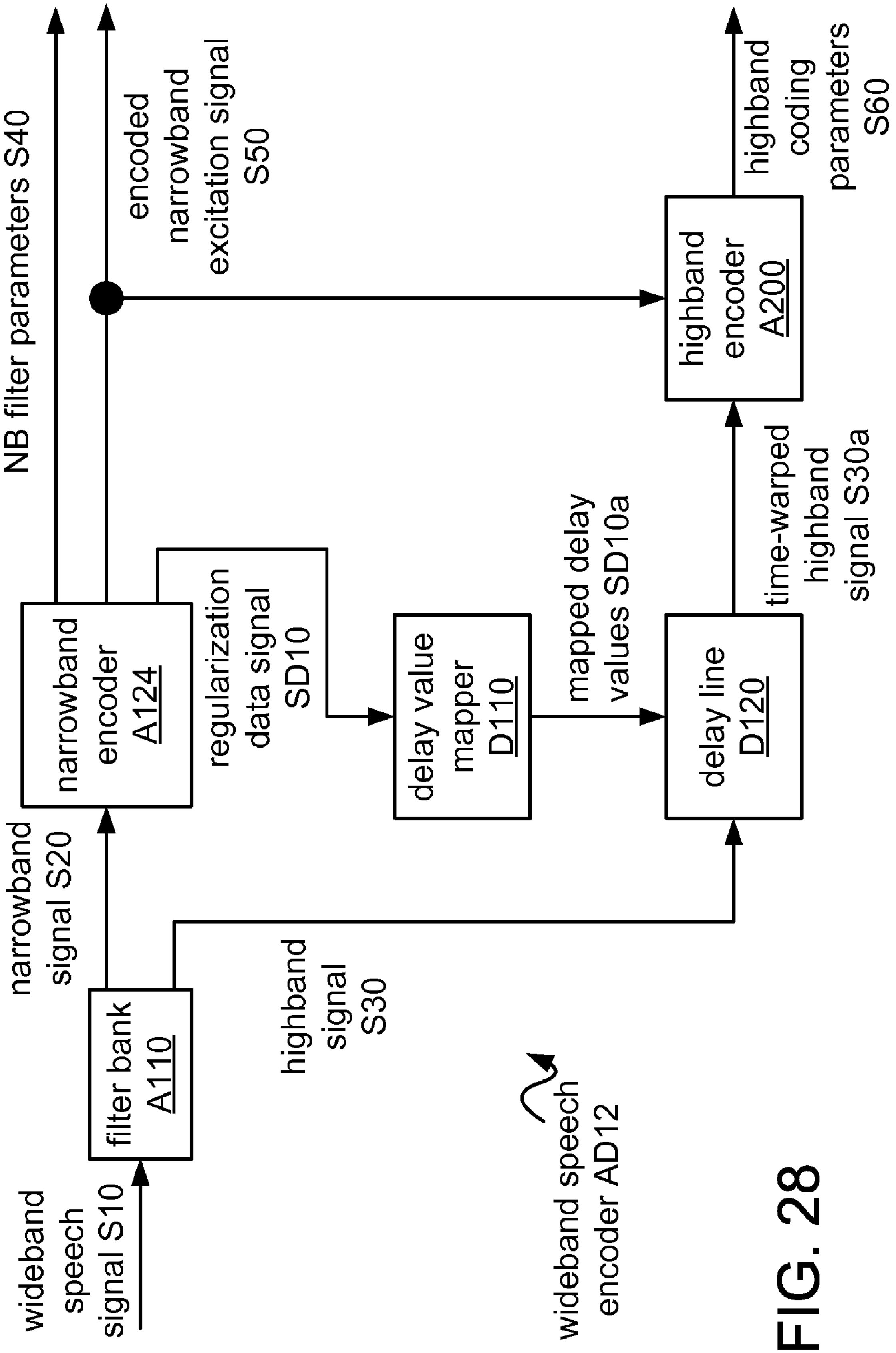
FIG. 28 shows a block diagram of an implementation AD12 of wideband speech encoder AD10.

It may be desirable for delay line D120 to apply a time warping that is based on, but is not identical to, the warping specified by regularization data signal SD10. FIG. 28 shows a block diagram of an implementation AD12 of wideband speech encoder AD10 that includes a delay value mapper D110. Delay value mapper D110 is configured to map the warping indicated by regularization data signal SD10 into mapped delay values SD10*a*. Delay line D120 is arranged to produce time-warped highband speech signal S30*a* according to the warping indicated by mapped delay values SD10*a*.

The time shift applied by the narrowband encoder may be expected to evolve smoothly over time. Therefore, it is typically sufficient to compute the average narrowband time shift applied to the subframes during a frame of speech, and to shift a corresponding frame of highband speech signal S30 according to this average. In one such example, delay value mapper D110 is configured to calculate an average of the subframe delay values for each frame, and delay line D120 is configured to apply the calculated average to a corresponding frame of highband signal S30. In other examples, an average over a shorter period (such as two subframes, or half of a frame) or a longer period (such as two frames) may be calculated and applied. In a case where the average is a non-integer value of samples, delay value mapper D110 may be configured to round the value to an integer number of samples before outputting it to delay line D120.

Narrowband encoder A124 may be configured to include a regularization time shift of a non-integer number of samples in the encoded narrowband excitation signal. In such a case, it may be desirable for delay value mapper D110 to be configured to round the narrowband time shift to an integer number of samples and for delay line D120 to apply the rounded time shift to highband speech signal S30.

In some implementations of wideband speech encoder AD10, the sampling rates of narrowband speech signal S20 and highband speech signal S30 may differ. In such cases, delay value mapper D110 may be configured to adjust time shift amounts indicated in regularization data signal SD10 to account for a difference between the sampling rates of narrowband speech signal S20 (or narrowband excitation signal S80) and highband speech signal S30. For example, delay value mapper D110 may be configured to scale the time shift amounts according to a ratio of the sampling rates. In one particular example as mentioned above, narrowband speech signal S20 is sampled at 8 kHz, and highband speech signal S30 is sampled at 7 kHz. In this case, delay value mapper D110 is configured to multiply each shift amount by ⅞. Implementations of delay value mapper D110 may also be configured to perform such a scaling operation together with an integer-rounding and/or a time shift averaging operation as described herein.

In further implementations, delay line D120 is configured to otherwise modify the time scale of a frame or other sequence of samples (e.g., by compressing one portion and expanding another portion). For example, narrowband encoder A124 may be configured to perform the regularization according to a function such as a pitch contour or trajectory. In such case, regularization data signal SD10 may include a corresponding description of the function, such as a set of parameters, and delay line D120 may include logic configured to warp frames or subframes of highband speech signal S30 according to the function. In other implementations, delay value mapper D110 is configured to average, scale, and/or round the function before it is applied to highband speech signal S30 by delay line D120. For example, delay value mapper D110 may be configured to calculate one or more delay values according to the function, each delay value indicating a number of samples, which are then applied by delay line D120 to time warp one or more corresponding frames or subframes of highband speech signal S30.

Figure 29:
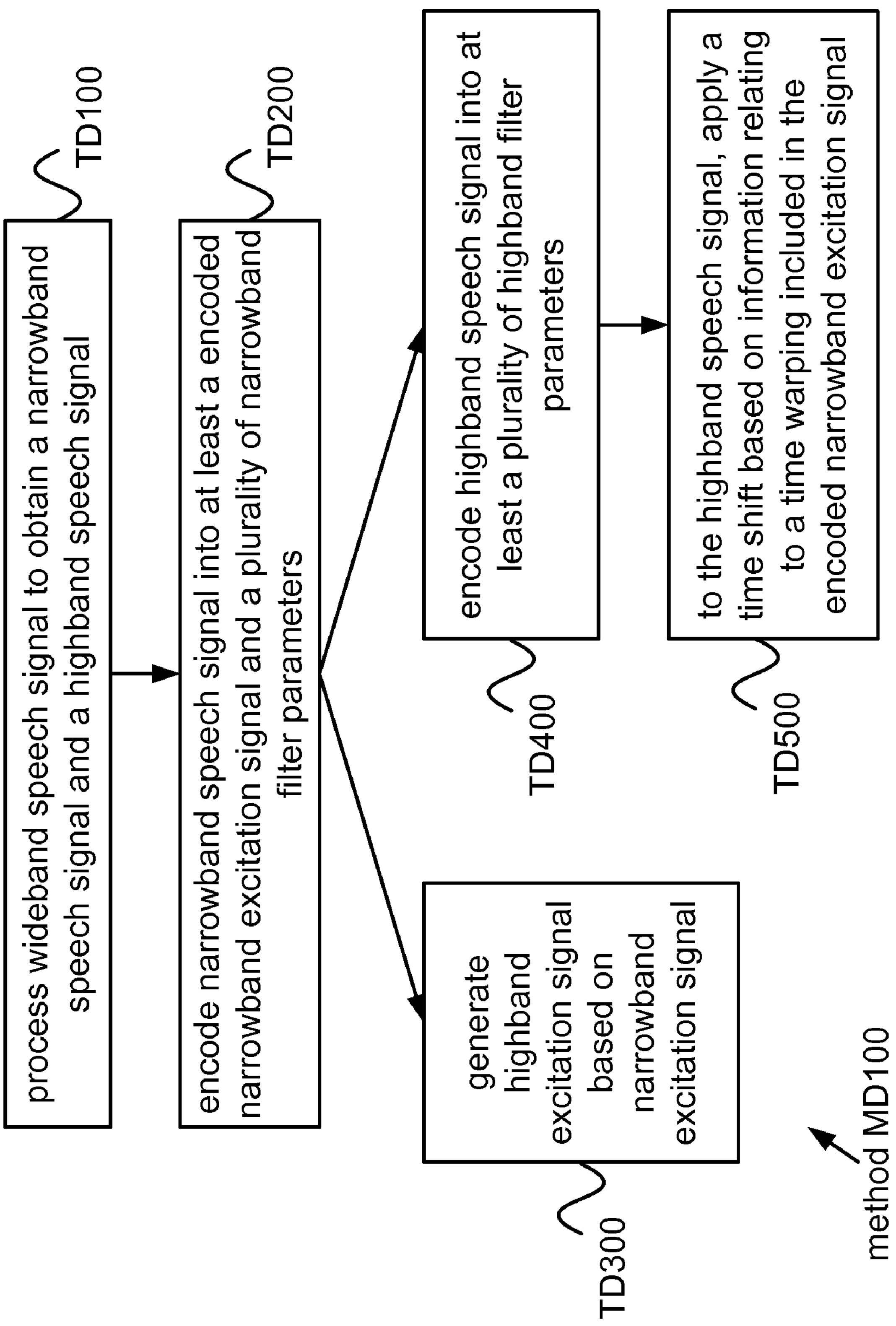
FIG. 29 shows a flow diagram of a method of signal processing MD100 according to an configuration.

FIG. 29 shows a flow diagram for a method MD100 of time warping a highband speech signal according to a time warping included in a corresponding encoded narrowband excitation signal. Task TD100 processes a wideband speech signal to obtain a narrowband speech signal and a highband speech signal. For example, task TD100 may be configured to filter the wideband speech signal using a filter bank having lowpass and highpass filters, such as an implementation of filter bank A110. Task TD200 encodes the narrowband speech signal into at least a encoded narrowband excitation signal and a plurality of narrowband filter parameters. The encoded narrowband excitation signal and/or filter parameters may be quantized, and the encoded narrowband speech signal may also include other parameters such as a speech mode parameter. Task TD200 also includes a time warping in the encoded narrowband excitation signal.

Task TD300 generates a highband excitation signal based on a narrowband excitation signal. In this case, the narrowband excitation signal is based on the encoded narrowband excitation signal. According to at least the highband excitation signal, task TD400 encodes the highband speech signal into at least a plurality of highband filter parameters. For example, task TD400 may be configured to encode the highband speech signal into a plurality of quantized LSFs. Task TD500 applies a time shift to the highband speech signal that is based on information relating to a time warping included in the encoded narrowband excitation signal.

Task TD400 may be configured to perform a spectral analysis (such as an LPC analysis) on the highband speech signal, and/or to calculate a gain envelope of the highband speech signal. In such cases, task TD500 may be configured to apply the time shift to the highband speech signal prior to the analysis and/or the gain envelope calculation.

Other implementations of wideband speech encoder A100 are configured to reverse a time warping of highband excitation signal S120 caused by a time warping included in the encoded narrowband excitation signal. For example, highband excitation generator A300 may be implemented to include an implementation of delay line D120 that is configured to receive regularization data signal SD10 or mapped delay values SD10*a*, and to apply a corresponding reverse time shift to narrowband excitation signal S80, and/or to a subsequent signal based on it such as harmonically extended signal S160 or highband excitation signal S120.

Further wideband speech encoder implementations may be configured to encode narrowband speech signal S20 and highband speech signal S30 independently from one another, such that highband speech signal S30 is encoded as a representation of a highband spectral envelope and a highband excitation signal. Such an implementation may be configured to perform time warping of the highband residual signal, or to otherwise include a time warping in an encoded highband excitation signal, according to information relating to a time warping included in the encoded narrowband excitation signal. For example, the highband encoder may include an implementation of delay line D120 and/or delay value mapper D110 as described herein that are configured to apply a time warping to the highband residual signal. Potential advantages of such an operation include more efficient encoding of the highband residual signal and a better match between the synthesized narrowband and highband speech signals.

As mentioned above, configurations as described herein include implementations that may be used to perform embedded coding, supporting compatibility with narrowband systems and avoiding a need for transcoding. Support for highband coding may also serve to differentiate on a cost basis between chips, chipsets, devices, and/or networks having wideband support with backward compatibility, and those having narrowband support. Support for highband coding as described herein may also be used in conjunction with a technique for supporting lowband coding, and a system, method, or apparatus according to such an configuration may support coding of frequency components from, for example, about 50 or 100 Hz up to about 7 or 8 kHz.

As mentioned above, adding highband support to a speech coder may improve intelligibility, especially regarding differentiation of fricatives. Although such differentiation may usually be derived by a human listener from the particular context, highband support may serve as an enabling feature in speech recognition and other machine interpretation applications, such as systems for automated voice menu navigation and/or automatic call processing.

An apparatus according to an configuration may be embedded into a portable device for wireless communications such as a cellular telephone or personal digital assistant (PDA). Alternatively, such an apparatus may be included in another communications device such as a VoIP handset, a personal computer configured to support VoIP communications, or a network device configured to route telephonic or VoIP communications. For example, an apparatus according to an configuration may be implemented in a chip or chipset for a communications device. Depending upon the particular application, such a device may also include such features as analog-to-digital and/or digital-to-analog conversion of a speech signal, circuitry for performing amplification and/or other signal processing operations on a speech signal, and/or radio-frequency circuitry for transmission and/or reception of the coded speech signal.

It is explicitly contemplated and disclosed that configurations may include and/or be used with any one or more of the other features disclosed in the U.S. Provisional Pat. Appls. Nos. 60/667,901 and 60/673,965. Such features include removal of high-energy bursts of short duration that occur in the highband and are substantially absent from the narrowband. Such features include fixed or adaptive smoothing of coefficient representations such as highband LSFs. Such features include fixed or adaptive shaping of noise associated with quantization of coefficient representations such as LSFs. Such features also include fixed or adaptive smoothing of a gain envelope, and adaptive attenuation of a gain envelope.

The various elements of implementations of highband excitation generators A300 and B300, highband encoder A100, highband decoder B200, wideband speech encoder A100, and wideband speech decoder B100 may be implemented as electronic and/or optical devices residing, for example, on the same chip or among two or more chips in a chipset, although other arrangements without such limitation are also contemplated. One or more elements of such an apparatus may be implemented in whole or in part as one or more sets of instructions arranged to execute on one or more fixed or programmable arrays of logic elements (e.g., transistors, gates) such as microprocessors, embedded processors, IP cores, digital signal processors, FPGAs (field-programmable gate arrays), ASSPs (application-specific standard products), and ASICs (application-specific integrated circuits). It is also possible for one or more such elements to have structure in common (e.g., a processor used to execute portions of code corresponding to different elements at different times, a set of instructions executed to perform tasks corresponding to different elements at different times, or an arrangement of electronic and/or optical devices performing operations for different elements at different times). Moreover, it is possible for one or more such elements to be used to perform tasks or execute other sets of instructions that are not directly related to an operation of the apparatus, such as a task relating to another operation of a device or system in which the apparatus is embedded.

Figure 30:
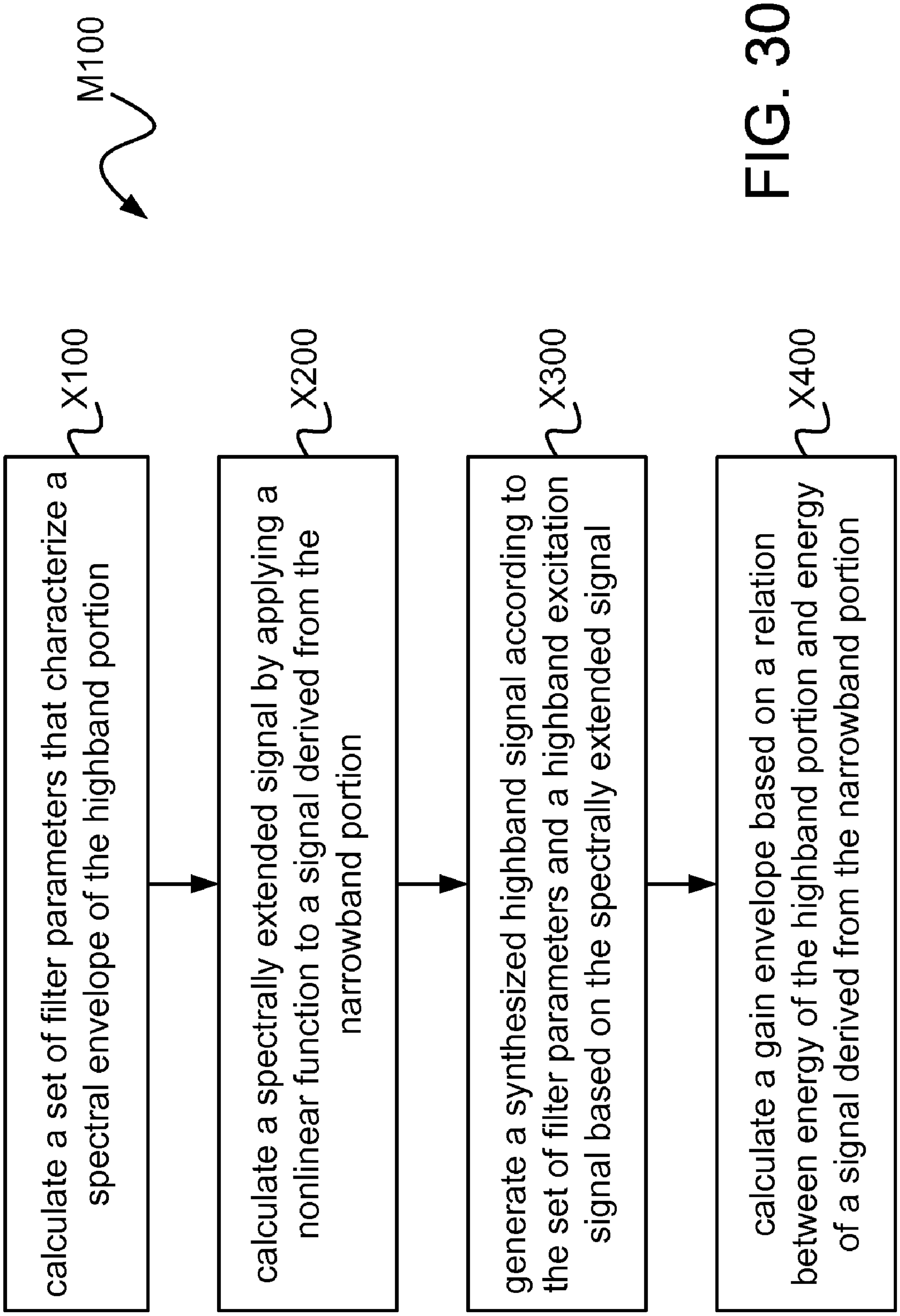
FIG. 30 shows a flow diagram for a method M100 according to an configuration.

FIG. 30 shows a flow diagram of a method M100, according to an configuration, of encoding a highband portion of a speech signal having a narrowband portion and the highband portion. Task X100 calculates a set of filter parameters that characterize a spectral envelope of the highband portion. Task X200 calculates a spectrally extended signal by applying a nonlinear function to a signal derived from the narrowband portion. Task X300 generates a synthesized highband signal according to (A) the set of filter parameters and (B) a highband excitation signal based on the spectrally extended signal. Task X400 calculates a gain envelope based on a relation between (C) energy of the highband portion and (D) energy of a signal derived from the narrowband portion.

Figure 31A:
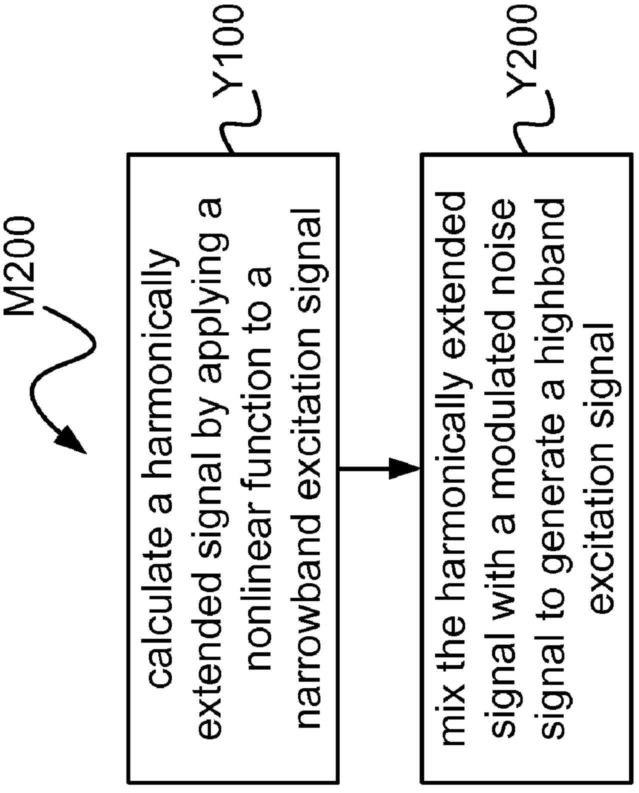
FIG. 31*a* shows a flow diagram for a method M200 according to an configuration.
Figure 31B:
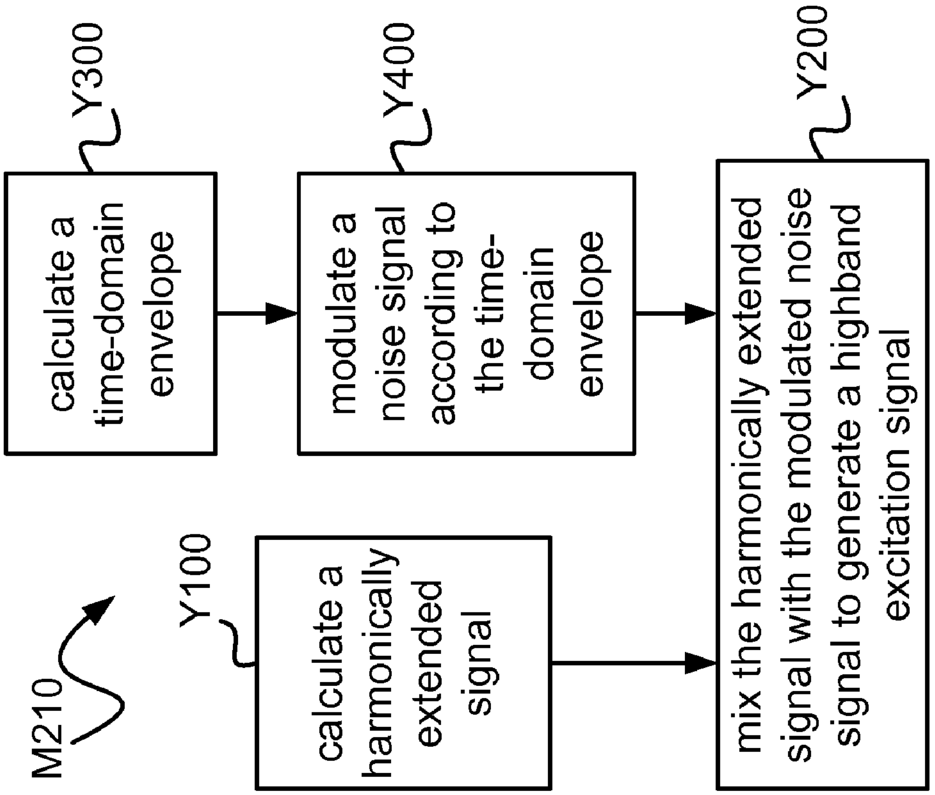
FIG. 31*b* shows a flow diagram for an implementation M210 of method M200.

FIG. 31*a* shows a flow diagram of a method M200 of generating a highband excitation signal according to an configuration. Task Y100 calculates a harmonically extended signal by applying a nonlinear function to a narrowband excitation signal derived from a narrowband portion of a speech signal. Task Y200 mixes the harmonically extended signal with a modulated noise signal to generate a highband excitation signal. FIG. 31*b* shows a flow diagram of a method M210 of generating a highband excitation signal according to another configuration including tasks Y300 and Y400. Task Y300 calculates a time-domain envelope according to energy over time of one among the narrowband excitation signal and the harmonically extended signal. Task Y400 modulates a noise signal according to the time-domain envelope to produce the modulated noise signal.

Figure 32:
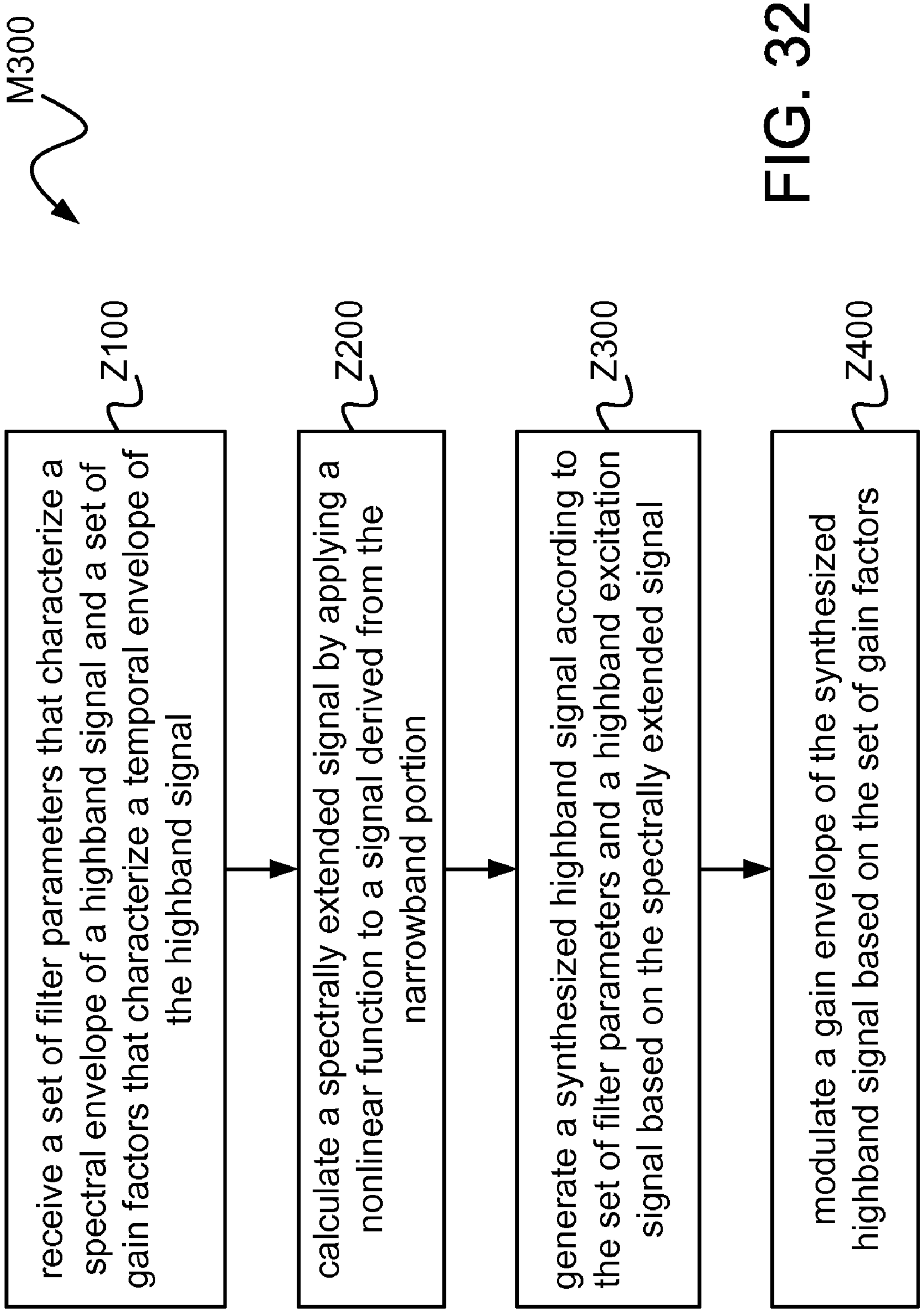
FIG. 32 shows a flow diagram for a method M300 according to an configuration.

FIG. 32 shows a flow diagram of a method M300 according to an configuration, of decoding a highband portion of a speech signal having a narrowband portion and the highband portion. Task Z100 receives a set of filter parameters that characterize a spectral envelope of the highband portion and a set of gain factors that characterize a temporal envelope of the highband portion. Task Z200 calculates a spectrally extended signal by applying a nonlinear function to a signal derived from the narrowband portion. Task Z300 generates a synthesized highband signal according to (A) the set of filter parameters and (B) a highband excitation signal based on the spectrally extended signal. Task Z400 modulates a gain envelope of the synthesized highband signal based on the set of gain factors. For example, task Z400 may be configured to modulate the gain envelope of the synthesized highband signal by applying the set of gain factors to an excitation signal derived from the narrowband portion, to the spectrally extended signal, to the highband excitation signal, or to the synthesized highband signal.

Figure 33:
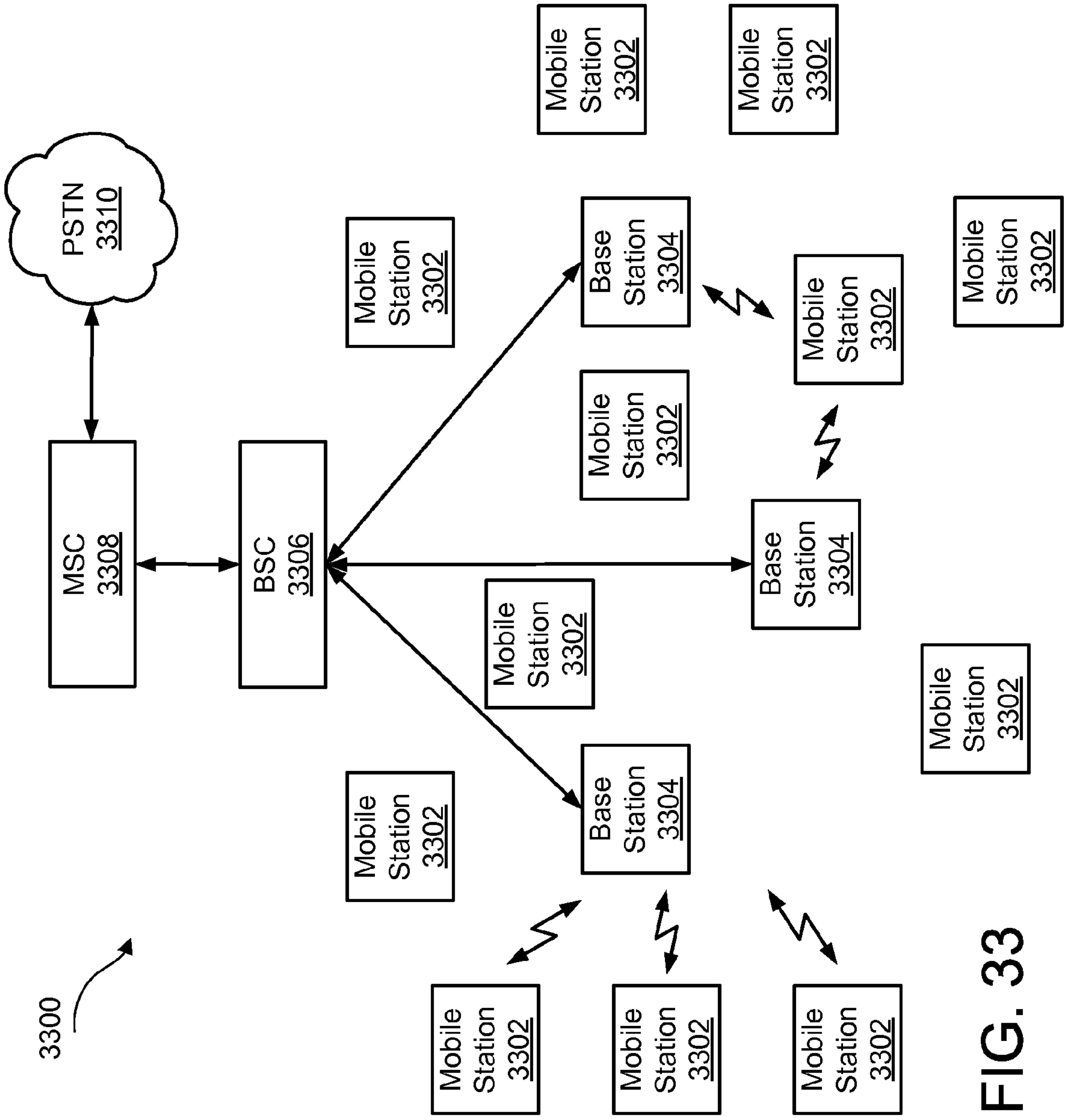
FIG. 33 illustrates one configuration of a wireless communication system.

FIG. 33 illustrates a code-division multiple access (CDMA) wireless telephone system 3300 that may include a plurality of mobile stations 3302, a plurality of base stations 3304, a base station controller (BSC) 3306 and a mobile switching center (MSC) 3308. The MSC 3308 may be configured to interface with a public switch telephone network (PSTN) 3310. The MSC 3308 may also be configured to interface with the BSC 3306. There may be more than one BSC 3306 in the system 3300. Each base station 3304 may include at least one sector (not shown), where each sector may have an omnidirectional antenna or an antenna pointed in a particular direction radially away from the base stations 3304. Alternatively, each sector may include two antennas for diversity reception. Each base station 3304 may be designed to support a plurality of frequency assignments. The intersection of a sector and a frequency assignment may be referred to as a CDMA channel. The mobile stations 3302 may include cellular or portable communication system (PCS) telephones.

During operation of the cellular telephone system 3300, the base stations 3304 may receive sets of reverse link signals from sets of mobile stations 3302. The mobile stations 3302 may be conducting telephone calls or other communications. Each reverse link signal received by a given base station 3304 may be processed within that base station 3304. The resulting data may be forwarded to the BSC 3306. The BSC 3306 may provide call resource allocation and mobility management functionality including the orchestration of soft handoffs between base stations 3304. The BSC 3306 may also route the received data to the MSC 3308, which provides additional routing services for interface with the PSTN 3310. Similarly, the PSTN 3310 may interface with the MSC 3308, and the MSC 3308 may interface with the BSC 3306, which in turn may control the base stations 3304 to transmit sets of forward link signals to sets of mobile stations 3302.

Figure 34:
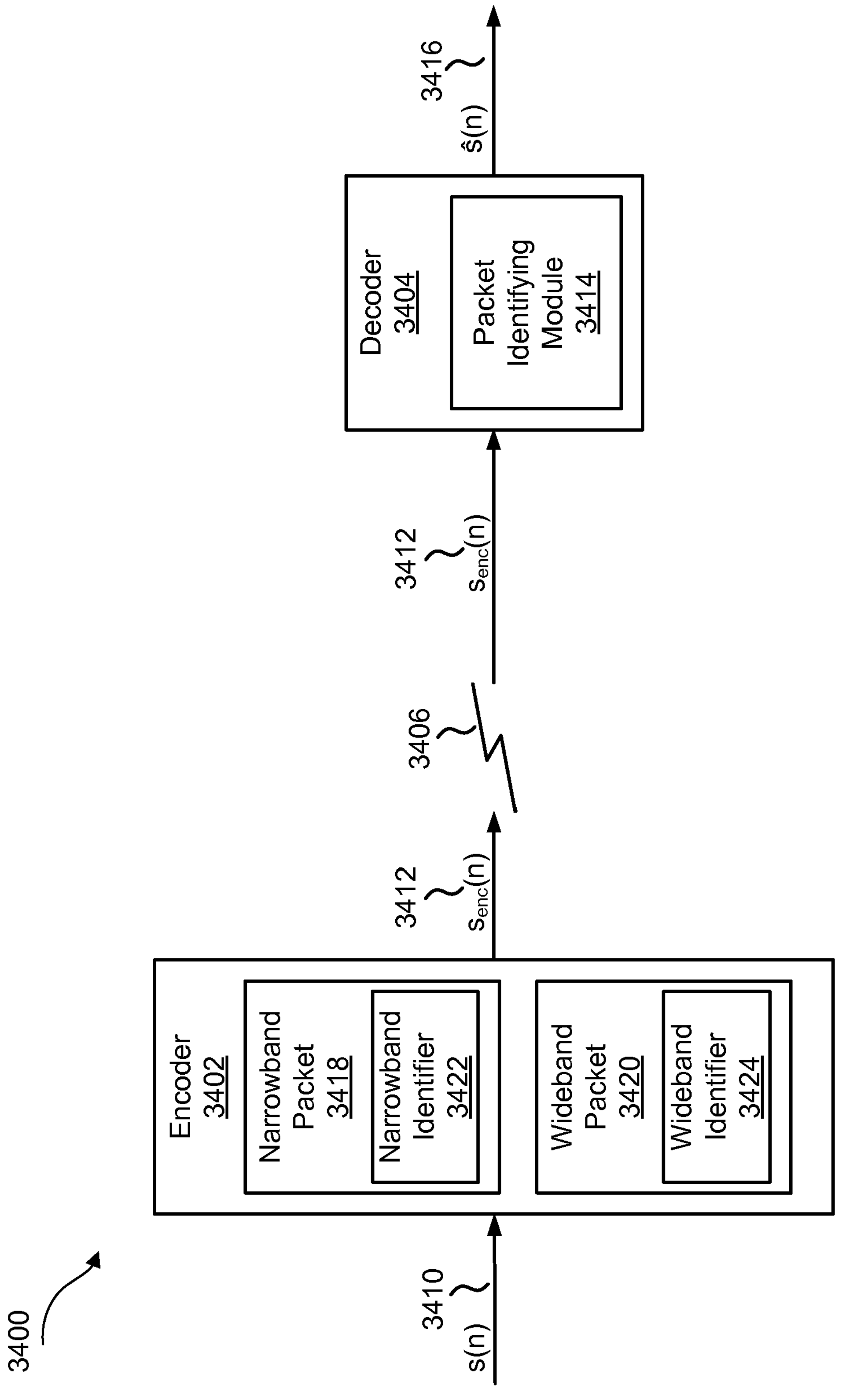
FIG. 34 is a block diagram illustrating one configuration of a signal transmission environment.

FIG. 34 depicts a signal transmission environment 3400 including an encoder 3402, a decoder 3404 and a transmission medium 3406. The encoder 3402 may be implemented within a mobile station 3302 or in a base station 3304. The decoder 3404 may be implemented in the base station 3304 or in the mobile station 3302. The encoder 3402 may encode a speech signal s(n) 3410, forming an encoded speech signal $s_{enc}(n)$ 3412. The encoded speech signal 3412 may be transmitted across the transmission medium 3406 to the decoder 3404. The decoder 3404 may decode $s_{enc}(n)$ 3412, thereby generating a synthesized speech signal $\hat{s}(n)$ 3416.

The term "coding" as used herein may refer generally to methods encompassing both encoding and decoding. Generally, coding systems, methods and apparatuses seek to minimize the number of bits transmitted via the transmission medium 3406 (i.e., minimize the bandwidth of $s_{enc}(n)$ 3412) while maintaining acceptable speech reproduction (i.e., s(n) 3410≈$\hat{s}(n)$ 3416). The apparatus may be a mobile phone, a personal digital assistant (PDA), a lap top computer, a digital camera, a music player, a game device, a base station or any other device with a processor. The composition of the encoded speech signal 3412 may vary according to the particular speech coding mode utilized by the encoder 3402. Various coding modes are described below.

The components of the encoder 3402 and the decoder 3404 described below may be implemented as electronic hardware, as computer software, or combinations of both. These components are described below in terms of their functionality. Whether the functionality is implemented as hardware or software may depend upon the particular application and design constraints imposed on the overall system. The transmission medium 3406 may represent many different transmission media, including, but not limited to, a land-based communication line, a link between a base station and a satellite, wireless communication between a cellular telephone and a base station, or between a cellular telephone and a satellite.

Each party to a communication may transmit data as well as receive data. Each party may utilize an encoder 3402 and a decoder 3404. However, the signal transmission environment 3400 will be described below as including the encoder 3402 at one end of the transmission medium 3406 and the decoder 3404 at the other.

For purposes of this description, s(n) 3410 may include a digital speech signal obtained during a typical conversation including different vocal sounds and periods of silence. The speech signal s(n) 3410 may be partitioned into frames, and each frame may be further partitioned into subframes. These arbitrarily chosen frame/subframe boundaries may be used where some block processing is performed. Operations described as being performed on frames might also be performed on subframes, in this sense, frame and subframe are used interchangeably herein. However, s(n) 3410 may not be partitioned into frames/subframes if continuous processing rather than block processing is implemented. As such, the block techniques described below may be extended to continuous processing.

The encoder 3402 may be implemented as a narrowband (NB) coder or a wideband (WB) coder. A NB coder may digitally sample the signal s(n) 3410 at 8 kHz and code signal information present in a bandwidth of 50 Hz-4 kHz. An example of a NB coder may include an enhanced variable-rate coder (EVRC-B). A WB coder may digitally sample the signal s(n) 3410 at 16 kHz and code information present in the NB coder's bandwidth plus between the ranges of 4-8 kHz. An example of a WB coder may include an EVRC-WB coder. In one aspect, EVRC-WB is a wideband extension of EVRC-B. Each frame partitioned from the signal s(n) 3410 may include 20 milliseconds (ms) of data, or 160 samples. Each subframe may include 53 or 54 samples of data. While these parameters may be appropriate for speech coding, they are merely examples and other suitable alternative parameters could be used.

If the encoder 3402 is implemented as a NB coder, a frame may be packed as a narrowband packet 3418. The narrowband packet 3418 may include a narrowband identifier 3422. The identifier 3422 may indicate to the decoder 3404 that the narrowband packet 3418 was encoded using a NB coder. If the encoder 3402 is implemented as a WB coder, a frame may be packed as a wideband packet 3420. The wideband packet 3420 may include a wideband identifier 3424. The identifier 3424 may indicate to the decoder 3404 that the wideband packet 3420 was encoded using a WB coder. The decoder 3404 may include a packet identifying module 3414 that may recognize the identifier 3422 or 3424 and determine if a NB decoder or a WB decoder should be implemented to decode the packet 3418 or 3420.

Figure 35:
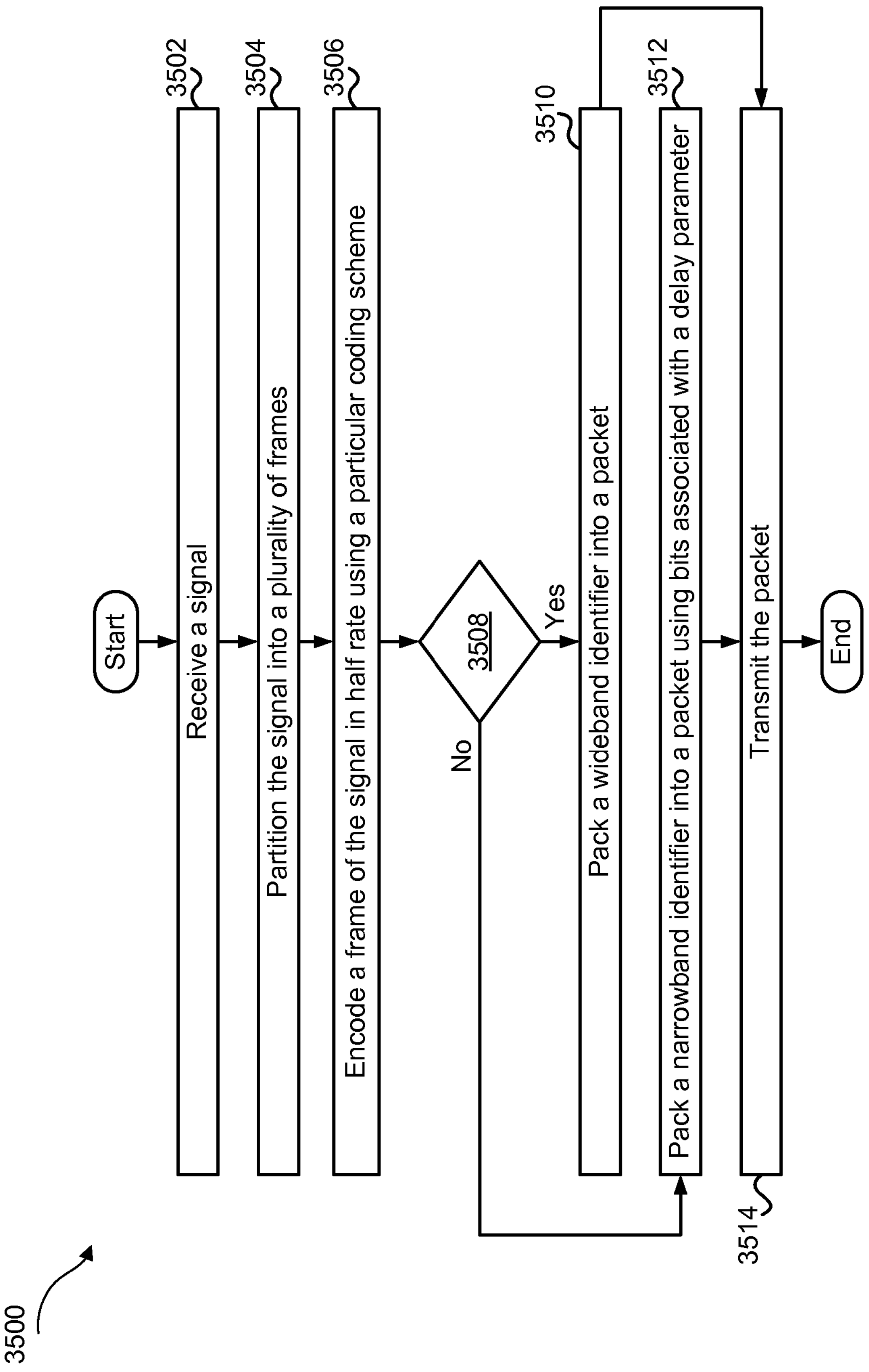
FIG. 35 is a flow diagram illustrating one configuration of a method for including an identifier with a packet associated with a speech signal.

FIG. 35 is a flow diagram illustrating one configuration of a method 3500 for including an identifier with a packet associated with a speech signal. In one aspect, the identifier may indicate if the packet was encoded by a NB coder or a WB coder. The method 3500 may be implemented by an encoder, such as the encoder 3402.

A signal may be received 3502 by the encoder 3402. In one aspect, the signal is a type of speech signal. The signal may be analyzed and partitioned 3504 into a plurality of frames. A partitioned frame of the signal may be encoded 3506 in half rate using a particular coding scheme (e.g., CELP, PPP, NELP). In one aspect, the packet may be encoded with 80 bits. The term "half rate" may be used to represent a packet with 80 bits. A determination 3508 is made if the frame is a wideband half-rate frame including 80 bits. In other words, a determination 3508 is made whether the encoder 3402 acted as a WB coder and encoded the frame as a wideband half-rate (WB-HR) frame. If the frame is a WB-HR frame, a wideband identifier may be packed 3510 into a packet. In one aspect, the wideband identifier includes the first six digits of the decimal numbers "126" and "127" in binary form. The decimal number "126" in binary form is "1111110" and the binary form of "127" is "1111111." As such, the wideband identifier may include a string of six ones (e.g., "111111").

If it is determined in 3508 that the frame is not a WB-HR frame, a narrowband identifier may be packed 3512 into a packet. In one aspect, the narrowband identifier may be associated with a delay parameter. For example, bits used to represent a delay parameter may also be used as the narrowband identifier. The packet may be transmitted 3514. In one aspect, the packet is transmitted 3514 to a decoder.

Figure 36:
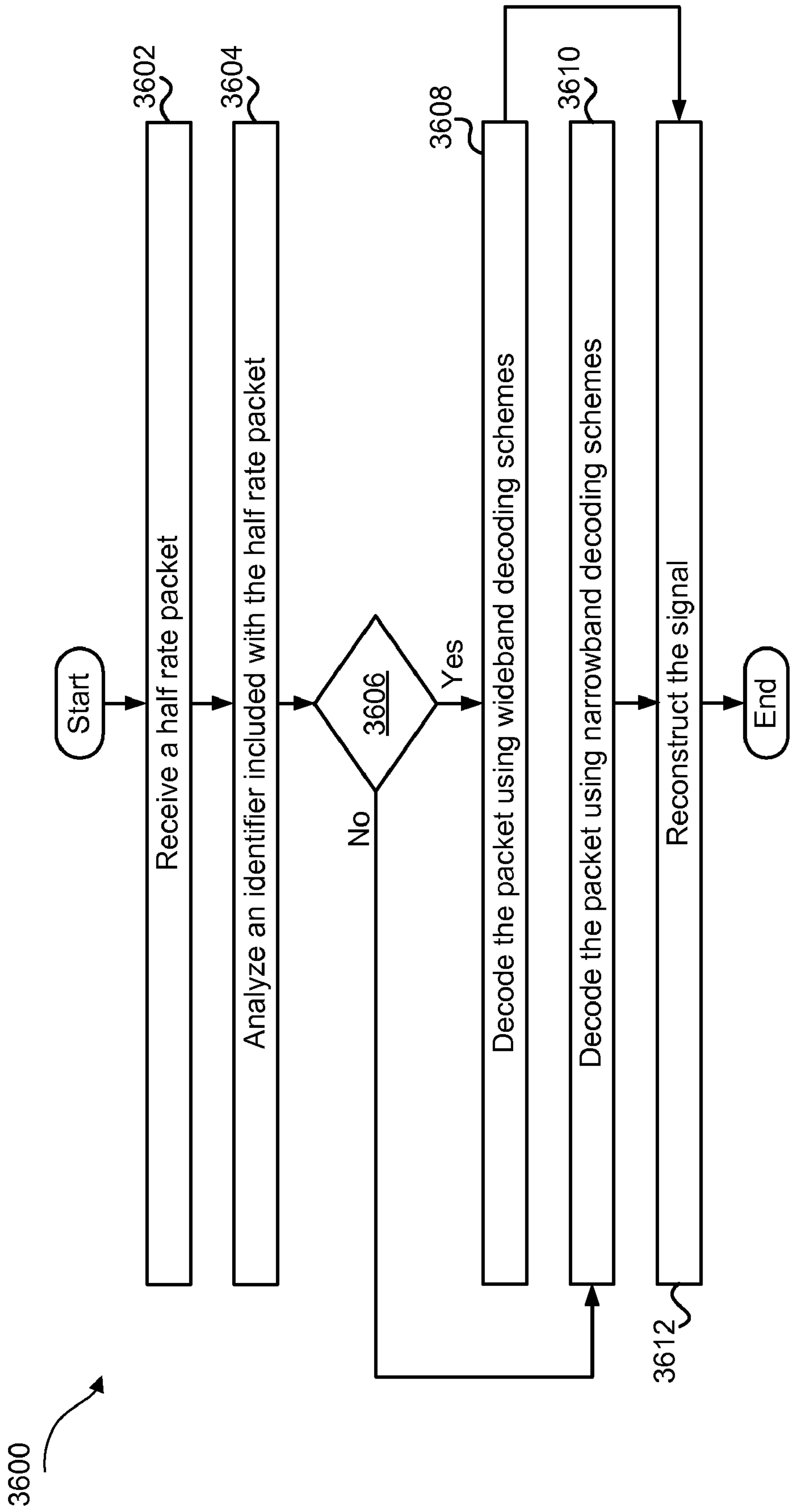
FIG. 36 is a flow diagram illustrating one configuration of a method of decoding a packet.

FIG. 36 is a flow diagram illustrating one configuration of a method 3600 of decoding a packet. The method 3600 may be implemented by the decoder 3404. In one aspect a half rate packet is received 3602. An identifier included in the half rate packet may be analyzed 3604. The identifier may indicate if the half rate packet was encoded by a WB coder or a NB coder. In one aspect, the identifier is a special packet identifier (ID) which is an invalid/illegal lag. A determination 3606 is made if the packet is a WB-HR packet based on the analysis of the identifier. If the packet is a WB-HR packet, the packet may be decoded 3608 using wideband decoding schemes. In one configuration, the decoder 3404 acts as a WB decoder. However, if it is determined 3606 that the packet is not a WB-HR, the packet may be decoded 3610 using narrowband decoding schemes. The decoder 3404 may act as a NB decoder. A signal may be reconstructed 3612 from one or more decoded packets.

Figure 37:
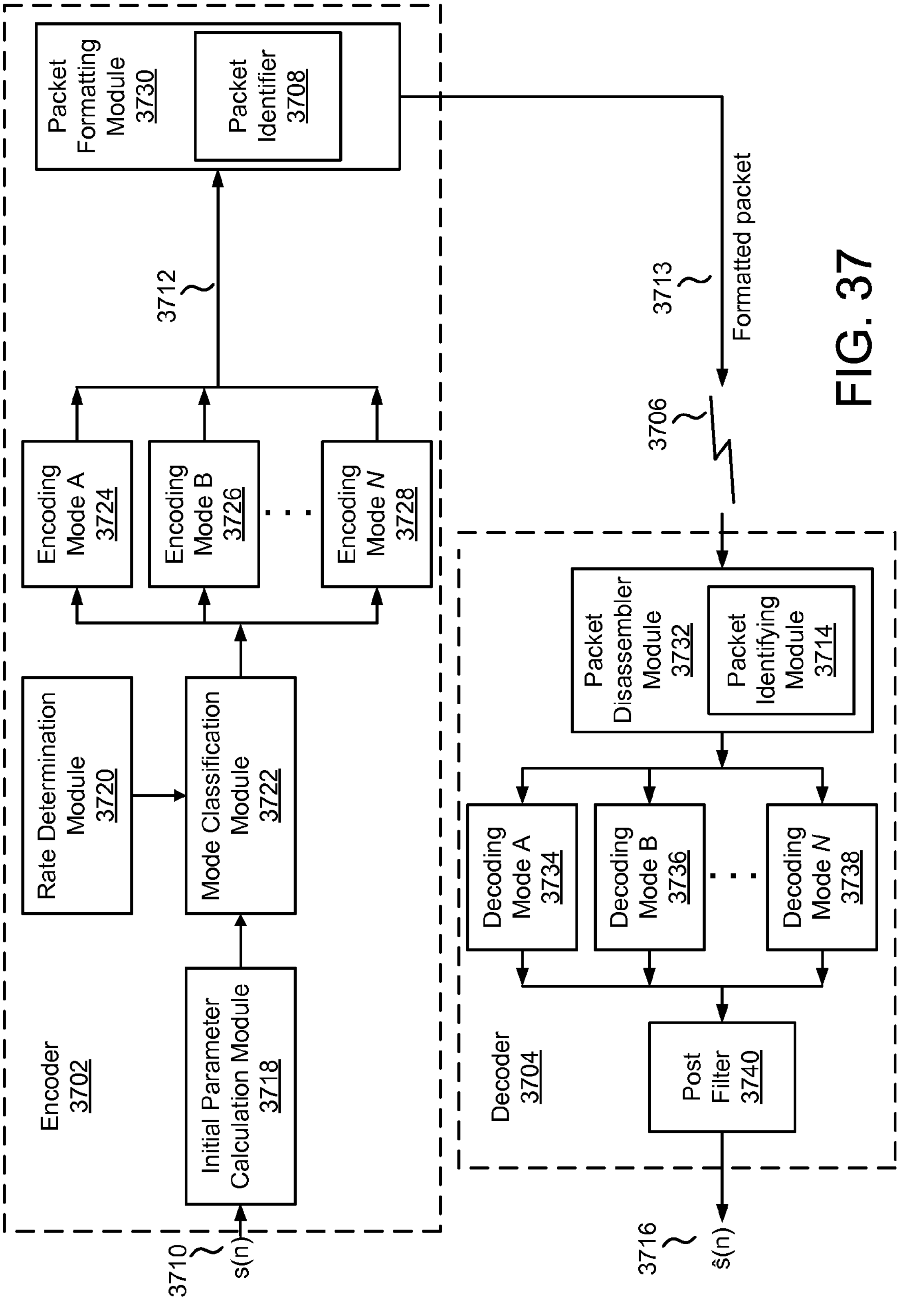
FIG. 37 is a block diagram illustrating one configuration of a multi-mode encoder communicating with a multi-mode decoder.

FIG. 37 is a block diagram illustrating one configuration of a multi-mode encoder 3702 communicating with a multi-mode decoder 3704 across a communications channel 3706. The communication channel 3706 may include a radio frequency (RF) interface. The encoder 3702 may include an associated decoder (not shown). The encoder 3702 and its associated decoder may form a first speech coder. The decoder 3704 may include an associated encoder (not shown). The decoder 3704 and its associated encoder may form a second speech coder.

The encoder 3702 may include an initial parameter calculation module 3718, a rate determination module 3720, a mode classification module 3722, a plurality of encoding modes 3724, 3726, 3728 and a packet formatting module 3730. The packet formatting module 3730 may insert a packet identifier 3708. The number of encoding modes 3724, 3726, 3728 is shown as N, which may signify any number of encoding modes 3724, 3726, 3728. For simplicity, three encoding modes 3724, 3726, 3728 are shown, with a dotted line indicating the existence of other encoding modes.

The decoder 3704 may include a packet disassembler module 3732, a plurality of decoding modes 3734, 3736, 3738 and a post filter 3740. The packet disassembler module 3732 may include a packet identifying module 3714. The number of decoding modes 3734, 3736, 3738 is shown as N, which may signify any number of decoding modes 3734, 3736, 3738. For simplicity, three decoding modes 3734, 3736, 3738 are shown, with a dotted line indicating the existence of other decoding modes.

A speech signal, s(n) 3710, may be provided to the initial parameter calculation module 3718. The speech signal 3710 may be divided into blocks of samples referred to as frames. The value n may designate the frame number or the value n may designate a sample number in a frame. In an alternate configuration, a linear prediction (LP) residual error signal may be used in place of the speech signal 3710. The LP residual error signal may be used by speech coders such as a code excited linear prediction (CELP) coder.

The initial parameter calculation module 3718 may derive various parameters based on the current frame. In one aspect, these parameters include at least one of the following: linear predictive coding (LPC) filter coefficients, line spectral pair (LSP) coefficients, normalized autocorrelation functions (NACFs), open-loop lag, zero crossing rates, band energies, and the formant residual signal.

The initial parameter calculation module 3718 may be coupled to the mode classification module 3722. The mode classification module 3722 may dynamically switch between the encoding modes 3724, 3726, 3728. The initial parameter calculation module 3718 may provide parameters to the mode classification module 3722. The mode classification module 3722 may be coupled to the rate determination module 3720. The rate determination module 3720 may accept a rate command signal. The rate command signal may direct the encoder 3702 to encode the speech signal 3710 at a particular rate. In one aspect, the particular rate includes a full-rate which may indicate that the speech signal 3710 is to be coded using one hundred and seventy-one bits. In another example, the particular rate includes a half-rate which may indicate that the speech signal 3710 is to be coded using eighty bits. In a further example, the particular rate includes an eighth rate which may indicate that the speech signal 3710 is to be coded using sixteen bits.

As previously stated, the mode classification module 3722 may be coupled to dynamically switch between the encoding modes 3724, 3726, 3728 on a frame-by-frame basis in order to select the most appropriate encoding mode 3724, 3726, 3728 for the current frame. The mode classification module 3722 may select a particular encoding mode 3724, 3726, 3728 for the current frame by comparing the parameters with predefined threshold and/or ceiling values. In addition, the mode classification module 3722 may select a particular encoding mode 3724, 3726, 3728 based upon the rate command signal received from the rate determination module 3720. For example, encoding mode A 3724 may encode the speech signal 3710 using one-hundred and seventy-one bits while encoding mode B 3726 may encode the speech signal 3710 using eighty bits.

Based upon the energy content of the frame, the mode classification module 3722 may classify the frame as non-speech or inactive speech (e.g., silence, background noise, or pauses between words), or speech. Based upon the periodicity of the frame, the mode classification module 3722 may classify speech frames as a particular type of speech, e.g., voiced, unvoiced, or transient.

Voiced speech may include speech that exhibits a relatively high degree of periodicity and may include vowel sounds. A pitch period may be a component of a speech frame that may be used to analyze and reconstruct the contents of the frame. Unvoiced speech may include consonant sounds. Transient speech frames may include transitions between voiced and unvoiced speech. Frames that are classified as neither voiced nor unvoiced speech may be classified as transient speech.

Speech mode (also called voicing mode) indicates whether the current frame represents voiced or unvoiced speech. This parameter may have a binary value based on one or more measures of periodicity (e.g., zero crossings, NACFs, pitch gain) and/or voice activity for the frame, such as a relation between such a measure and a threshold value. In other implementations, the speech mode parameter has one or more other states to indicate modes such as silence or background noise, or a transition between silence and voiced speech.

Classifying the speech frames may allow different encoding modes 3724, 3726, 3728 to be used to encode different types of speech, resulting in more efficient use of bandwidth in a shared channel, such as the communication channel 3706. For example, as voiced speech is periodic and thus highly predictive, a low-bit-rate, highly predictive encoding mode 3724, 3726, 3728 may be employed to encode voiced speech.

The mode classification module 3722 may select an encoding mode 3724, 3726, 3728 for the current frame based upon the classification of the frame. The various encoding modes 3724, 3726, 3728 may be coupled in parallel. One or more of the encoding modes 3724, 3726, 3728 may be operational at any given time. In one configuration, one encoding mode 3724, 3726, 3728 is selected according to the classification of the current frame.

The different encoding modes 3724, 3726, 3728 may operate according to different coding bit rates, different coding schemes, or different combinations of coding bit rate and coding scheme. As previously stated, the various coding rates used may be full rate, half rate, quarter rate, and/or eighth rate. The various coding schemes used may be CELP coding, prototype pitch period (PPP) coding (or waveform interpolation (WI) coding), and/or noise excited linear prediction (NELP) coding. Thus, for example, a particular encoding mode 3724, 3726, 3728 may be full rate CELP, another encoding mode 3724, 3726, 3728 may be half rate CELP, another encoding mode 3724, 3726, 3728 may be full rate PPP, and another encoding mode 3724, 3726, 3728 may be NELP.

In accordance with a CELP encoding mode 3724, 3726, 3728, a linear predictive vocal tract model may be excited with a quantized version of the LP residual signal. In CELP encoding mode, the entire current frame may be quantized. The CELP encoding mode 3724, 3726, 3728 may provide for relatively accurate reproduction of speech but at the cost of a relatively high coding bit rate. The CELP encoding mode 3724, 3726, 3728 may be used to encode frames classified as transient speech.

In accordance with a NELP encoding mode 3724, 3726, 3728, a filtered, pseudo-random noise signal may be used to model the LP residual signal. The NELP encoding mode 3724, 3726, 3728 may be a relatively simple technique that achieves a low bit rate. The NELP encoding mode 3724, 3726, 3728 may be used to encode frames classified as unvoiced speech.

In accordance with a PPP encoding mode 3724, 3726, 3728, a subset of the pitch periods within each frame may be encoded. The remaining periods of the speech signal may be reconstructed by interpolating between these prototype periods. In a time-domain implementation of PPP coding, a first set of parameters may be calculated that describes how to modify a previous prototype period to approximate the current prototype period. One or more codevectors may be selected which, when summed, approximate the difference between the current prototype period and the modified previous prototype period. A second set of parameters describes these selected codevectors. In a frequency-domain implementation of PPP coding, a set of parameters may be calculated to describe amplitude and phase spectra of the prototype. In accordance with the implementation of PPP coding, the decoder 3704 may synthesize an output speech signal 3716 by reconstructing a current prototype based upon the sets of parameters describing the amplitude and phase. The past prototype period may be used as a predictor of the current prototype period's amplitude and/or phase. The speech signal may be interpolated over the region between the current reconstructed prototype period and a previous reconstructed prototype period. The prototype may include a portion of the current frame that will be linearly interpolated with prototypes from previous frames that were similarly positioned within the frame in order to reconstruct the speech signal 3710 or the LP residual signal at the decoder 3704.

Coding the prototype period rather than the entire speech frame may reduce the coding bit rate. Frames classified as voiced speech may be coded with a PPP encoding mode 3724, 3726, 3728. By exploiting the periodicity of the voiced speech, the PPP encoding mode 3724, 3726, 3728 may achieve a lower bit rate than the CELP encoding mode 3724, 3726, 3728.

The selected encoding mode 3724, 3726, 3728 may be coupled to the packet formatting module 3730. The selected encoding mode 3724, 3726, 3728 may encode, or quantize, the current frame and provide the quantized frame parameters 3712 to the packet formatting module 3730. The packet formatting module 3730 may assemble the quantized frame parameters 3712 into a formatted packet 3713. The packet formatting module 3730 may format the packet as a wideband packet or a narrowband packet. A packet identifier 3708 may be included in the packet. As previously explained, the packet identifier 3708 may indicate to the decoder 3704 if the packet is a wideband packet or a narrowband packet. The packet formatting module 3730 may provide the formatted packet 3713 to a receiver (not shown) over a communications channel 3706. The receiver may receive, demodulate, and digitize the formatted packet 3713, and provide the packet 3713 to the decoder 3704.

In the decoder 3704, the packet disassembler module 3732 receives the packet 3713 from the receiver. The packet disassembler module 3732 may unpack the packet 3713 and the packet identifying module 3714 may recognize the packet identifier 3708 including in the packet 3713. The packet identifying module 3714 may discover that the packet 3713 is a WB-HR packet or a narrowband half rate packet. The packet disassembler module 3732 may also be configured to dynamically switch between the decoding modes 3734, 3736, 3738 on a packet-by-packet basis. The number of decoding modes 3734, 3736, 3738 may be the same as the number of encoding modes 3724, 3726, 3728. Each numbered encoding mode 3724, 3726, 3728 may be associated with a respective similarly numbered decoding mode 3734, 3736, 3738 configured to employ the same coding bit rate and coding scheme.

If the packet disassembler module 3732 detects the packet 3713, the packet 3713 is disassembled and provided to the pertinent decoding mode 3734, 3736, 3738. The pertinent decoding mode 3734, 3736, 3738 may implement wideband or narrowband decoding techniques based on the analysis of the packet identifier 3708. If the packet disassembler module 3732 does not detect a packet, a packet loss is declared and an erasure decoder (not shown) may perform frame erasure processing. The parallel array of decoding modes 3734, 3736, 3738 may be coupled to the post filter 3740. The pertinent decoding mode 3734, 3736, 3738 may decode, or de-quantize, the packet 3713 and provide the information to the post filter 3740. The post filter 3740 may reconstruct, or synthesize, the speech frame, outputting a synthesized speech frame, $\hat{s}(n)$ 3716.

In one configuration, the quantized parameters themselves are not transmitted. Instead, codebook, indices specifying addresses in various lookup tables (LUTs) (not shown) in the decoder 3704 are transmitted. The decoder 3704 may receive the codebook indices and searches the various codebook LUTs for appropriate parameter values. Accordingly, codebook indices for parameters such as, e.g., pitch lag, adaptive codebook gain, and LSP may be transmitted, and three associated codebook LUTs may be searched by the decoder 3704.

In accordance with the CELP encoding mode, pitch lag, pitch gain, code book parameters, and LSP parameters may be transmitted. The LSP codebook indices are transmitted because the LP residual signal may be synthesized at the decoder 3704. Additionally, the difference between the pitch lag value for the current frame and the pitch lag value for the previous frame may be transmitted.

In accordance with a PPP encoding mode in which the speech signal 3710 is to be synthesized at the decoder 3704, the pitch lag, amplitude, and phase parameters are transmitted. The lower bit rate employed by PPP speech coding techniques may not permit transmission of both absolute pitch lag information and relative pitch lag difference values.

In accordance with one example, highly periodic frames such as voiced speech frames are transmitted with a low-bit-rate PPP encoding mode that quantizes the difference between the pitch lag value for the current frame and the pitch lag value for the previous frame for transmission, and does not quantize the absolute pitch lag value for the current frame for transmission. Because voiced frames are highly periodic in nature, transmitting the difference value as opposed to the absolute pitch lag value may allow a lower coding bit rate to be achieved. In one aspect, this quantization is generalized such that a weighted sum of the parameter values for previous frames is computed, wherein the sum of the weights is one, and the weighted sum is subtracted from the parameter value for the current frame. The difference may then be quantized.

Figure 38:
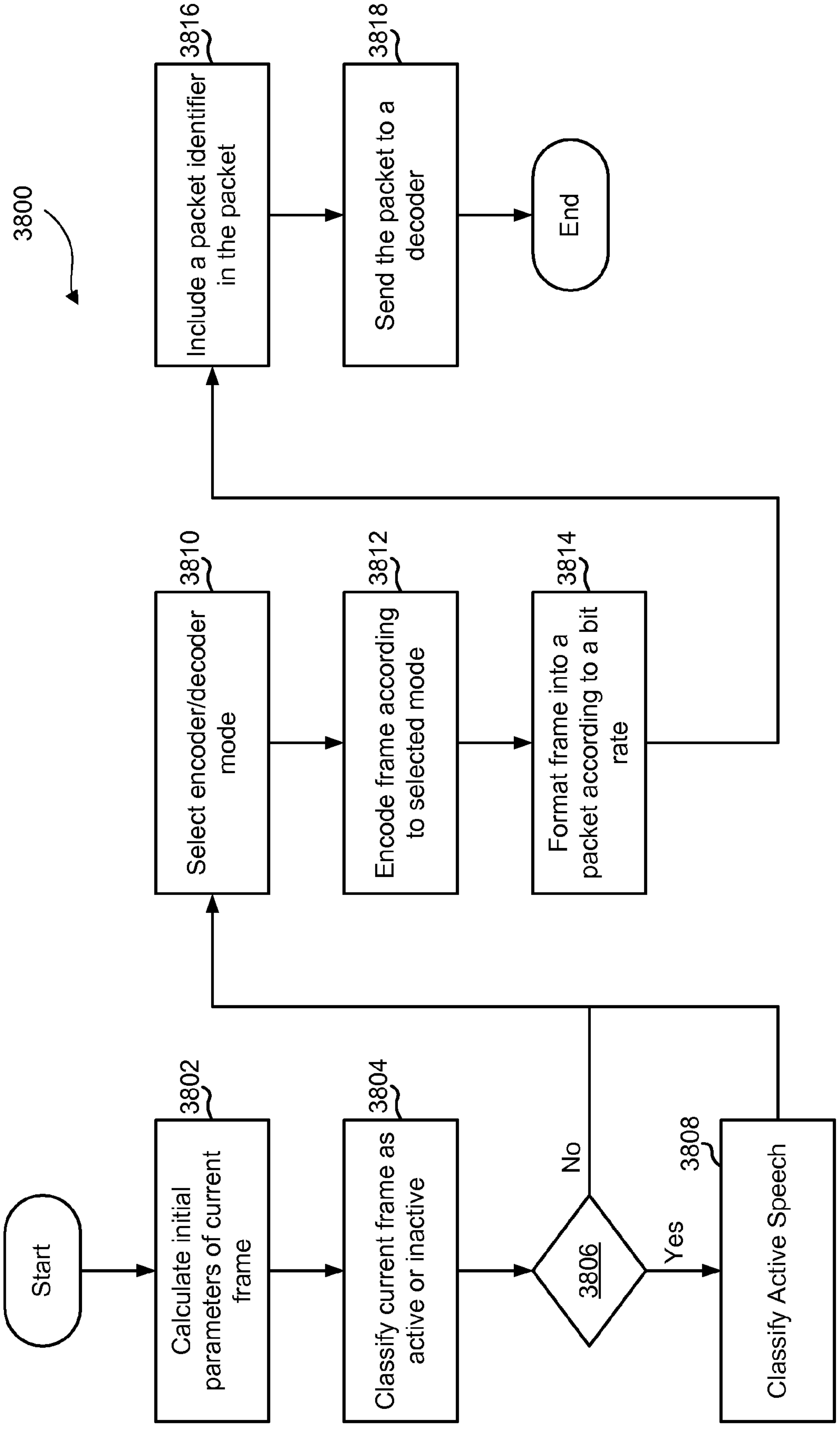
FIG. 38 is a flow diagram illustrating one configuration of a variable rate speech coding method.

FIG. 38 is a flow diagram illustrating one example of a variable rate speech coding method 3800. In one aspect, the method 3800 is implemented by a single mobile station 3302 which may be enabled to encode a packet as a wideband packet or a narrowband packet. In other aspects, the method 3800 may be implemented by more than one mobile station 3302. In other words, one mobile station 3302 may include an encoder to encode a wideband or narrowband packet while a separate mobile station 3302 may include a decoder to decode the packet using wideband or narrowband decoding techniques. Initial parameters of a current frame may be calculated 3802. In one configuration, the initial parameter calculation module 3718 calculates 3802 the parameters. The parameters may include one or more of the following: linear predictive coding (LPC) filter coefficients, line spectral pairs (LSPs) coefficients, the normalized autocorrelation functions (NACFs), the open loop lag, band energies, the zero crossing rate, and the formant residual signal.

The current frame may be classified 3804 as active or inactive. In one configuration, the classification module 3722 classifies the current frame as including either "active" or "inactive" speech. As described above, s(n) 3710 may include periods of speech and periods of silence. Active speech may include spoken words, whereas inactive speech may include background noise, silence, pauses, etc.

A determination 3806 is made whether the current frame was classified as active or inactive. If the current frame is classified as active, the active speech is further classified 3808 as either voiced, unvoiced, or transient frames. Human speech may be classified in many different ways. Two classifications of speech may include voiced and unvoiced sounds. Speech that is not voiced or unvoiced may be classified as transient speech.

An encoder/decoder mode may be selected 3810 based on the frame classification made in steps 3806 and 3808. The various encoder/decoder modes may be connected in parallel, as shown in FIG. 37. The different encoder/decoder modes operate according to different coding schemes. Certain modes may be more effective at coding portions of the speech signal s(n) 3710 exhibiting certain properties.

As previously explained, the CELP mode may be chosen to code frames classified as transient speech. The PPP mode may be chosen to code frames classified as voiced speech. The NELP mode may be chosen to code frames classified as unvoiced speech. The same coding technique may frequently be operated at different bit rates, with varying levels of performance. The different encoder/decoder modes in FIG. 37 may represent different coding techniques, or the same coding technique operating at different bit rates, or combinations of the above.

The selected encoder mode may encode 3812 the current frame and format 3814 the encoded frame into a packet according to a bit rate. A packet identifier may be included 3816 in the packet. The packet identifier may indicate if the packet was encoded as a wideband or narrowband packet. The packet may be sent 3818 to a decoder.

Figure 39:
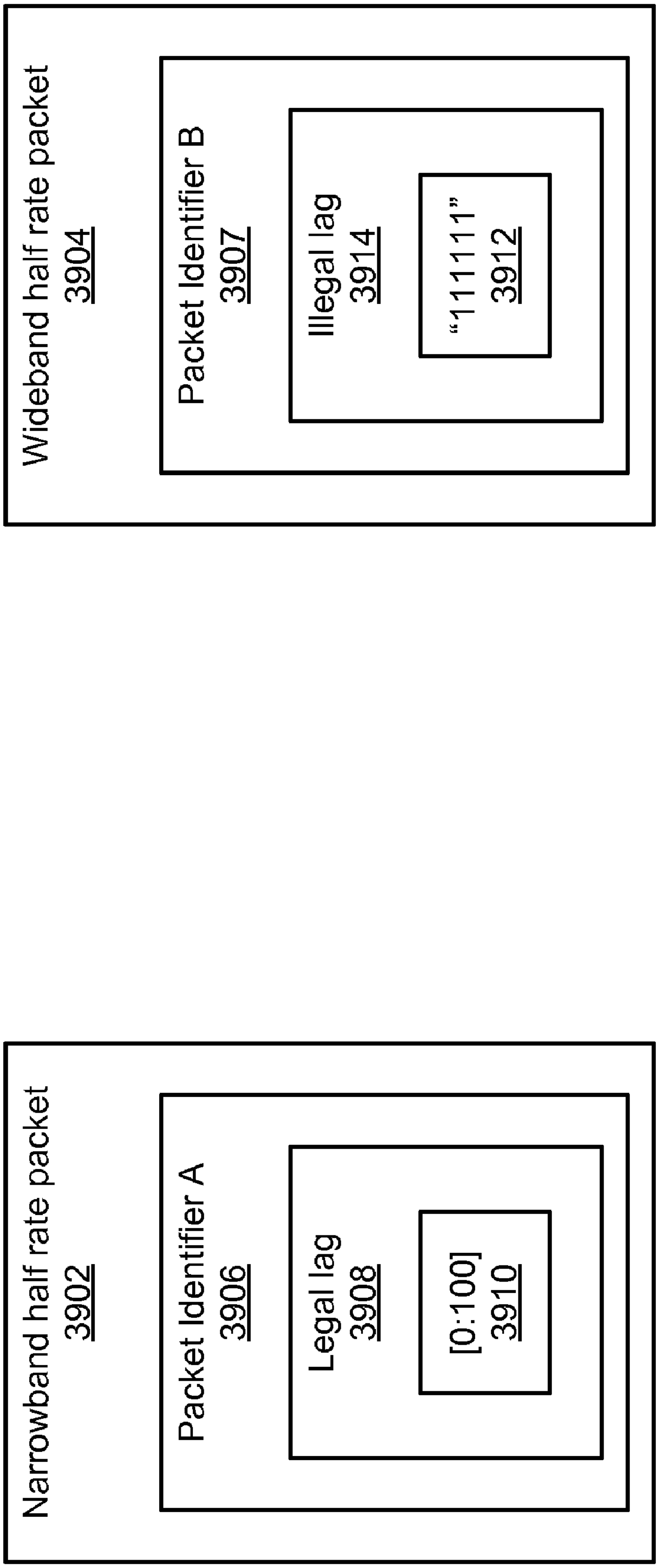
FIG. 39 is a block diagram illustrating one configuration of a regular narrowband half rate packet and a wideband half rate packet.

FIG. 39 is a block diagram illustrating one configuration of a regular narrowband half rate packet 3902 and a wideband half rate packet 3904. In one aspect, each packet may include a packet identifier, such as packet identifier A 3906 and packet identifier B 3907. Packet identifier A 3906 may include a legal lag value 3908 and packet identifier B 3907 may include an illegal lag value 3914. The illegal lag value 3914 may be a value that indicates to a decoder if a certain packet is a wideband half rate packet 3904 or a special narrowband half rate packet. The legal lag value may indicate to a decoder if a certain packet is a regular (not special) narrowband half rate CELP packet 3902. In other configurations, the legal lag value may indicate to a decoder if a certain packet is any other half rate packet which includes a pitch lag value in the range of [0:100]. The pitch lag value in the range of [0:100] is used merely as an example. The present systems and methods may apply to a given N-bit field with a set of values which are valid (associated with a specific coding scheme) and another set of values which are illegal/invalid.

In one configuration, the regular narrowband half rate packet 3902 utilizes each of the 80 bits included in the packet 3902. As such, a delay parameter may be used to store a legal lag value 3908, which may indicate to the decoder that the incoming packet is a regular (not special) narrowband half rate CELP. In one aspect, the delay parameter includes 7 bits. The delay parameter may not be a value 3910 between the decimal numbers of "101" and "127." Legal (valid) lag values in this 7-bit field may be a value 3910 between the decimal numbers of "0" and "100." The value 3910 between "0" and "100" may be included in the regular (not special) narrowband half rate CELP packet 3902 in its binary form (e.g., a 7 bit binary number).

In one aspect, a wideband coder implements the NELP coding scheme to code unvoiced sounds. The signal for unvoiced sounds may be packed in the wideband half rate packet 3904 as a packet with 80 bits. However, packets with unvoiced sounds may not include a delay. In one configuration, delays may not be analyzed by an encoder for unvoiced sounds because acceptable reproduction of the signal for unvoiced sounds maybe achieved without a delay. The wideband half rate packet 3904 may utilize 74 of the 80 bits, leaving 6 bits free. Packet identifier B 3907 associated with the wideband half rate packet 3904 may include a string 3912 of six ones (i.e., "111111"). In one configuration, this may map to the decimal numbers of "126" and "127" (in 7 bits), and may be reserved as an identifier for the wideband half rate packet 3904.

In one configuration, at least two illegal values from an N-bit parameter may be utilized. If two illegal values are used, one bit from the N-bit parameter may be freed to carry information. In a further configuration, the number of bits from the N-bit parameter that may be freed to carry information may be equal to $\log_2(X)$, where X is the number of illegal values provided from the N-bit parameter. For example, eight illegal values may free up three bits for carrying other information.

FIG. 40 is a chart 4000 illustrating the number of bits allocated to various types of packets. The chart 4000 includes a plurality of parameters 4002. Each parameter within the plurality of parameters 4002 may utilize a certain number of bits. The various packet types illustrated in the chart 4000 may have been encoded utilizing one of the various encoding modes previously discussed. The packet types may include a full-rate CELP (FCELP) 4004, a half-rate CELP (HCELP) 4006, a special half-rate CELP (SPLHCELP) 4008, a full-rate PPP (FPPP) 4010, a special half-rate PPP (SPLHPPP) 4012, a quarter-rate PPP (QPPP) 4014, a special half-rate NELP (SPLHNELP) 4016, a quarter-rate NELP (QNELP) 4018 and a silence encoder 4020.

The FCELP 4004 and the FPPP 4010 may be packets with a total of 171 bits. The FCELP 4004 packet may be converted to a SPLHCELP 4008 packet. In one aspect, the FCELP 4004 packet allocates bits for parameters such as a fixed codebook index (FCB Index) and a fixed codebook gain (FCB Gain). As shown, when the FCELP 4004 packet is converted to a SPLHCELP 4008 packet, zero bits are allocated for parameters such as the FCB Index, the FCB Gain and a delta lag. In other words, the SPLHCELP 4008 packet is transmitted to a decoder without these bits. The SPLHCELP 4008 packet includes bits that are allocated for parameters such as a line spectral pair (LSP), an adaptive codebook (ACB) gain, a special half-rate identification (ID), special packet ID, pitch lag and mode-bit information. The total number of bits transmitted to a decoder may be reduced from 171 to 80.

Similarly, the FPPP 4010 packet may be converted to a SPLHPPP 4012 packet. As shown, the FPPP 4010 packet allocates bits to band alignments parameters. The FPPP 4010 packet may be converted to a SPLHPPP 4012 packet. The bits allocated to the band alignments may be discarded. In other words, the SPLHPPP 4012 packet is transmitted to a decoder without these bits. The total number of bits transmitted to a decoder may be reduced from 171 to 80. In one configuration, bits allocated to amplitude and global alignment parameters are included in the SPLHPPP 4012 packet. The amplitude parameter may indicate the amplitude of the spectrum of the signal s(n) 3710 and the global alignment parameter and may represent the linear phase shift which may ensure maximal alignment.

In addition, various types of packets may include bits allocated to a lag/special packet ID parameter. The lag/special packet ID parameter may represent the packet identifier that allows a decoder to recognize if a particular packet was encoded using narrowband coding techniques or wideband coding techniques.

Various configurations herein are illustrated with different numbers of bits for different parameters and packets. The particular number of bits associated with each parameter herein is by way of example, and is not meant to be limiting. Parameters may include more or less bits than the examples used herein.

Figure 41:
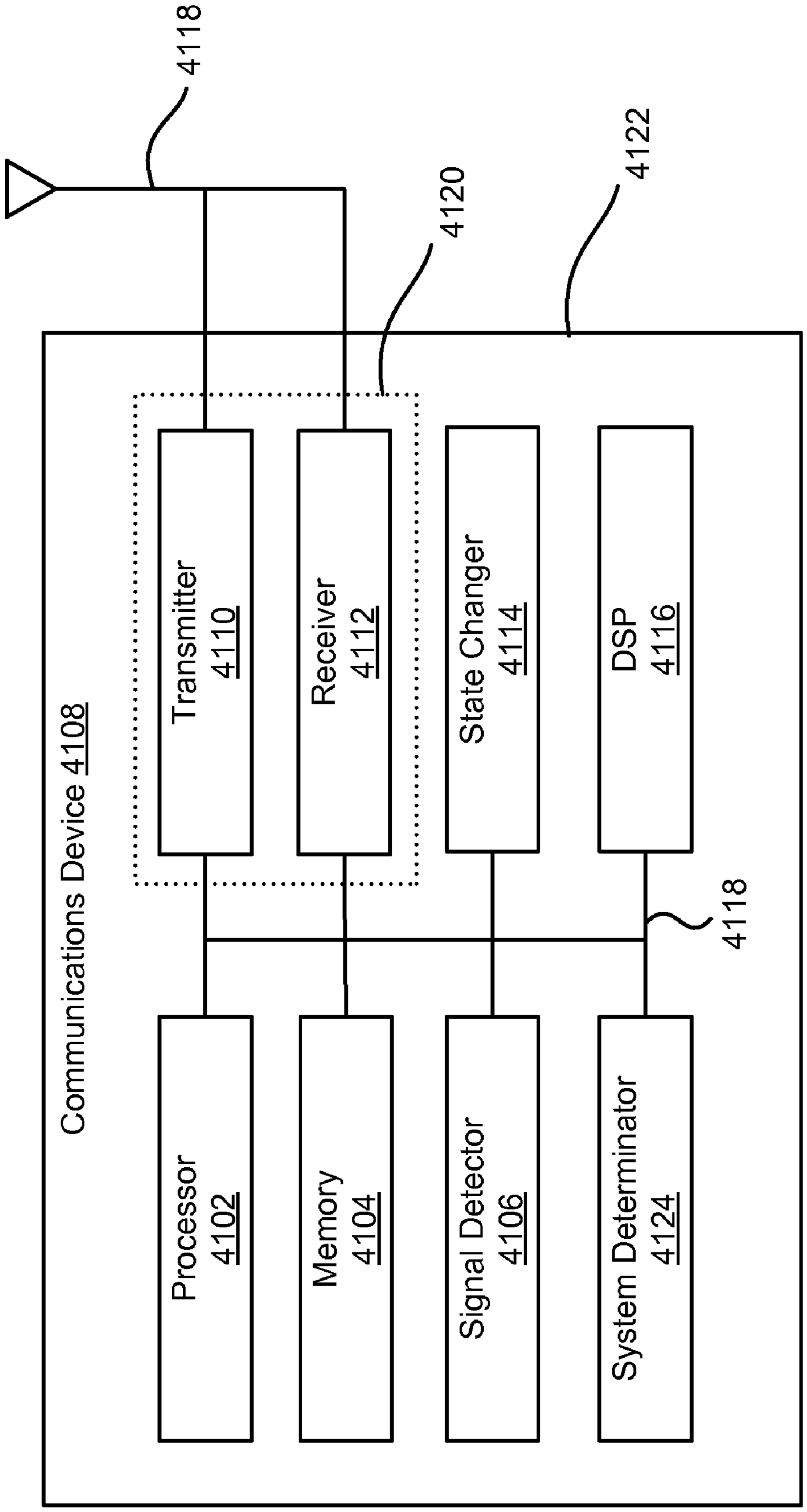
FIG. 41 is a block diagram of certain components in one configuration of a communications device.

FIG. 41 illustrates various components that may be utilized in a communications device 4108 in accordance with a configuration. The communications device 4108 may include a processor 4102 which controls operation of the device 4108. The processor 4102 may also be referred to as a CPU. Memory 4104, which may include both read-only memory (ROM) and random access memory (RAM), provides instructions and data to the processor 4102. A portion of the memory 4104 may also include non-volatile random access memory (NVRAM).

The communications device 4108 may also include a housing 4122 that contains a transmitter 4110 and a receiver 4112 to allow transmission and reception of data between the access terminal 4108 and a remote location. The transmitter 4110 and receiver 4112 may be combined into a transceiver 4120. An antenna 4118 is attached to the housing 4122 and electrically coupled to the transceiver 4120.

The communications device 4108 also includes a signal detector 4106 used to detect and quantify the level of signals received by the transceiver 4120. The signal detector 4106 detects such signals as total energy, pilot energy per pseudonoise (PN) chips, power spectral density, and other signals.

A state changer 4114 of the communications device 4108 controls the state of the communications device 4108 based on a current state and additional signals received by the transceiver 4120 and detected by the signal detector 4106. The device 4108 may be capable of operating in any one of a number of states.

The communications device 4108 also includes a system determinator 4124 used to control the device 4108 and determine which service provider system the device 4108 should transfer to when it determines the current service provider system is inadequate.

The various components of the communications device 4108 are coupled together by a bus system 4118 which may include a power bus, a control signal bus, and a status signal bus in addition to a data bus. However, for the sake of clarity, the various busses are illustrated in FIG. 41 as the bus system 4118. The communications device 4108 may also include a digital signal processor (DSP) 4116 for use in processing signals.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the configurations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present systems and methods.

The various illustrative logical blocks, modules, and circuits described in connection with the configurations disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the configurations disclosed herein may be embodied directly in hardware, in a software module executed by a processor, or in a combination of the two. A software module may reside in RAM memory, flash memory, ROM memory, erasable programmable read-only memory (EPROM), electrically erasable programmable read-only memory (EEPROM), registers, hard disk, a removable disk, a compact disc read-only memory (CD-ROM), or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present systems and methods. In other words, unless a specific order of steps or actions is specified for proper operation of the configuration, the order and/or use of specific steps and/or actions may be modified without departing from the scope of the present systems and methods. The methods disclosed herein may be implemented in hardware, software or both. Examples of hardware and memory may include RAM, ROM, EPROM, EEPROM, flash memory, optical disk, registers, hard disk, a removable disk, a CD-ROM or any other types of hardware and memory.

While specific configurations and applications of the present systems and methods have been illustrated and described, it is to be understood that the systems and methods are not limited to the precise configuration and components disclosed herein. Various modifications, changes, and variations which will be apparent to those skilled in the art may be made in the arrangement, operation, and details of the methods and systems disclosed herein without departing from the spirit and scope of the claimed systems and methods.

What is claimed is:

1. A method for including an identifier with a packet associated with a speech signal, the method comprising:
- receiving a signal;
- partitioning the signal into a plurality of frames;
- encoding a frame of the signal into a packet;
- determining if the packet is encoded with one of a plurality of coding schemes;
- packing an illegal value of an N-bit parameter based on the determination, wherein the illegal value identifies one coding scheme, wherein the illegal value is one of at least two reserved illegal values and includes at least one bit from the N-bit parameter that is used to carry information; and
- transmitting the packet.

2. The method of claim 1, wherein the packet is encoded as a wideband half rate packet.

3. The method of claim 2, wherein the wideband half rate packet includes 80 bits.

4. The method of claim 2, wherein the wideband half rate packet is encoded using a noise excited linear prediction (NELP) coding scheme.

5. The method of claim 1, wherein the frame is encoded by a wideband coder on a mobile station.

6. The method of claim 1, further comprising decoding the frame by a wideband decoder on a mobile station.

7. The method of claim 1, further comprising transmitting the packet from a first mobile station to a second mobile station.

8. The method of claim 1, wherein a number of bits from the N-bit parameter used to carry information is equal to $\log_2(X)$, wherein X is the number of reserved illegal values for the N-bit parameter.

9. The method of claim 2, wherein the illegal value is a wideband identifier.

10. The method of claim 9, wherein the wideband identifier comprises the decimal number one hundred twenty six in binary form.

11. The method of claim 9, wherein the wideband identifier comprises the decimal number one hundred twenty seven in binary form.

12. The method of claim 9, wherein the wideband identifier comprises six ones in binary form.

13. An apparatus for including an identifier with a packet associated with a speech signal comprising:
- a processor;
- memory in electronic communication with the processor;
- instructions stored in the memory, the instructions being executable to:
  - receive a signal;
  - partition the signal into a plurality of frames;
  - encode a frame of the signal into a packet;
  - determine if the packet is encoded with one of a plurality of coding schemes;
  - pack an illegal value of an N-bit parameter based on the determination, wherein the illegal value identifies one coding scheme, wherein the illegal value is one of at least two reserved illegal values and includes at least one bit from the N-bit parameter that is used to carry information; and
  - transmit the packet.

14. The apparatus of claim 13, wherein the packet is encoded as a wideband half rate packet.

15. The apparatus of claim 14, wherein the wideband half rate packet includes 80 bits.

16. The apparatus of claim 14, wherein the illegal value is a wideband identifier.

17. The apparatus of claim 16, wherein the wideband identifier comprises the decimal number one hundred twenty six in binary form.

18. The apparatus of claim 16, wherein the wideband identifier comprises the decimal number one hundred twenty seven in binary form.

19. The apparatus of claim 16, wherein the wideband identifier comprises six ones in binary form.

20. A system that is configured to include an identifier with a packet associated with a speech signal comprising:
- means for processing;
- means for receiving a signal;
- means for partitioning the signal into a plurality of frames;
- means for encoding a frame of the signal into a packet;
- means for determining if the packet is encoded with one of a plurality of coding schemes;
- means for packing an illegal value of an N-bit parameter based on the determination, wherein the illegal value identifies one coding scheme, wherein the illegal value is one of at least two reserved illegal values and includes at least one bit from the N-bit parameter that is used to carry information; and
- means for transmitting the packet.

21. A non-transitory computer-readable medium comprising executable instructions to:
- receive a signal;
- partition the signal into a plurality of frames;
- encode a frame of the signal into a packet;
- determine if the packet is encoded with one of a plurality of coding schemes;
- pack an illegal value of an N-bit parameter based on the determination, wherein the illegal value identifies one coding scheme, wherein the illegal value is one of at least two reserved illegal values and includes at least one bit from the N-bit parameter that is used to carry information; and
- transmit the packet.

22. A method for decoding a packet, the method comprising:
- receiving a packet;
- determining an illegal value of an N-bit parameter included in the packet, wherein the illegal value identifies one of a plurality of coding schemes used to encode the packet, wherein the illegal value is one of at least two reserved illegal values and includes at least one bit from the N-bit parameter that is used to carry information; and
- selecting a decoding mode for the packet based on the determination.

23. An apparatus for decoding a packet comprising:
- a processor;
- memory in electronic communication with the processor;
- instructions stored in the memory, the instructions being executable to:
  - receive a packet;

determine an illegal value of an N-bit parameter included in the packet, wherein the illegal value identifies one of a plurality of coding schemes used to encode the packet, wherein the illegal value is one of at least two reserved illegal values and includes at least one bit from the N-bit parameter that is used to carry information; and select a decoding mode for the packet based on the determination.

24. A system that is configured to decode a packet comprising:

means for processing;

means for receiving a packet;

means for determining an illegal value of an N-bit parameter included in the packet, wherein the illegal value identifies one of a plurality of coding schemes used to encode the packet, wherein the illegal value is one of at least two reserved illegal values and includes at least one bit from the N-bit parameter that is used to carry information; and means for selecting a decoding mode for the packet based on the determination.

25. A non-transitory computer-readable medium comprising executable instructions to:

receive a packet;

determine an illegal value of an N-bit parameter included in the packet, wherein the illegal value identifies one of a plurality of coding schemes used to encode the packet, wherein the illegal value is one of at least two reserved illegal values and includes at least one bit from the N-bit parameter that is used to carry information; and select a decoding mode for the packet based on the determination.

* * * * *